United States Patent
Koike et al.

(10) Patent No.: US 11,003,681 B2
(45) Date of Patent: May 11, 2021

(54) ANONYMIZATION SYSTEM

(71) Applicants: Kabushiki Kaisha Toshiba, Minato-ku (JP); Toshiba Solutions Corporation, Kawasaki (JP)

(72) Inventors: Masanobu Koike, Tama (JP); Yoshihiro Fujii, Tokyo (JP)

(73) Assignees: Kabushiki Kaisha Toshiba, Minato-ku (JP); Toshiba Solutions Corporation, Kawasaki (JP)

( * ) Notice: Subject to any disclaimer, the term of this patent is extended or adjusted under 35 U.S.C. 154(b) by 1030 days.

(21) Appl. No.: 15/444,654

(22) Filed: Feb. 28, 2017

(65) Prior Publication Data

US 2017/0177683 A1 Jun. 22, 2017

Related U.S. Application Data

(63) Continuation of application No. PCT/JP2015/081054, filed on Nov. 4, 2015.

(51) Int. Cl.
- *G06F 16/25* (2019.01)
- *G06F 21/62* (2013.01)
- *G06F 7/02* (2006.01)

(52) U.S. Cl.
CPC ............ *G06F 16/258* (2019.01); *G06F 7/026* (2013.01); *G06F 21/6254* (2013.01)

(58) Field of Classification Search
CPC ..... G06F 16/258; G06F 21/6254; G06F 7/026
See application file for complete search history.

(56) References Cited

U.S. PATENT DOCUMENTS

| 9,432,342 B1 * | 8/2016 | Kothari .................... H04L 9/08 |
| 2002/0019934 A1 | 2/2002 | Ishizaki |
| 2013/0230168 A1 | 9/2013 | Takenouchi |

(Continued)

FOREIGN PATENT DOCUMENTS

| JP | 2002-55608 A | 2/2002 |
| JP | 2004-112555 A | 4/2004 |

(Continued)

OTHER PUBLICATIONS

Office Action dated Jul. 25, 2017 in Japanese Patent Application No. 2014-180442.

(Continued)

*Primary Examiner* — Mark D Featherstone
*Assistant Examiner* — Ranjit P Doraiswamy
(74) *Attorney, Agent, or Firm* — Oblon, McClelland, Maier & Neustadt, L.L.P.

(57) ABSTRACT

According to one embodiment, there is provided an anonymization system including at least one encryption apparatus, an anonymization apparatus, and a decryption apparatus. The encryption apparatus store personal data including one or more values for each item, and generates encrypted data from the personal data by encrypting the one or more values for each item included in the personal data. The anonymization apparatus generates encrypted anonymized data from the encrypted data without decryption by anonymizing one or more values for at least a portion of the items of the encrypted data. The decryption apparatus generates anonymized data from the encrypted anonymized data by decrypting the encrypted anonymized data.

4 Claims, 38 Drawing Sheets

(56) References Cited

U.S. PATENT DOCUMENTS

| | | | |
|---|---|---|---|
| 2015/0033356 A1 | 1/2015 | Takenouchi | |
| 2015/0149765 A1* | 5/2015 | Pauliac | H04L 67/306 713/153 |
| 2016/0065610 A1* | 3/2016 | Peteroy | H04L 63/0471 713/153 |

FOREIGN PATENT DOCUMENTS

| | | |
|---|---|---|
| JP | 2013-197642 A | 9/2013 |
| JP | 2014-32550 A | 2/2014 |
| JP | 2014-132390 A | 7/2014 |
| JP | 2015-526782 | 9/2015 |
| JP | 2015-526782 A | 9/2015 |
| WO | WO 2012/067214 A1 | 5/2012 |
| WO | WO 2013/121739 A1 | 8/2013 |

OTHER PUBLICATIONS

International Search Report dated Feb. 2, 2016 in PCT/JP2015/081054 (submitting English language translation only).

Ryo Kikuchi, et al., "Simple Privacy-Preserving Join Protocols for Vertically Partitioned Data" Computer Security Symposium 2015, Oct. 2015, pp. 576-583 (with English Abstract).

International Search Report dated Feb. 2, 2016 in PCT/JP2015/081054, filed on Nov. 4, 2015 ( with English Translation of Categories of Cited Documents).

Written Opinion dated Feb. 2, 2016 in PCT/JP2015/081054, filed on Nov. 4, 2015.

"Guidelines on anonymity data attached sheet 2 to affect making, an offer", Ministry of Internal Affairs, 2011, 5 pages ( with English Translation).

* cited by examiner

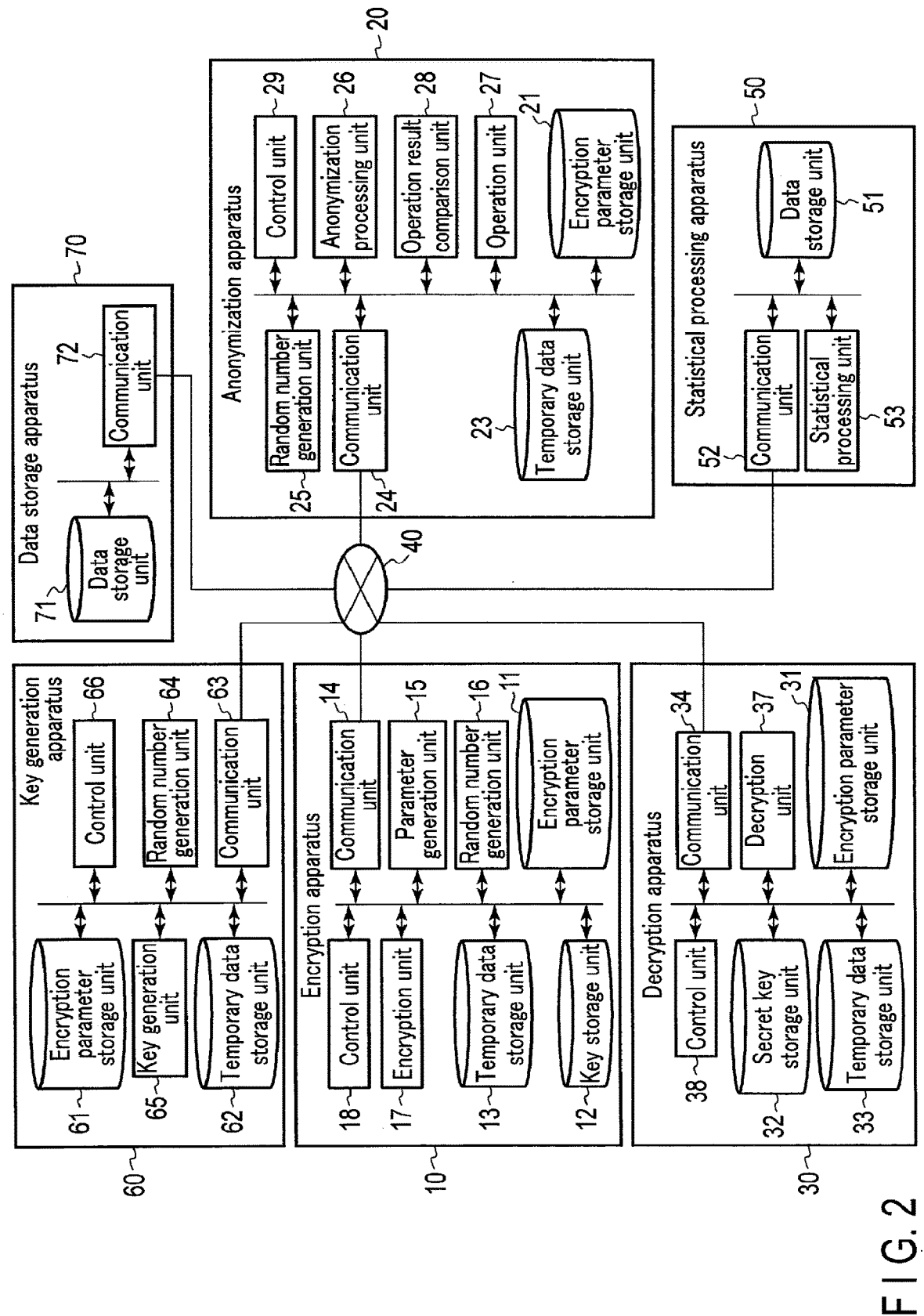
F I G. 2

T1

| NO. | Name | Staff ID number | Age | Income |
|---|---|---|---|---|
| 1 | Alice | 12345 | 45 | 100,000 |
| 2 | Bob | 67890 | 28 | 50,000 |
| 3 | Charlie | 23456 | 47 | 90,000 |
| 4 | Dave | 90123 | 34 | 40,000 |
| 5 | Ellen | 34567 | 38 | 60,000 |
| 6 | Frank | 89012 | 25 | 30,000 |

$data_i$

F I G. 3

T1e

| NO. | Name | Staff ID number | Age | Income |
|---|---|---|---|---|
| 1 | 0x6A2A1B32... | 0x0FE1788D... | 0x22DC66DD... | 0x21AEFC55... |
| 2 | 0xD6C7499B... | 0xC917E18E... | 0xFADB54A3... | 0x9A2CD423... |
| 3 | 0x25B182EA... | 0xD345A7121... | 0x3B3FA5B0... | 0x026F3EC9... |
| 4 | 0x5063B1D2... | 0x842645F7... | 0x37A9388F... | 0xCACA2B57... |
| 5 | 0x251B8985... | 0xE33D0EC9... | 0x8F1A890F... | 0x4A750B18... |
| 6 | 0x8E3447B1... | 0xE68F824C... | 0xB04E7CF6... | 0xB0AA28A7... |

$C_{A,data\_i}$

| NO. | Name | Staff ID number | Age | Income |
|---|---|---|---|---|
| 1 | 0x6A2A1B32... | 0xBF7028DD... | 0x22DC66DD... | 0x21AEFC55... |
| 2 | 0xD6C7499B... | 0x504B1173... | 0xFADB54A3... | 0x9A2CD423... |
| 3 | 0x25B182EA... | 0x471FE66B... | 0x3B3FA5B0... | 0x026F3EC9... |
| 4 | 0x5063B1D2... | 0x82AE4508... | 0x37A9388F... | 0xCACA2B57... |
| 5 | 0x251B8985... | 0x35DD0566... | 0x8F1A890F... | 0x4A750B18... |
| 6 | 0x8E3447B1... | 0x4947DF38... | 0xB04E7CF6... | 0xB0AA28A7... |

$C_{A,data\_i+R}$

FIG. 6

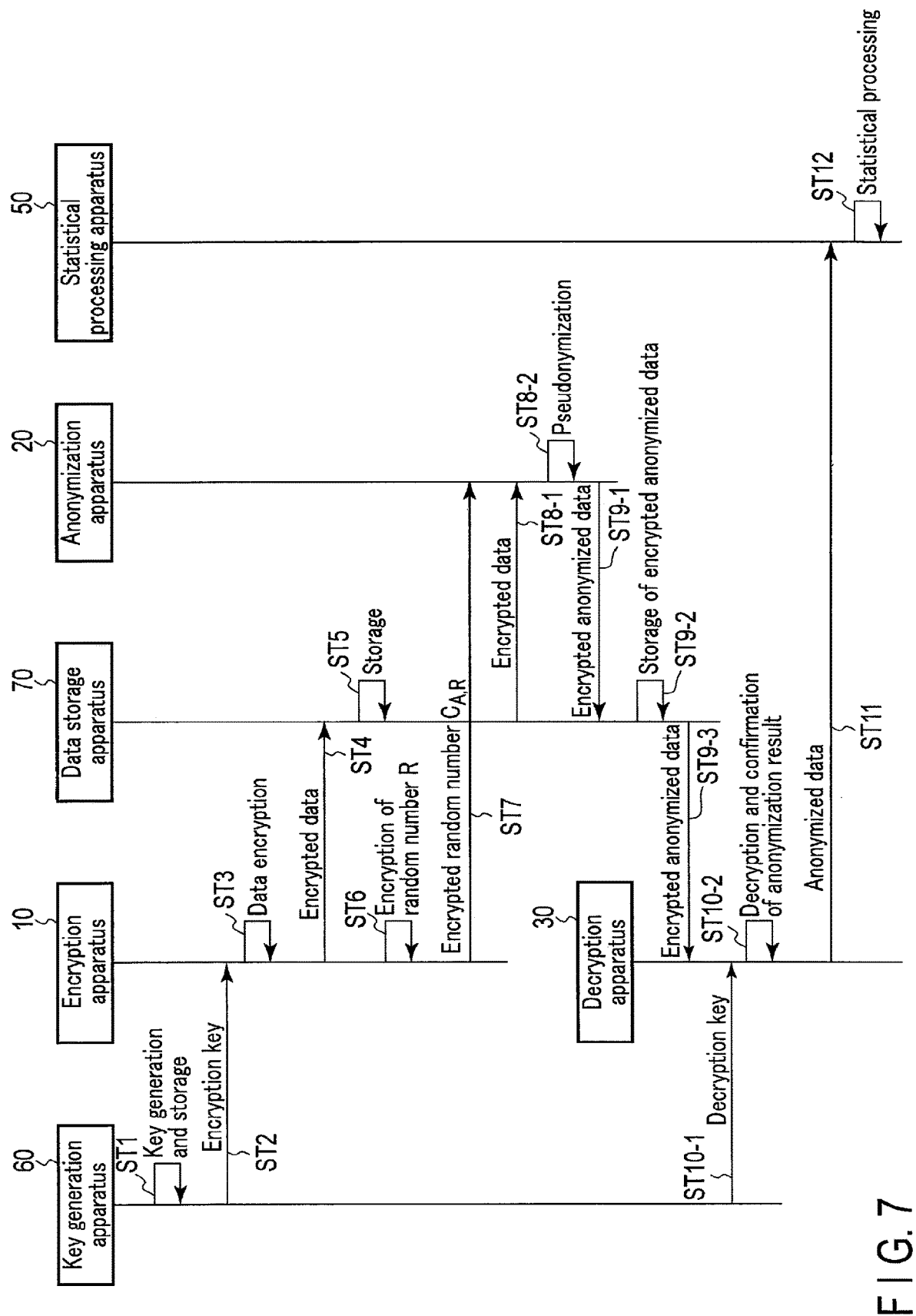
F I G. 7

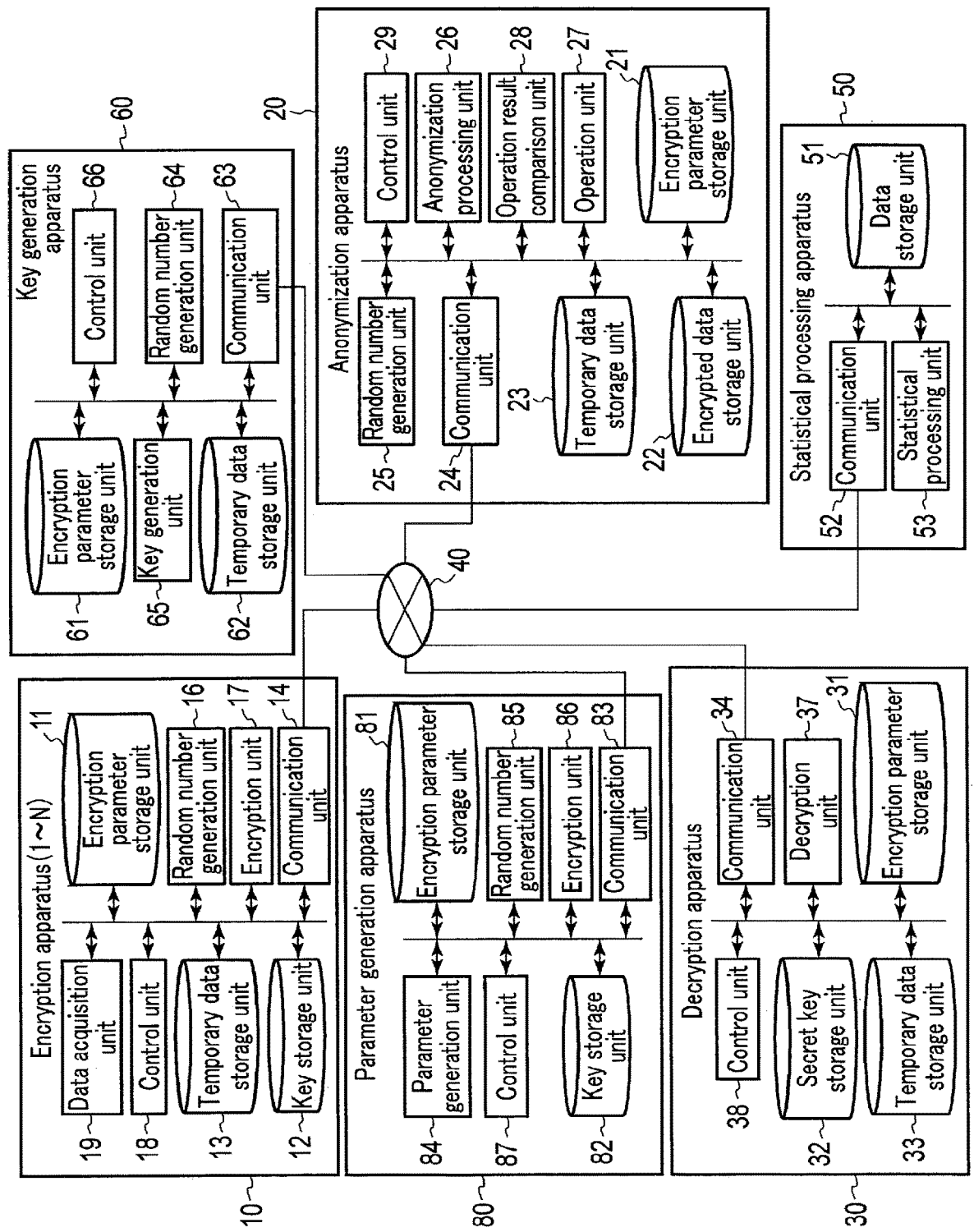
F I G. 9

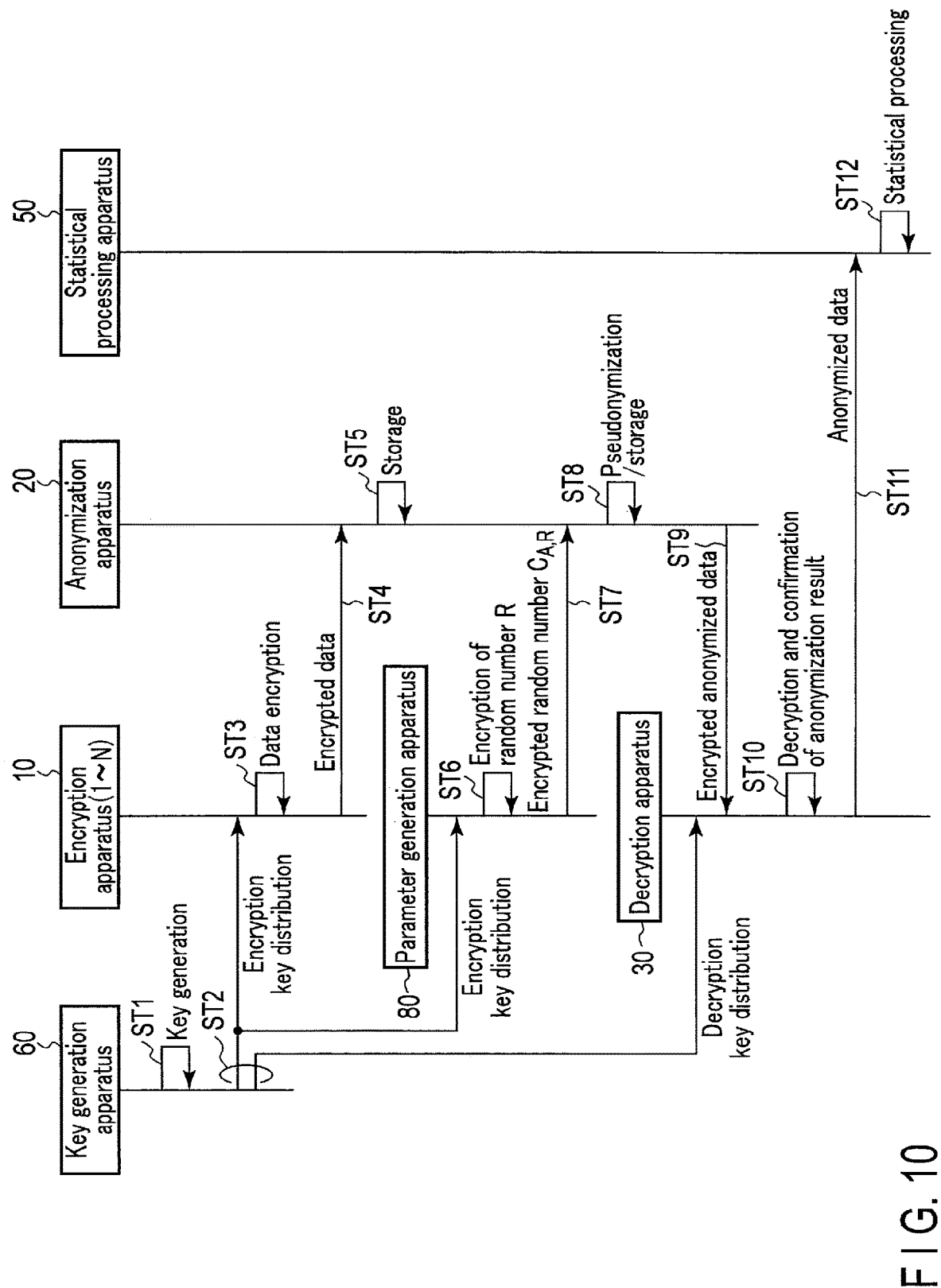
F I G. 10

T1

| NO. | Name | Staff ID number | Age | Income |
|---|---|---|---|---|
| 1 | Alice | 12345 | 45 | 100,000 |
| 2 | Bob | 67890 | 28 | 50,000 |
| 3 | Charlie | 23456 | 47 | 90,000 |
| 4 | Dave | 90123 | 34 | 40,000 |
| 5 | Ellen | 34567 | 38 | 60,000 |
| 6 | Frank | 89012 | 25 | 30,000 |

$data_i$

| NO. | Name | Staff ID number | Age | Income |
|---|---|---|---|---|
| 1 | 0x6A2A1B32... | 0x0FE1788D... | 0x22DC66DD... | 0x21AEFC55... |
| 2 | 0xD6C7499B... | 0xC917E18E... | 0xFADB54A3... | 0x9A2CD423... |
| 3 | 0x25B182EA... | 0xD345A7121... | 0x3B3FA5B0... | 0x026F3EC9... |
| 4 | 0x5063B1D2... | 0x842645F7... | 0x37A9388F... | 0xCACA2B57... |
| 5 | 0x251B8985... | 0xE33D0EC9... | 0x8F1A890F... | 0x4A750B18... |
| 6 | 0x8E3447B1... | 0xE68F824C... | 0xB04E7CF6... | 0xB0AA28A7... |

$C_{A,data\_i}$

| NO. | Name | Staff ID number | Age | Income | |
|---|---|---|---|---|---|
| 1 | 0x6A2A1B32... | 0x0FE1788D... | 0x22DC66DD... | 0x75EC8A88... | ←~ $C_{A,T}$ |
| 2 | 0xD6C7499B... | 0xC917E18E... | 0xFADB54A3... | 0x9A2CD423... | |
| 3 | 0x25B182EA... | 0xD345A7121... | 0x3B3FA5B0... | 0x75EC8A88... | ←~ $C_{A,T}$ |
| 4 | 0x5063B1D2... | 0x842645F7... | 0x37A9388F... | 0xCACA2B57... | |
| 5 | 0x251B8985... | 0xE33D0EC9... | 0x8F1A890F... | 0x4A750B18... | |
| 6 | 0x8E3447B1... | 0xE68F824C... | 0xB04E7CF6... | 0xB0AA28A7... | |

F I G. 14

T1

| NO. | Name | Staff ID number | Age | Income |
|---|---|---|---|---|
| 1 | Alice | 12345 | 45 | 100,000 |
| 2 | Bob | 67890 | 28 | 50,000 |
| 3 | Charlie | 23456 | 47 | 90,000 |
| 4 | Dave | 90123 | 34 | 40,000 |
| 5 | Ellen | 34567 | 38 | 60,000 |
| 6 | Frank | 89012 | 25 | 30,000 |

$data_i$

F I G. 18

T1e

| NO. | Name | Staff ID number | Age | Income |
|---|---|---|---|---|
| 1 | 0x6A2A1B32... | 0x0FE1788D... | 0x22DC66DD... | 0x21AEFC55... |
| 2 | 0xD6C7499B... | 0xC917E18E... | 0xFADB54A3... | 0x9A2CD423... |
| 3 | 0x25B182EA... | 0xD345A7121... | 0x3B3FA5B0... | 0x026F3EC9... |
| 4 | 0x5063B1D2... | 0x842645F7... | 0x37A9388F... | 0xCACA2B57... |
| 5 | 0x251B8985... | 0xE33D0EC9... | 0x8F1A890F... | 0x4A750B18... |
| 6 | 0x8E3447B1... | 0xE68F824C... | 0xB04E7CF6... | 0xB0AA28A7... |

$C_{A,data\_i}$

F I G. 19

|NO.|Name|Staff ID number|Age|Income|
|---|---|---|---|---|
|1|0x6A2A1B32...|0x0FE1788D...|0x1C6C90A9...|0x21AEFC55...|
|2|0xD6C7499B...|0xC917E18E...|0x43FF43C2...|0x9A2CD423...|
|3|0x25B182EA...|0xD345A7121...|0x1C6C90A9...|0x026F3EC9...|
|4|0x5063B1D2...|0x842645F7...|0xF7B27F7D...|0xCACA2B57...|
|5|0x251B8985...|0xE33D0EC9...|0xF7B27F7D...|0x4A750B18...|
|6|0x8E3447B1...|0xE68F824C...|0x43FF43C2...|0xB0AA28A7...|

F I G. 20

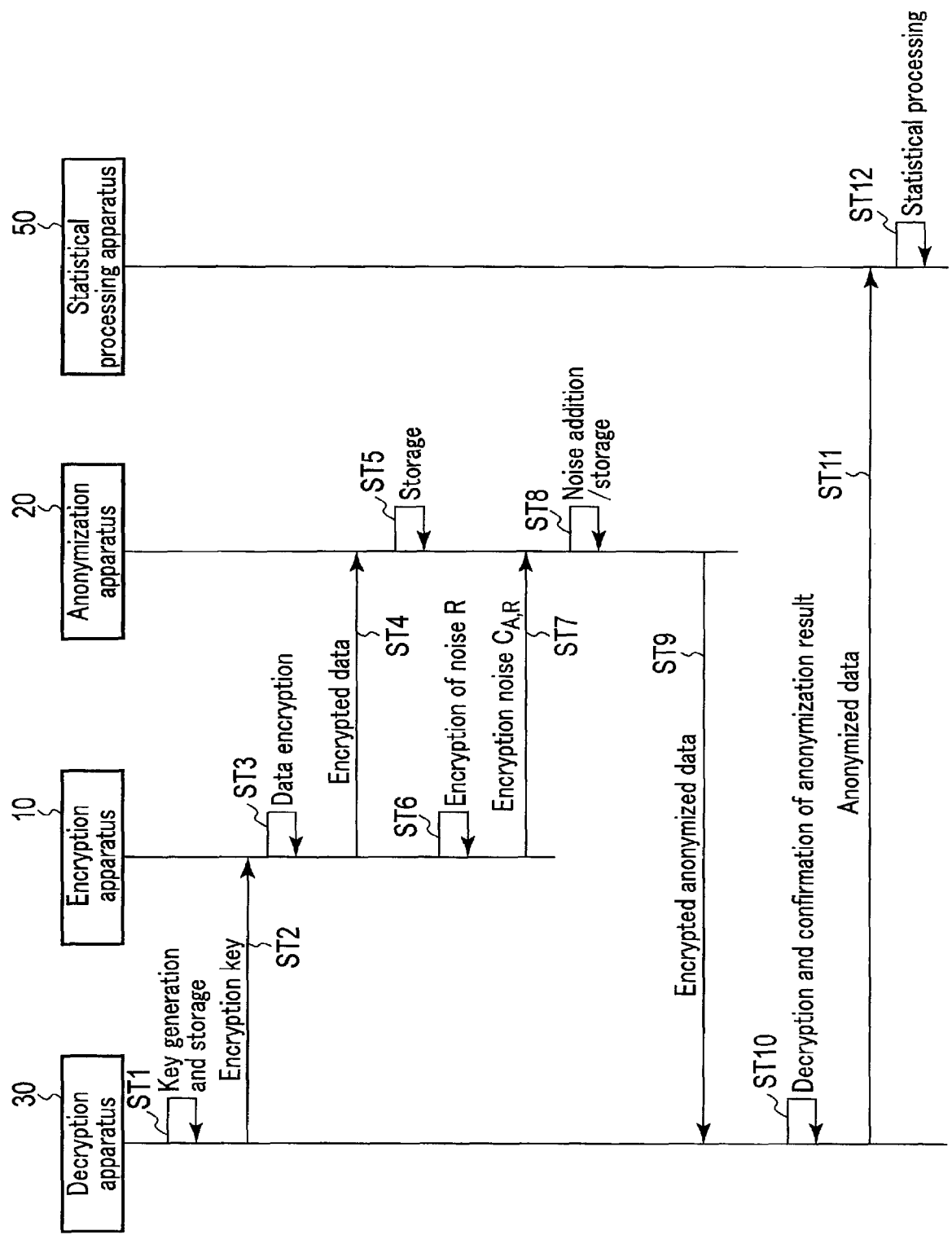
F I G. 22

T1e

| NO. | Name | Staff ID number | Age | Income |
|---|---|---|---|---|
| 1 | 0x6A2A1B32... | 0x0FE1788D... | 0x22DC66DD... | 0x21AEFC55... |
| 2 | 0xD6C7499B... | 0xC917E18E... | 0xFADB54A3... | 0x9A2CD423... |
| 3 | 0x25B182EA... | 0xD345A7121... | 0x3B3FA5B0... | 0x026F3EC9... |
| 4 | 0x5063B1D2... | 0x842645F7... | 0x37A9388F... | 0xCACA2B57... |
| 5 | 0x251B8985... | 0xE33D0EC9... | 0x8F1A890F... | 0x4A750B18... |
| 6 | 0x8E3447B1... | 0xE68F824C... | 0xB04E7CF6... | 0xB0AA28A7... |

$C_{A,data\_i}$

F I G. 25

T1a

| NO. | Name | Staff ID number | Age | Income | |
|---|---|---|---|---|---|
| 1 | 0x6A2A1B32... | 0x0FE1788D... | 0x22DC66DD... | 0xC860541A... | ~ $C_T$ |
| 2 | 0xD6C7499B... | 0xC917E18E... | 0xFADB54A3... | 0x9A2CD423... | |
| 3 | 0x25B182EA... | 0xD345A7121... | 0x3B3FA5B0... | 0xC860541A... | ~ $C_T$ |
| 4 | 0x5063B1D2... | 0x842645F7... | 0x37A9388F... | 0xCACA2B57... | |
| 5 | 0x251B8985... | 0xE33D0EC9... | 0x8F1A890F... | 0x4A750B18... | |
| 6 | 0x8E3447B1... | 0xE68F824C... | 0xB04E7CF6... | 0xB0AA28A7... | |

F I G. 26

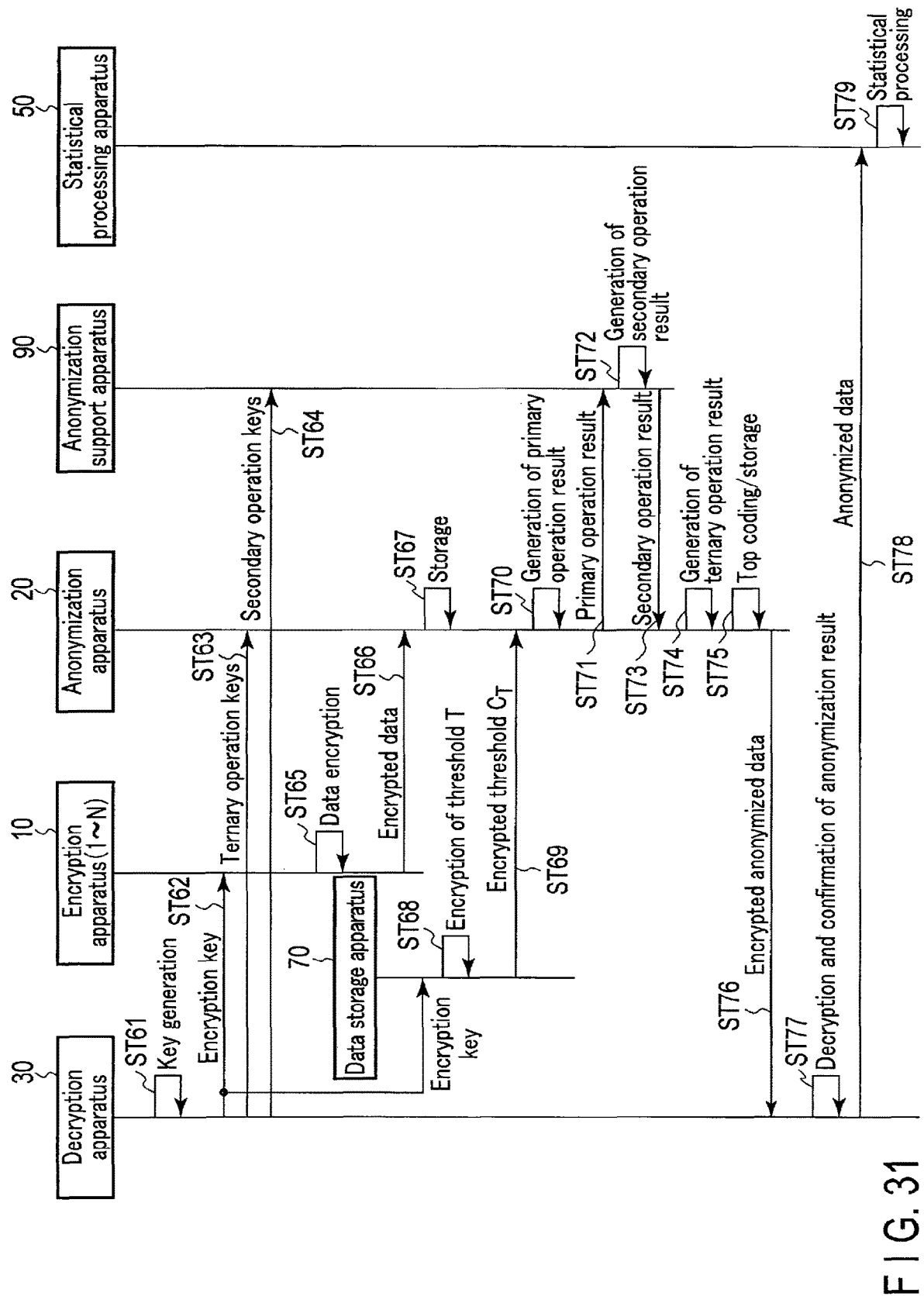
F I G. 31

T1e

| NO. | Name | Staff ID number | Age | Income |
|---|---|---|---|---|
| 1 | 0x6A2A1B32... | 0x0FE1788D... | 0x22DC66DD... | 0x21AEFC55... |
| 2 | 0xD6C7499B... | 0xC917E18E... | 0xFADB54A3... | 0x9A2CD423... |
| 3 | 0x25B182EA... | 0xD345A7121... | 0x3B3FA5B0... | 0x026F3EC9... |
| 4 | 0x5063B1D2... | 0x842645F7... | 0x37A9388F... | 0xCACA2B57... |
| 5 | 0x251B8985... | 0xE33D0EC9... | 0x8F1A890F... | 0x4A750B18... |
| 6 | 0x8E3447B1... | 0xE68F824C... | 0xB04E7CF6... | 0xB0AA28A7... |

$C_{A,data\_i}$

F I G. 33

T1a  $C_M$

| NO. | Name | Staff ID number | Age | Income |
|---|---|---|---|---|
| 1 | 0x6A2A1B32... | 0x0FE1788D... | 0x5720A764... | 0x21AEFC55... |
| 2 | 0xD6C7499B... | 0xC917E18E... | 0xDED7E56D... | 0x9A2CD423... |
| 3 | 0x25B182EA... | 0xD345A7121... | 0x5720A764... | 0x026F3EC9... |
| 4 | 0x5063B1D2... | 0x842645F7... | 0x676C3F17... | 0xCACA2B57... |
| 5 | 0x251B8985... | 0xE33D0EC9... | 0x676C3F17... | 0x4A750B18... |
| 6 | 0x8E3447B1... | 0xE68F824C... | 0xDFD7E56D... | 0xB0AA28A7... |

$C_M$

F I G. 34

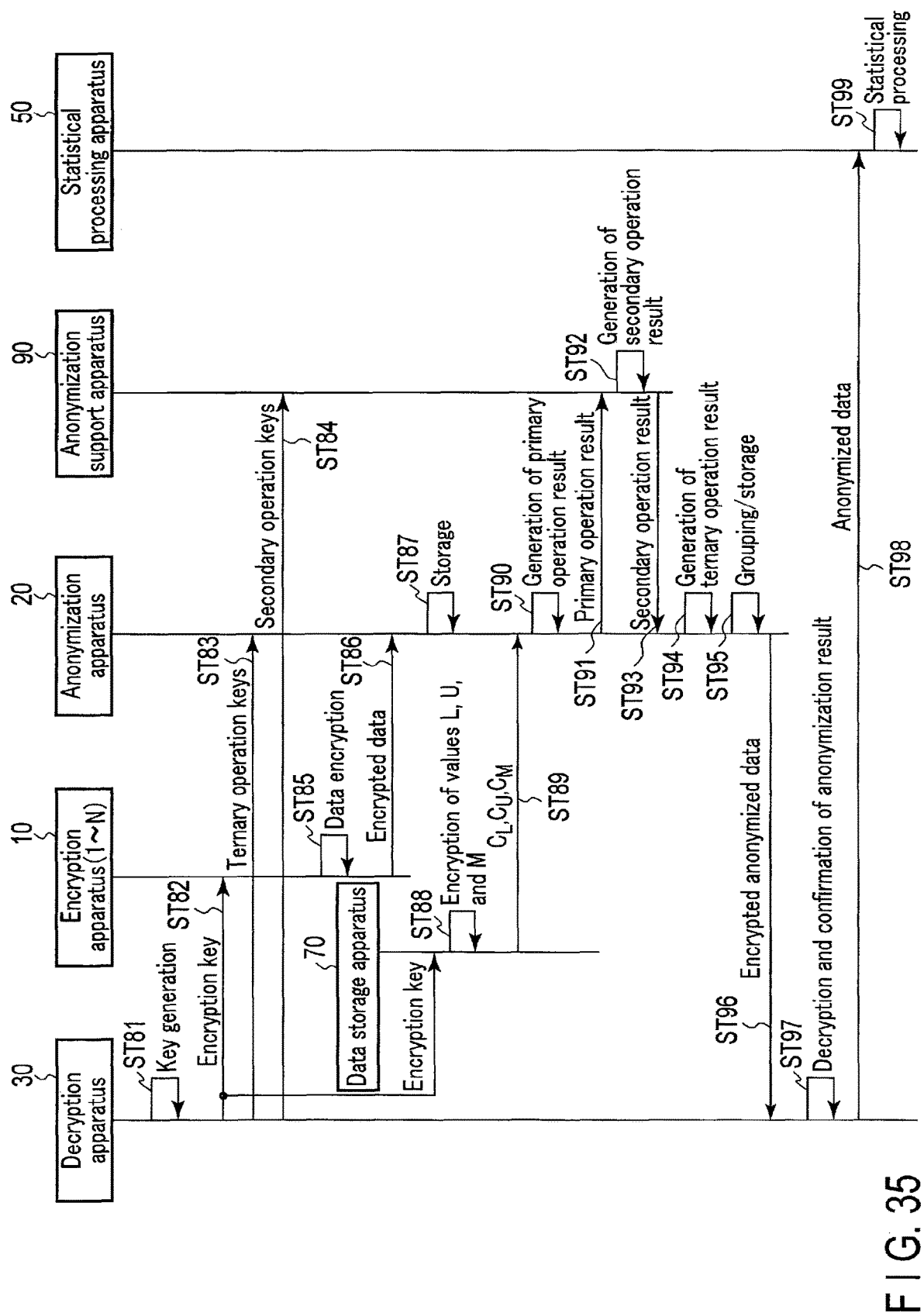
F I G. 35

T1e

| NO. | Name | Staff ID number | Age | Income |
|---|---|---|---|---|
| 1 | 0x6A2A1B32... | 0x0FE1788D... | 0x22DC66DD... | 0x21AEFC55... |
| 2 | 0xD6C7499B... | 0xC917E18E... | 0xFADB54A3... | 0x9A2CD423... |
| 3 | 0x25B182EA... | 0xD345A7121... | 0x3B3FA5B0... | 0x026F3EC9... |
| 4 | 0x5063B1D2... | 0x842645F7... | 0x37A9388F... | 0xCACA2B57... |
| 5 | 0x251B8985... | 0xE33D0EC9... | 0x8F1A890F... | 0x4A750B18... |
| 6 | 0x8E3447B1... | 0xE68F824C... | 0xB04E7CF6... | 0xB0AA28A7... |

$C_{A,data\_i}$

F I G. 37

T1a

| NO. | Name | Age | Income |
|---|---|---|---|
| 1 | 0x6A2A1B32... | 0x22DC66DD... | 0x21AEFC55... |
| 2 | 0xD6C7499B... | 0xFADB54A3... | 0x9A2CD423... |
| 3 | 0x25B182EA... | 0x3B3FA5B0... | 0x026F3EC9... |
| 4 | 0x5063B1D2... | 0x37A9388F... | 0xCACA2B57... |
| 5 | 0x251B8985... | 0x8F1A890F... | 0x4A750B18... |
| 6 | 0x8E3447B1... | 0xB04E7CF6... | 0xB0AA28A7... |

F I G. 38

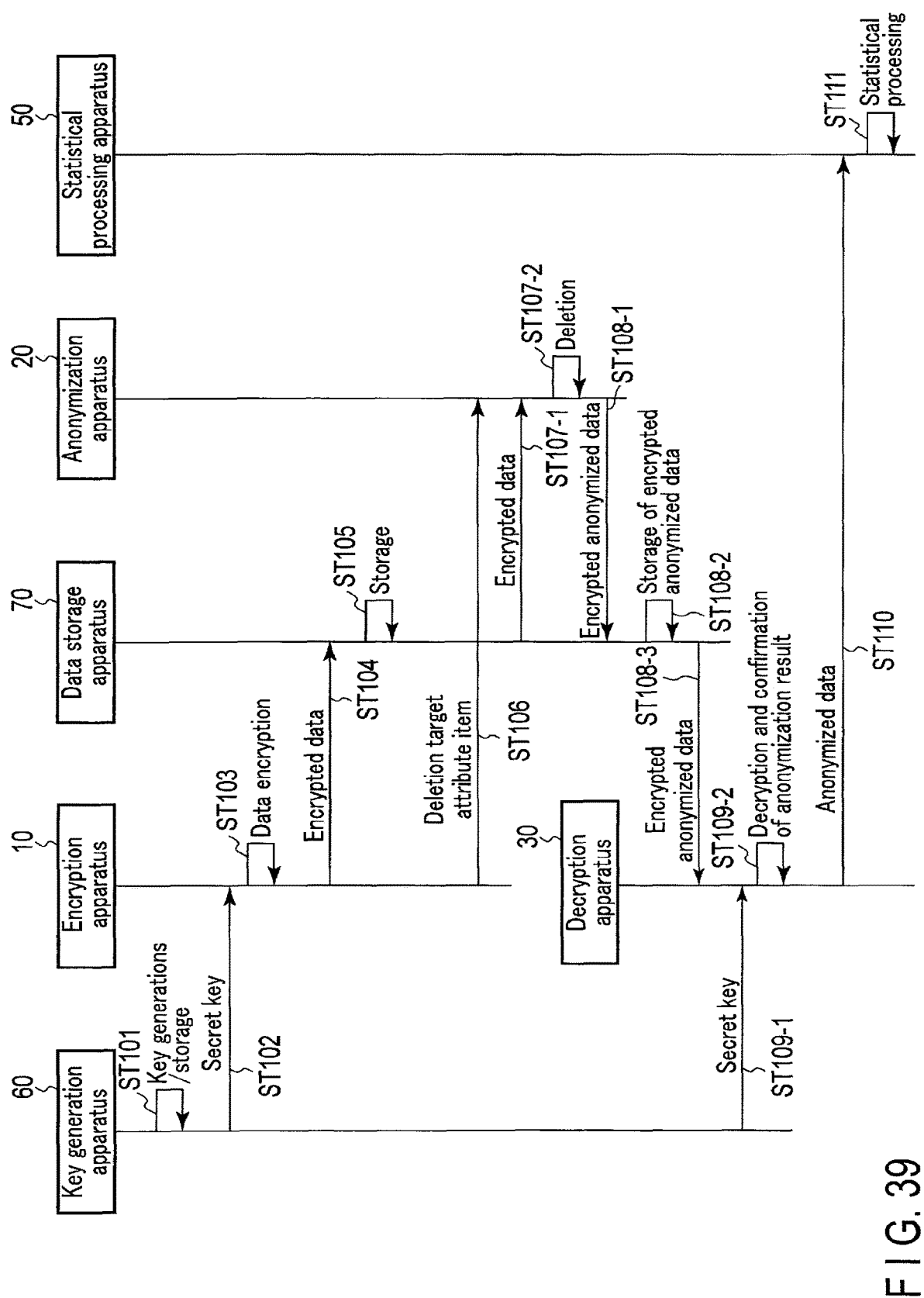
F I G. 39

| Case (A) | Public key encryption | Common key encryption | | | |
|---|---|---|---|---|---|
| | [Paillier] method | [OPE] method | [HLP10] method | [AN2013-51001] method | [AES] method |
| Pseudonymization | First embodiment | × | (As in 1) | (As in 1) | × |
| Top coding | × | Third embodiment | Ninth embodiment | (As in 3) | × |
| Grouping | × | Fifth embodiment | 11th embodiment | (As in 5) | × |
| Noise addition | Seventh embodiment | × | (As in 7) | (As in 7) | × |
| Deletion | (As in 13) | (As in 13) | (As in 13) | (As in 13) | 13th embodiment |
| Resampling | (As in 13) | (As in 13) | (As in 13) | (As in 13) | (As in 13) |
| Sort | (As in 13) | (As in 13) | (As in 13) | (As in 13) | (As in 13) |
| Swapping | (As in 13) | (As in 13) | (As in 13) | (As in 13) | (As in 13) |

×: Inexecutable, (As in n): as in nth embodiment

FIG. 43

| Case (B) | Public key encryption | Common key encryption | | | |
|---|---|---|---|---|---|
| | [Paillier] method | [OPE] method | [HLP10] method | [AN2013-51001] method | [AES] method |
| Pseudonymization | Second embodiment | x | (As in 2) | (As in 2) | x |
| Top coding | x | Fourth embodiment | 10th embodiment | (As in 4) | x |
| Grouping | x | Sixth embodiment | 12th embodiment | (As in 6) | x |
| Noise addition | Eighth embodiment | x | (As in 8) | (As in 8) | x |
| Deletion | (As in 14) | (As in 14) | (As in 14) | (As in 14) | 14th embodiment |
| Resampling | (As in 14) | (As in 14) | (As in 14) | (As in 14) | (As in 14) |
| Sort | (As in 14) | (As in 14) | (As in 14) | (As in 14) | (As in 14) |
| Swapping | (As in 14) | (As in 14) | (As in 14) | (As in 14) | (As in 14) | x: Inexecutable, (As in n): as in nth embodiment

F I G. 44

ANONYMIZATION SYSTEM

CROSS-REFERENCE TO RELATED APPLICATIONS

This application is a Continuation application of PCT Application No. PCT/JP2015/081054, filed Nov. 4, 2015, the entire contents of all of which are incorporated herein by reference.

FIELD

Embodiments described herein relate generally to an anonymization system.

BACKGROUND

Companies and the like (to be referred to as data holders hereinafter) that hold an enormous amount of personal data such as customer information or clinical record information are increasing. Some data holders use information obtained by performing statistical processing for the enormous amount of personal data for the purpose of predicting the trend of a business or customer or preventing a disease, and then consider obtaining a new business finding or starting a new service.

However, when using the personal data for the above-described purposes, it is necessary to pay close attention in handling the personal data to protect privacy. In addition, because the statistical processing requires a high level of specialty, the data holders use companies or service providers (to be referred to as data analyzers hereinafter) which perform the statistical processing as outside services. For this reason, the data holder needs to more carefully notice the privacy protection and the purpose for use, and execute appropriate operations. The operations of this type include, for example, reducing the amount of personal data information to be provided to the data analyzer. However, if the amount of the personal data information is reduced too much from the viewpoint of privacy protection, a useful analysis result cannot be obtained.

Hence, in many cases, anonymization processing is used, which makes it difficult or impossible to specify an individual while preventing reduction of the amount of personal data information as much as possible. At this time, the data holder performs the anonymization of an enormous amount of personal data and provides obtained anonymized data to the outside data analyzer that performs the statistical processing.

On the other hand, there are cloud computing services (to be also referred to as cloud services hereinafter) as an example of the outside services. As the cloud services recently become widespread, equipment used to manage an enormous amount of data are changing from in-house servers of the data holders to the outside cloud services. At this time as well, the data holders take a security measure of, for example, encryption processing or anonymization processing for the enormous amount of personal data and causing the cloud services to manage obtained encrypted data or anonymized data.

M2M (machine to machine) services are also becoming popular in which devices, such as a vending machine, an elevator, or plant equipment (devices rather than information devices), are equipped with a sensor, a processing unit, a communication unit, and the like, and the M2M services perform information exchange, remote supervisory/control, and the like via a network without intervention of a human.

In such M2M services as well, services using an enormous amount of information collected from each device is expected to be implemented in the future.

In the M2M services as well, a security measure needs to be taken for personal data included in the collected information. On the other hand, if encryption processing is applied to the collected information as the security measure, the obtained encrypted data cannot be analyzed. However, if anonymization processing is applied for the security measure, the obtained anonymized data can be analyzed. The anonymized data can be analyzed by statistical processing, although information related to individuals, devices, locations, and the like cannot be identified. Hence, this method is preferable from the viewpoint of privacy protection.

Representative methods of anonymization processing include, for example, deletion, pseudonymization, top coding, grouping, resampling, sort, swapping, and noise addition (for example, see "Guideline for Creation/Providing of Anonymous Data, Annex 2, Technique of Anonymization Processing", [online], Mar. 28, 2011, Ministry of Public Management, Home Affairs, Posts and Telecommunications of the government of Japan, [searched on Apr. 25, 2014] Internet <URL: http://www.stat.go.jp/index/seido/pdf/35glv4.pdf>).

Here, "deletion" is a method of deleting identification information such as a household or a place of residence capable of directly or indirectly identifying an individual.

"Pseudonymization" is a method of deleting information such as a name capable of directly identifying an individual and assigning another ID or pseudonym.

"Top coding" is a method of grouping special attributes which has discriminatingly large or small values with respect to attributes such as an age or the number of house hold members and facilitates identification of individuals. For example, discriminatingly large or small are classified as values equal to or more than an upper threshold or values equal to or less than a lower threshold.

"Grouping" is a method of grouping by a specific value with respect to an attribute such as an age and changing the specific value to a class category. As for an age, for example, a specific value "age 23" is changed to a class category "20s".

"Resampling" is a method of providing only some of all data to the data analyzer, for example, extracting 80% data from all data at random and providing the extracted data to the data analyzer.

"Sort" is a method of changing the arrangement order of the records of data at random to make it impossible to specify individuals.

"Swapping" is a method of exchanging some attribute values between two records, for example, exchanging the ages or heights of two persons between the records of the two persons.

"Noise Addition" is a method of adding noises with respect to some attributes of records, for example, adding an noise to heights.

In the above-described anonymization processing, normally, no critical matter arises. However, according to discussion of embodiments of the present invention, there is room for improvement in both a case (A) in which the data holder saves encrypted data in an outside service and a case (B) in which the M2M service saves encrypted data in an outside service. A description will be made below using a cloud service as an example of the outside service.

(A) In a case in which the data holder simply encrypts personal data and saves the obtained encrypted data in a cloud system, the data holder downloaded the encrypted data, decrypts it, anonymizes the obtained personal data, and provides the anonymized data to the data analyzer. When the data holder downloads the encrypted data and decrypts it, the data holder obtains all personal data. This situation is not preferable because it makes the use of the cloud system not so meaningful for the data holder. Note that the situation in which the data holder obtains all personal data may be avoidable if the data holder does not decrypt the encrypted data.

Accordingly, a case in which the data holder converts the encrypted data such that it can be decrypted on the data analyzer side to provide the converted data to the data analyzer will be discussed. In this case, the situation in which the data holder obtains all personal data can be avoided. However, this is not preferable from the viewpoint of privacy protection because the personal data decrypted by the data analyzer is not anonymized.

A case in which the cloud system decrypts the encrypted data and anonymizes it will be discussed in consideration that the data holder anonymizes personal data without decryption of the encrypted data. In this case, the personal data obtained by the decryption is distributed within the cloud system. This is not preferable from the viewpoint of security.

A case will be discussed in which the data holder anonymizes personal data, encrypts the anonymized data, and saves the encrypted data in the cloud system, and the data analyzer downloads the encrypted data in the cloud system and decrypts the encrypted data. In this case, the encrypted data in the cloud system is obtained by encrypting the anonymized data information the amount of which is reduced from the original personal data. In this case, the data holder has to manage the original personal data independently of the cloud system. This is not preferable because it makes the use of the cloud system less meaningful for the data holder.

(B) When performing information collection or remote monitoring/control by use of each device of the M2M service, the data holder is required to provide, to the data analyzer, anonymized data the amount of information of which is reduced from the personal data in the collected information. If the data holder collects the personal data and saves it in the cloud system, the load on the data holder is heavy. Hence, it is preferable that the device collecting the personal data by itself saves the personal data in the cloud system. Even in the case in which the device collecting the personal data saves the personal data in the cloud system, however, the encrypted data obtained by encrypting the personal data may be saved in the cloud system from the viewpoint of security.

However, as in the case (A) described above, if the encrypted data is saved in the cloud system, an undesirable situation occurs in which the data holder obtains all personal data when the data holder downloads and decrypts the encrypted data.

Note that a method of anonymizing the encrypted data saved in the cloud system and providing the anonymized data to the data analyzer without applying the load of decryption processing or anonymization processing on the data holder is not known.

According to the study by the present inventor, he considers that the undesirable situations in the cases (A) and (B) can be avoidable if the encrypted data obtained by encrypting the personal data can be anonymized without decryption.

It is an object of embodiments of the present invention to provide an anonymization system configured to anonymize the encrypted data obtained by encrypting the personal data, without decryption of the encrypted data.

An anonymization system of an embodiment includes at least one encryption apparatus, at least one anonymization apparatus, and at least one decryption apparatus.

The at least one encryption apparatus includes first storage means and encryption means.

The first storage means stores personal data including one or more values for each item.

The encryption means generates encrypted data from the personal data by encrypting the one or more values for each item included in the personal data.

The anonymization apparatus includes second storage means and anonymization means.

The second storage means stores the encrypted data generated by the encryption apparatus.

The anonymization means generates encrypted anonymized data from the encrypted data without decryption by anonymizing the one or more values for at least a portion of the items in the encrypted data stored in the second storage means.

The decryption apparatus includes third storage means and decryption means.

The third storage means stores the encrypted anonymized data generated by the anonymization apparatus.

The decryption means generates anonymized data from the encrypted anonymized data by decrypting the encrypted anonymized data in the third storage means.

BRIEF DESCRIPTION OF THE DRAWINGS

FIG. 2 is a schematic view showing the arrangement of a modification of the first embodiment;

FIG. 3 is a schematic view showing an example of personal data according to the first embodiment;

FIG. 5 is a schematic view showing an example of encrypted data according to the first embodiment;

FIG. 6 is a schematic view showing an example of encrypted anonymized data according to the first embodiment;

FIG. 7 is a sequence chart for explaining an operation according to the modification of the first embodiment;

FIG. 9 is a schematic view showing an anonymization system according to the second embodiment and its peripheral arrangement;

FIG. 10 is a sequence chart for explaining an operation according to the second embodiment;

FIG. 12 is a schematic view showing an example of personal data according to the third embodiment;

FIG. 13 is a schematic view showing an example of encrypted data according to the third embodiment;

FIG. 14 is a schematic view showing an example of encrypted anonymized data according to the third embodiment;

FIG. 18 is a schematic view showing an example of personal data according to the fifth embodiment;

FIG. 19 is a schematic view showing an example of encrypted data according to the fifth embodiment;

FIG. 20 is a schematic view showing an example of encrypted anonymized data according to the fifth embodiment;

FIG. 22 is a sequence chart for explaining an operation according to the seventh embodiment;

FIG. 25 is a schematic view showing an example of encrypted data according to the ninth embodiment;

FIG. 26 is a schematic view showing an example of encrypted anonymized data according to the ninth embodiment;

FIG. 31 is a sequence chart for explaining an operation according to the 10th embodiment;

FIG. 33 is a schematic view showing an example of encrypted data according to the 11th embodiment;

FIG. 34 is a schematic view showing an example of encrypted anonymized data according to the 11th embodiment;

FIG. 35 is a sequence chart for explaining an operation according to the 12th embodiment;

FIG. 37 is a schematic view showing an example of encrypted data according to the 13th embodiment;

FIG. 38 is a schematic view showing an example of encrypted anonymized data according to the 13th embodiment;

FIG. 39 is a sequence chart for explaining an operation according to a modification of the 13th embodiment;

FIG. 43 is a schematic view for explaining the outline of each embodiment; and

FIG. 44 is a schematic view for explaining the outline of each embodiment.

DETAILED DESCRIPTION

Figure 1:
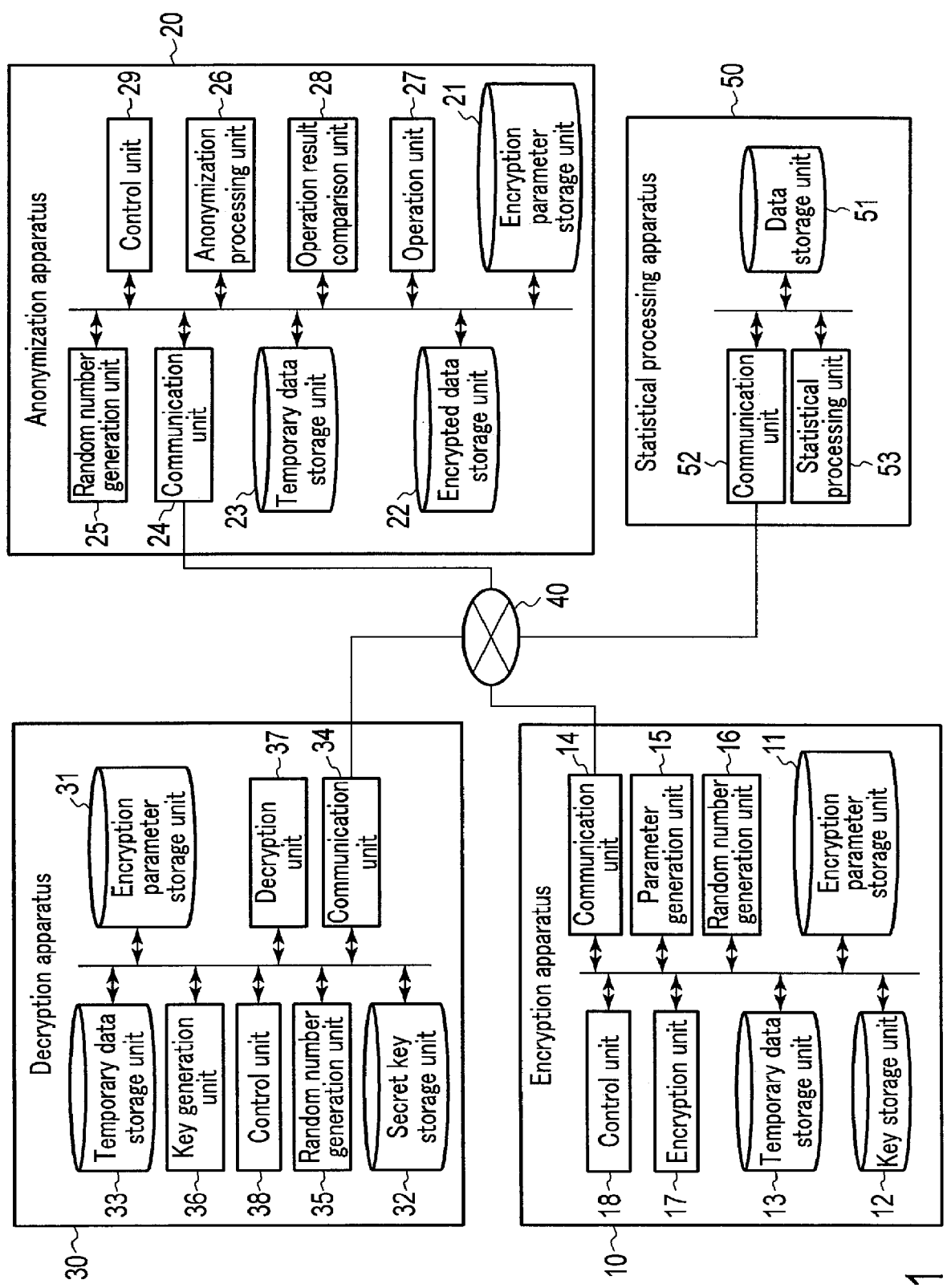
FIG. 1 is a schematic view showing an anonymization system according to the first embodiment and its peripheral arrangement.

The embodiments will now be described with reference to the accompanying drawings. Various kinds of encryption methods and the like individually used in the embodiments will be described before that. Each apparatus used in the embodiments can be implemented by either a hardware arrangement or a combined arrangement of a hardware resource and software. The software in the combined arrangement uses a program installed in advance from a network or a storage medium to the computer of a corresponding apparatus to implement the function of the corresponding apparatus.

<Various Encryption Methods>

As techniques of performing statistical processing using encrypted data, there are known methods capable of executing various kinds of processing such as addition/subtraction and magnitude comparison of data in an encrypted state with respect to the original data. As the methods of this type, there exist first to fourth methods described in, for example, the first literature ([Paillier]), the second literature ([OPE]), the third literature ([HLP10]), and the fourth literature ([AN2013-51001]). Pieces of information about the literatures ([Paillier], [OPE], [HLP10], and [AN2013-51001]) are as follows:

[Paillier] Pascal Paillier, Public-Key Cryptosystems Based on Composite Degree Residuosity Classes, EUROCRYPT 1999, pp. 223-238.

[OPE] A. Boldyreva, N. Chenette, Y. Lee and A. O'Neill. Order-preserving symmetric encryption. In Eurocrypt '09, pp. 224{241. Springer, 2009.

[HLP10] C-Y. Hsu, C-S. Lu, S-C. Pei, "Homomorphic Encryption-based Secure SIFT for Privacy-Preserving Feature Extraction", Proceedings of SPIE—The International Society for Optical Engineering, 2011.

[AN2013-51001] Japanese Patent Application No. 2013-051001 (filed on Mar. 13, 2013; see Japanese Patent Application KOKAI Publication No. 2014-178379 published on Sep. 25, 2014 which was not laid open to the public prior to the earliest priority date of the present application).

The first method is an encryption method capable of performing addition/subtraction in an encrypted state (to be referred to as homomorphic encryption hereinafter), and is also called a "Paillier" method.

The second method is the order preserving encryption method in which the magnitude relationship between cipher texts and that between corresponding plain texts match, and is also called an "OPE" method.

The third method is a homomorphic encryption method capable of performing the magnitude comparison, and is also called an "HLP10" method.

The fourth method is a homomorphic encryption method capable of performing the magnitude comparison, and is also called an "AN2013-51001" method.

In each embodiment, data encrypted by the methods of these types is anonymized. At this time, since the original data has already been encrypted, the encrypted data can be provided to outside before anonymization. Hence, the encrypted data can be stored in the outside service such as the cloud service. In addition, the encrypted anonymized data obtained by anonymizing the encrypted data may be decrypted to obtain the anonymized data.

The representative algorithms of each method of performing an operation in the encrypted state will be described below.

First, the (additive) homomorphic encryption method (the "Paillier" method) will be explained. The basic model of the "Paillier" method is formed from the following five functions (to be also referred to as algorithms hereinafter) of key generation, encryption, cipher text addition, cipher text subtraction, and decryption.

(Key Generation) KeyGen($1^k$)→(pk$_A$, sk$_A$)

When a security parameter $1^k$ is input, a key generation algorithm KeyGen outputs a set (pk$_A$, sk$_A$) of a public key pk$_A$ and a secret key sk$_A$.

(Encryption) Enc(pk$_A$, m1)→C$_{A,m1}$

When the public key pk$_A$ of a user A and a plain text m1 are input, an encryption algorithm Enc outputs a cipher text C$_{A,m1}$ addressed to the user A.

(Cipher Text Addition) Add(C$_{A,m1}$, C$_{A,m2}$)→C$_{A,m1+m2}$

When the cipher texts C$_{A,m1}$ and C$_{A,m2}$ addressed to the user A are input, an addition algorithm Add outputs a cipher text C$_{A,m1+m2}$ addressed to the user A.

(Cipher Text Subtraction) Sub(C$_{A,m1}$, C$_{A,m2}$)→C$_{A,m1-m2}$

When the cipher texts C$_{A,m1}$ and C$_{A,m2}$ addressed to the user A are input, a subtraction algorithm Sub outputs a cipher text C$_{A,m1-m2}$ addressed to the user A.

(Decryption) Dec(sk$_A$, C$_{A,m1+m2}$)→m1+m2

When the secret key sk$_A$ for the user A and the cipher text C$_{A,m1+m2}$ addressed to the user A are input, a decryption algorithm Dec outputs a plain text m1+m2.

The order preserving encryption method (e.g. the "OPE" method) capable of performing the magnitude comparison will be described. The basic model of the "OPE" method is formed from the following four functions (to be also referred to as algorithms hereinafter) of key generation, encryption, cipher text comparison, and decryption.

(Key Generation) KeyGen($1^k$)→(sk$_A$)

When the security parameter $1^k$ is input, the key generation algorithm KeyGen outputs the secret key sk$_A$.

(Encryption) Enc(sk$_A$, m1)→C$_{A,m1}$

When the secret key sk$_A$ and the plain text m1 are input, the encryption algorithm Enc outputs the cipher text C$_{A,m1}$.

(Cipher text comparison)Comp(C$_{A,m1}$, C$_{A,m2}$) → $\begin{cases} 1 & (\text{If } m1 > m2) \\ 0 & (\text{If } m1 = m2) \\ -1 & (\text{If } m1 < m2) \end{cases}$ When the cipher texts C$_{A,m1}$ and C$_{A,m2}$ are input, the cipher text comparison algorithm Comp outputs "1" if m1 is larger than m2, outputs "0" if m1 equals m2, and outputs "−1" if m1 is smaller than m2.

(Decryption) Dec(sk$_A$, C$_{A,m1}$)→m1

When the secret key sk$_A$ and the cipher text C$_{A,m1}$ are input, the decryption algorithm Dec outputs the plain text m1.

Next, the encryption method having the characteristics of the (additive) homomorphic encryption method and the order preserving encryption method (e.g. the "HLP10" method or the "AN2013-51001" method) which is capable of performing the magnitude comparison will be explained. The basic model of this encryption method is formed from the following six functions (to be also referred to as algorithms hereinafter) of key generation, encryption, cipher text addition, cipher text subtraction, cipher text comparison, and decryption.

(Key Generation) KeyGen($1^k$)→(sk$_A$)

When the security parameter $1^k$ is input, the key generation algorithm KeyGen outputs the secret key sk$_A$.

(Encryption) Enc(sk$_A$, m1)→C$_{A,m1}$

When the secret key sk$_A$ and the plain text m1 are input, the encryption algorithm Enc outputs the cipher text C$_{A,m1}$.

(Cipher Text Addition) Add(C$_{A,m1}$, C$_{A,m2}$)→C$_{A,m1+m2}$

When the cipher texts C$_{A,m1}$ and C$_{A,m2}$ are input, the addition algorithm Add outputs the cipher text C$_{A,m1+m2}$.

(Cipher Text Subtraction) Sub(C$_{A,m1}$, C$_{A,m2}$)→C$_{A,m1-m2}$

When the cipher texts C$_{A,m1}$ and C$_{A,m2}$ are input, the subtraction algorithm Sub outputs the cipher text C$_{A,m1-m2}$.

(Cipher text comparison)Comp(C$_{A,m1}$, C$_{A,m2}$) → $\begin{cases} 1 & (\text{If } m1 > m2) \\ 0 & (\text{If } m1 = m2) \\ -1 & (\text{If } m1 < m2) \end{cases}$ When the cipher texts C$_{A,m1}$ and C$_{A,m2}$ are input, the cipher text comparison algorithm Comp outputs "1" if m1 is larger than m2, outputs "0" if m1 equals m2, and outputs "−1" if m1 is smaller than m2.

(Decryption) Dec(sk$_A$, C$_{A,m1+m2}$)→m1+m2

When the secret key sk$_A$ and the cipher text C$_{A,m1+m2}$ are input, the decryption algorithm Dec outputs the plain text m1+m2.

Examples of detailed algorithms of the functions of the "AN2013-51001" method based on the above-described model will be described. Unlike the other methods, the "AN2013-51001" method is not published at the time of the earliest priority date of the present application. Hence, examples of the algorithms of the functions will be described in detail.

(Key Generation) KeyGen($1^k$)→(a, $g^{sv}$, g, N, $a^{-1}$, s, v)

When the security parameter $1^k$ is input, the key generation algorithm KeyGen outputs encryption keys a, $g^{sv}$, g, and N, secondary operation keys $a^{-1}$, s, and N, ternary operation keys v and N, and decryption keys sv, $a^{-1}$, and N (or s, v, $a^{-1}$, and N).

An example of key generation processing by the key generation algorithm KeyGen will be described below in detail.

First, the key generation algorithm KeyGen generates primes p and q from which primes p'=(p−1)/2 and q'=(q−1)/2 are obtained. The primes p and q are generated based on a security parameter λ corresponding to the security parameter $1^k$ such that the number of bits of a composite number N=pq becomes equal to or larger than λ.

Next, the key generation algorithm KeyGen calculates parameters pp'qq' and N.

Next, the key generation algorithm KeyGen generates a multiplicative group G whose order is pp'qq', and selects an element g of G from G at random. To generate the multiplicative group G whose order is pp'qq', for example, an element of $Z_N2^*$ is selected from $Z_N2^*$ at random, and a value obtained by squaring the selected element is obtained as g, where $Z_N2^*$ is a set (=$(Z/N^2Z)^*$) of integers that are prime relative to $Z_N2$ and $N^2$, and can be called a multiplicative group $Z_N2^*$ corresponding to the composite number $N^2$. $Z_N2$ is a set (=$(Z/N^2Z)$) of integers ranging from 0 (inclusive) to $N^2$ (exclusive).

Note that in this specification, $Z_N2^*$ represents $Z^*_{N^2}$

Next, based on the parameters pp'qq' and N calculated previously, the key generation algorithm KeyGen selects some keys a, s, and v from a set {1, . . . , pp'qq'} at random.

Subsequently, the key generation algorithm KeyGen calculates the value of $a^{-1}$ and the value of $g^{sv}$ which satisfy a·$a^{-1}$ mod $N^2$=1. After that, the key generation algorithm KeyGen outputs the encryption keys a, $g^{sv}$, g, and N, the secondary operation keys $a^{-1}$, s, and N, the ternary operation keys v and N, and the decryption keys sv, $a^{-1}$, and N (or s, v, $a^{-1}$, and N).

Note that the encryption keys may be a, sv, g, and N or a, s, v, g, and N. Instead of including g, N, and $N^2$ in the encryption keys, the secondary operation keys, and the ternary operation keys, they may be open to each apparatus as public parameters. In sum, the encryption keys include a, s, and v (or a and sv). The secondary operation keys include $a^{-1}$ and s. The ternary operation keys include v.

These also apply to the embodiments and modifications to be described later.

The key generation processing is thus completed. Note that in this specification, a description assuming G as a multiplicative group is employed. However, the present invention is not limited to this, and a description assuming G as an additive group may be alternatively used.

(Encryption) Enc(m)→C=($C_1$, $C_2$)

When an encryption key and a plain text m are input, the encryption algorithm Enc outputs a cipher text C=($C_1$, $C_2$).

An example of the encryption processing by the encryption algorithm Enc will be described below in detail.

An example will be described here in which the encryption algorithm Enc encrypts k plain texts $m_1$, ..., $m_k$ (numerical data to be encrypted) (k is a natural number) will be described here. Each plain text $m_i$ is an element of $Z_N$. $Z_N$ is a set (=(Z/NZ)) of integers ranging from 0 (inclusive) to N (exclusive).

First, the encryption algorithm Enc selects k random numbers $r_1$, ..., $r_k$ from $Z_N2^*$ at random. Next, using the generated random numbers $r_1$, ..., $r_k$ and the above-described encryption keys a, $g^{sv}$, g, and N, the encryption algorithm Enc encrypts the plain texts $m_1$, ..., $m_k$ by the following formulas:

$$C_i = (C_{i,1}, C_{i,2})(i=1, \ldots, k),$$

$$C_{i,1} = g^{r_i} \mod N^2,$$

$$C_{i,2} = g^{svr_i}(1+am_iN) \mod N^2.$$

Cipher texts $C_i$ (i=1, ..., k) are thus generated. Note that the encryption key a may be generated by a key generation apparatus with the key generation algorithm KeyGen installed or an encryption apparatus with the key generation algorithm KeyGen installed. In the latter case, the key generation apparatus transmits the encryption keys $g^{sv}$, g, and N to the encryption apparatus. The encryption apparatus generates the encryption key a and calculates the value of $a^{-1}$. Note that if the encryption apparatus does not know the value of pp'qq', the encryption apparatus may select the encryption key a from $Z_N2^*$ at random.

The encryption processing is thus completed.

(Primary Operation Processing of Cipher Text) $Cal_{1st}$(C)→X=($X_1$, $X_2$)

When the cipher text C is input, a primary operation processing algorithm $Cal_{1st}$ outputs a primary operation result X=($X_1$, $X_2$).

An example of the primary operation processing by the primary operation processing algorithm $Cal_{1st}$ will be described below in detail.

The primary operation processing of this example is processing of adding/subtracting a cipher text (encrypted data).

Taking, for example, a case in which whether the result of an equation F is positive or negative is determined by ternary operation processing (to be described later), the primary operation processing will be described.

$$F = \sum_{i \in K} n_i m_i$$

where $n_i$ is an arbitrary integer. K is a set of indices i necessary for the calculation of the equation F. For example, if F=2$m_1$−$m_2$, $n_1$=2, $n_2$=−1, and K={1, 2}. To determine the magnitude relationship between a minuend $m_a$ and a subtrahend $m_b$ in the equation F of addition/subtraction, for example, F=$m_a$−$m_b$=3$m_2$−4$m_3$+$m_5$ is set, wherein $n_2$=3, $n_3$=−4, $n_5$=1, and K={2, 3, 5}. Here, the minuend $m_a$ is 3$m_2$+$m_5$, and the subtrahend $m_b$ is 4$m_3$. To determine the magnitude relationship between numerical values a and b, F=$m_a$−$m_b$=$m_1$−$m_2$ is calculated by setting $n_1$=1, $n_2$=−1, and K={1, 2}.

If the cipher text $C_i$ (i∈K) necessary for the calculation of the equation F is input, the primary operation processing algorithm $Cal_{1st}$ calculates the primary operation result X=($X_1$, $X_2$) by the following equations:

$$X_1 = \prod_{i \in K} C_{i,1}^{n_i} \mod N^2,$$

$$X_2 = \prod_{i \in K} C_{i,2}^{n_i} \mod N^2.$$

After that, the primary operation processing algorithm $Cal_{1st}$ outputs the primary operation result X=($X_1$, $X_2$).

The primary operation processing is thus completed.

(Secondary Operation Processing of Cipher Text) $Cal_{2nd}$(X)→Y=($Y_1$, $Y_2$)

When the primary operation result X and the secondary operation keys $a^{-1}$, s, and N are input, a secondary operation processing algorithm $Cal_{2nd}$ outputs a secondary operation result Y=($Y_1$, $Y_2$).

An example of secondary operation processing by the secondary operation processing algorithm $Cal_{2nd}$ will be described below in detail.

The secondary operation processing of this example is processing of randomizing an added/subtracted cipher text (encrypted data).

The secondary operation processing algorithm $Cal_{2nd}$ generates parameters L, J, β, and D. Indices used to select the parameters L, J, β, and D will be described later. Note that the parameters L, J, β, and D may be given from outside.

Next, the secondary operation processing algorithm $Cal_{2nd}$ selects β random numbers $r'_i$ (i=0, ..., β−1) from a set {1, ..., L} at random. Here, β=1 or β≥2 may be taken. This also applies to the other embodiments and modifications. In addition, the secondary operation processing algorithm $Cal_{2nd}$ selects a random number z from a set {0, 1, ..., J} at random. The secondary operation processing algorithm $Cal_{2nd}$ then calculates a random number R given by the following equation to acquire the random numbers R and z:

$$R = \prod_{i=0}^{\beta-1} r'_i$$

Using the secondary operation keys $a^{-1}$, s, and N, the primary operation result X=($X_1$, $X_2$), and the random numbers R and z as described above, the secondary operation processing algorithm $Cal_{2nd}$ calculates the secondary operation result $Y=(Y_1, Y_2)$ by the following equations:

$$Y_1 = X_1^{a^{-1}Rs} \bmod N^2,$$

$$Y_2 = X_2^{a^{-1}R}(1-zN) \bmod N^2.$$

After that, the secondary operation processing algorithm $Cal_{2nd}$ outputs the secondary operation result $Y=(Y_1, Y_2)$.

Indices used to select the parameters will be described here. Let D be the maximum value of an absolute value for which the positive/negative determination can be made. That is, it is necessary to determine F as positive if $0 < F < D$ and determine F as negative If $-D < F < 0$. At this time, the secondary operation processing algorithm $Cal_{2nd}$ selects $\beta$ random numbers $r'_i$ so as to satisfy the following formula:

$$L^\beta D < N/2$$

In addition, when R that is the product of the $\beta$ random numbers $r'_i$ is selected as described above, the secondary operation processing algorithm $Cal_{2nd}$ selects J such that the probability of $R<J$ becomes sufficiently low.

The secondary operation processing is thus completed.

(Ternary Operation Processing of Cipher Text)

$$Cal_{3rd}(Y) = \begin{cases} \text{Positive} \\ \text{Negative(or 0)} \end{cases}$$

When the secondary operation result Y and the ternary operation keys v and N are input, a ternary operation processing algorithm $Cal_{3rd}$ outputs a determination result representing a positive value or a negative value (or 0).

An example of ternary operation processing by the ternary operation processing algorithm $Cal_{3rd}$ will be described below in detail.

The ternary operation processing of this example is processing of determining the magnitude relationship between a minuend and a subtrahend in the equation of addition/subtraction from the randomized and added/subtracted cipher text (encrypted data).

Using the ternary operation keys v and N and the secondary operation results $Y_1$ and $Y_2$ described above, the ternary operation processing algorithm $Cal_{3rd}$ calculates W' by the following equation:

$$W' = \left(\frac{Y_2}{Y_1^v} \bmod N^2\right) - 1.$$

If W' is not a multiple of N, a subsequent calculation is not performed, and the ternary operation processing is ended. Otherwise (if W' is a multiple of N), the ternary operation processing algorithm $Cal_{3rd}$ calculates a ternary operation result W by the following equation:

$$W = W'/N$$
$$= FR - z.$$

Next, the ternary operation processing algorithm $Cal_{3rd}$ determines that the equation F is positive if $W<N/2$, and otherwise, determines that the equation F is negative (or 0).

In a form of $F=M_a-M_b$, if F is positive, it can be determined that $M_a > M_b$. If F is negative, it can be determined that $M_a \leq M_b$.

After that, the ternary operation processing algorithm $Cal_{3rd}$ outputs the determination result.

The ternary operation processing is thus completed.

Note that at the time of determination, if $-J \leq W \leq 0$, the ternary operation processing algorithm $Cal_{3rd}$ may determine that $F=0$. In this case, if $-N/2 < W < -J$, the ternary operation processing algorithm $Cal_{3rd}$ determines that F is negative. This also applies to the other embodiments and modifications.

Using an example in which $F=3m_2-4m_3+m_5$, obtaining $W=FR-z$ will be described. The primary operation results $X_1$ and $X_2$, the secondary operation results $Y_1$ and $Y_2$, and the ternary operation result W are represented by the following equations respectively:

$$X_1 = C_{2,1}^3 C_{3,1}^{-4} C_{5,1}$$
$$= g^{3r_2} g^{-4r_3} g^{r_5}$$
$$= g^{3r_2 - 4r_3 + r_5},$$

$$X_2 = C_{2,2}^3 C_{3,2}^{-4} C_{5,2}$$
$$= \{g^{r_2 sv}(1+am_2N)\}^3 \{g^{r_3 sv}(1+am_3N)\}^{-4} \{g^{r_5 sv}(1+am_5N)\}$$
$$= \{g^{(3r_2-4r_3+r_5)sv}(1+3m_2aN)(1-4m_3aN)(1+m_5aN)\}$$
$$= g^{(3r_2-4r_3+r_5)sv}\{1 + (3m_2 - 4m_3 + m_5)aN\}.$$

$$Y_1 = g^{(3r_2-4r_3+r_5)a^{-1}Rs},$$
$$Y_2 = g^{(3r_2-4r_3+r_5)a^{-1}Rsv}\{1 + 3m_2 - 4m_3 + m_5)aN\}^{a^{-1}R}(1-zN)$$
$$= g^{(3r_2-4r_3+r_5)a^{-1}Rsv}\{1 + (3m_2 - 4m_3 + m_5)RN\}(1-zN)$$
$$= g^{(3r_2-4r_3+r_5)a^{-1}Rsv}\{1 + (3m_2 - 4m_3 + m_5)RN - zN\}.$$

$$W = \left\{\left(\frac{g^{(3r_2-4r_3+r_5)a^{-1}Rsv}\{1 + (3m_2-4m_3+m_5)RN-zN\}}{g^{(3r_2-4r_3+r_5)a^{-1}Rsv}} \bmod N^2\right) - 1\right\}/N$$
$$= \{(1 + (3m_2 - 4m_3 + m_5)RN - zN) - 1\}/N$$
$$= \{(3m_2 - 4m_3 + m_5)RN - zN\}/N$$
$$= (3m_2 - 4m_3 + m_5)R - z$$
$$= FR - z.$$

In the ternary operation result, $W=FR-z$. That is, z is subtracted from FR. However, if the value of R is appropriately set as described above, the ternary operation processing algorithm $Cal_{3rd}$ can correctly perform positive/negative determination for F without being influenced by the value of the random number z.

In the above-described example, since $F=M_a-M_b=3m_2-4m_3+m_5$, for example, if the minuend is set to $M_a=3m_2+m_5$, and the subtrahend is set to $M_b=4m_3$, the magnitude relationship between the minuend $(3m_2+m_5)$ and the subtrahend $(4m_3)$ can be determined. In addition, for example, if the minuend and the subtrahend are regarded as $M_a=3m_2$ and $M_b=4m_3-m_5$, the magnitude relationship between the minuend $(3m_2)$ and the subtrahend $(4m_3-m_5)$ can be determined.

(Decryption) $Dec(C) \to m$

When the decryption keys sv, $a^{-1}$, and N (or s, v, $a^{-1}$, and N) and the cipher text C are input, the decryption algorithm Dec outputs the plain text m.

An example of decryption processing by the decryption algorithm Dec will be described below in detail.

Using the decryption keys sv, $a^{-1}$, and N (or s, v, $a^{-1}$, and N) and the cipher text $C_i$, the decryption algorithm Dec calculates D' by the following equation:

$$D' = \{(C_{i,2}/C_{i,1}^{sv_i})^{a^{-1}} \bmod N^2\} - 1.$$

If D' is not a multiple of N, a subsequent calculation is not performed, and the decryption processing is ended. Otherwise (if D' is a multiple of N), the decryption algorithm Dec calculates the plain text $m_i$ by the following equation:

$$m_i = D'/N.$$

After that, the decryption algorithm Dec outputs the plain texts $m=m_i$ (i=1, . . . , k).

The decryption processing is thus completed.

On the other hand, as a technique of encrypting data, a method using the same key for encryption and decryption is also known. As a method of this type, for example, there is a fifth method (to be also referred to as an "AES" method hereinafter) described in the fifth literature. Information about the fifth literature ([AES]) is as follows.

[AES] AES (Advanced Encryption Standard): FIPS-197, http://csrc.nist.gov/publications/fips/fips197/fips-197.pdf The method (e.g. the "AES" method) using the same key for encryption and decryption will be described. The basic model of the encryption method holding the characteristic of the "AES" method is formed from the following three functions (to be also referred to as algorithms hereinafter) of key generation, encryption, and decryption.

(Key Generation) KeyGen($1^k$)→(sk$_A$)

When the security parameter $1^k$ is input, the key generation algorithm KeyGen outputs the secret key sk$_A$.

(Encryption) Enc(sk$_A$, m1)→C$_{A,m1}$

When the secret key sk$_A$ and the plain text m1 are input, the encryption algorithm Enc outputs the cipher text C$_{A,m1}$.

(Decryption) Dec(sk$_A$, C$_{A,m1}$)→m1

When the secret key sk$_A$ and the cipher text C$_{A,m1}$ are input, the decryption algorithm Dec outputs the plain text m1+m2.

The representative algorithms of various kinds of encryption methods (the "Paillier"] method, the "OPE" method, the "HLP10" method, the "AN2013-51001" method, and the "AES" method) individually used in the embodiments have been described above. In each embodiment, as shown in FIG. 43 or 44, encrypted data obtained by the various kinds of encryption methods (the "Paillier" method, the "OPE" method, . . . ) is anonymized (pseudonymization, top coding, . . . ) without decryption. Note that FIG. 43 shows the above-described case (A) in which the data holder saves encrypted data in the outside service. FIG. 44 shows the above-described case (B) in which the M2M service saves encrypted data in the outside service.

First Embodiment: Pseudonymization

FIG. 1 is a schematic view showing an anonymization system according to the first embodiment and its peripheral arrangement. The anonymization system includes at least one encryption apparatus 10, an anonymization apparatus 20, and a decryption apparatus 30. The apparatuses 10, 20, and 20 are connected to each other via a communication network 40. The communication network 40 is connected to a statistical processing apparatus 50. The communication network 40 is, for example, a wireless LAN (Local Area Network), a wired LAN, an optical network, a telephone network, an intranet, an Ethernet®, or the Internet, or any combination thereof.

The encryption apparatus 10 includes an encryption parameter storage unit 11, a key storage unit 12, a temporary data storage unit 13, a communication unit 14, a parameter generation unit 15, a random number generation unit 16, an encryption unit 17, and a control unit 18. Note that in this embodiment, a case in which one encryption apparatus 10 is used will be described. A case in which a plurality of encryption apparatuses are used will be described in the second embodiment.

The encryption parameter storage unit 11, the key storage unit 12, and the temporary data storage unit 13 can be implemented as storage devices or storage areas of a storage device readable/writable by a processor (not shown), and the storage devices or areas store an encryption parameter, an encryption key, and temporary data, respectively. The temporary data storage unit 13 constitutes a first storage means for storing personal data including a value for each item.

The communication unit 14, the parameter generation unit 15, the random number generation unit 16, the encryption unit 17, and the control unit 18 are functional blocks implemented by, for example, a program including steps to be executed by a processor (not shown) in the encryption apparatus 10 (to be described later). The encryption unit 17 includes an encryption means for generating encrypted data from personal data by encrypting the value of each item included in the personal data. The encryption unit 17 also includes a parameter encryption means for generating an encrypted anonymization parameter by encrypting an anonymization parameter to be used in anonymization processing. Note that as the anonymization parameter, for example, a random number, a threshold, a lower limited value, an upper limit value, a representative value, an noise, or the like can appropriately be used. In this embodiment, the random number is used as the anonymization parameter. As the encrypted anonymization parameter, for example, an encrypted random number, an encrypted threshold, an encrypted lower limited value, an encrypted upper limit value, an encrypted representative value, an encrypted noise, or the like can appropriately be used. In this embodiment, the encrypted random number is used as the encrypted anonymization parameter. However, the parameter encryption means is not necessarily used and can be omitted, as will be described in the 13th and 14th embodiments.

The anonymization apparatus 20 includes an encryption parameter storage unit 21, an encrypted data storage unit 22, a temporary data storage unit 23, a communication unit 24, a random number generation unit 25, an anonymization processing unit 26, an operation unit 27, an operation result comparison unit 28, and a control unit 29.

The encryption parameter storage unit 21, the encrypted data storage unit 22, and the temporary data storage unit 23 can be implemented as storage devices or storage areas of a storage device, which are readable/writable by a processor (not shown) and store an encryption parameter, encrypted data, and temporary data, respectively. The temporary data storage unit 23 includes a second storage means for storing encrypted data generated by the encryption apparatus 10.

The communication unit 24, the random number generation unit 25, the anonymization processing unit 26, the operation unit 27, the operation result comparison unit 28, and the control unit 29 are functional blocks implemented by, for example, a program including steps to be executed by a processor (not shown) in the anonymization apparatus 20 (to be described later). The anonymization processing unit 26 includes an anonymization means for generating encrypted anonymized data from encrypted data by processing of anonymizing the values of some items of the encrypted data in the second storage means without decryption. The anonymization means has a function of generating the encrypted anonymized data from the encrypted data based on the encrypted anonymization parameter generated by the encryption apparatus 10. However, this function is omitted of the encrypted anonymization parameter is not used, as will be described in the 13th and 14th embodiments.

The decryption apparatus 30 includes an encryption parameter storage unit 31, a secret key storage unit 32, a temporary data storage unit 33, a communication unit 34, a random number generation unit 35, a key generation unit 36, a decryption unit 37, and a control unit 38.

The encryption parameter storage unit 31, the secret key storage unit 32, and the temporary data storage unit 33 can be implemented as storage devices or storage areas of a storage device, which are readable/writable by a processor (not shown) and store an encryption parameter, a secret key, and temporary data, respectively. The temporary data storage unit 33 includes a third storage means for storing encrypted anonymized data generated by the anonymization apparatus 20.

The communication unit 34, the random number generation unit 35, the key generation unit 36, the decryption unit 37, and the control unit 38 are functional blocks implemented by, for example, a program including steps to be executed by a processor (not shown) in the decryption apparatus 30 (to be described later). The decryption unit 37 includes a decryption means for generating anonymized data from encrypted anonymized data by decrypting the encrypted anonymized data in the third storage means. Here, the anonymized data may be information including, for example, values obtained by anonymizing the values of some items of personal data and the values of items other than the some items. In addition, for example, the encrypted anonymized data may be information including values obtained by anonymizing the encrypted values of some items included in encrypted data and the values of items other than the some items included in the encrypted data. Note that in the encrypted anonymized data, "values obtained by anonymizing the encrypted values of some items included in the encrypted data" may be replaced with "values obtained by encrypting the the anonymized values of some items included in the anonymized data".

The statistical processing apparatus 50 includes a data storage unit 51, a communication unit 52, and a statistical processing unit 53.

The data storage unit 51 can be implemented as a storage device or a storage area of a storage device, which are readable/writable by a processor (not shown) and store anonymized data and statistical data.

The communication unit 52 and the statistical processing unit 53 are functional blocks implemented by, for example, a program including steps to be executed by a processor (not shown) in the statistical processing apparatus 50 (to be described later).

Note that FIG. 1 shows a case in which each of the apparatuses 10, 20, 30, and 50 is formed by a single apparatus. However, the present invention is not limited to it, and the apparatuses 10, 20, 30, and 50 may each include a one or more arbitrary number of apparatuses. Referring to FIG. 1, the anonymization apparatus 20 has the encrypted data storage function (e.g. encrypted data storage unit 22), and the decryption apparatus 30 has the function (e.g. the units 31, 33 to 36, and 38) for the key generation. However, the present invention is not limited to this, and those functions may be arranged in another apparatus, as shown in, for example, FIG. 2. This also applies to each arbitrary apparatus and each arbitrary function.

This embodiment is directed to a technique of pseudonymizing the personal data with an encrypted stuff identification number as one item of the personal data.

The personal data are information about individuals, and a specific individual can be identified by single information or a combination of a plurality of pieces of information such as a name, staff identification number, age, income, birthday, and other information. "Personal data" may be called "personal information" or "data of personal information". In this embodiment, as shown by an example in FIG. 3, attribute values (e.g. character strings or numerical values) for attribute items such as name, staff identification number, age, and income are used as personal data, and the personal data are stored in a table T1. Here, the character string is used as the attribute value for the attribute item "name". A numerical value is used as the attribute value for the attribute item "staff identification number" (however, since the staff identification number is ID information, a combination of a character string and a numerical value may be used). Numerical values are used as the attribute values for the attribute items "age" and "income". The table T1 may include the personal data which are the attribute values for the illustrated attribute items, and may also additionally include information other than the personal data which are attribute values for other attribute items (not shown). At any rate, the personal data are listed in the table T1. As the attribute items whose attribute values represent information other than the personal data, for example, the name of a disease, the name of bought merchandise, a reply to a questionnaire, or the like can appropriately be used. Note that the term "attribute item" may simply be called "attribute" or "item", or may be called "attribute information" or "item information". Similarly, the term "attribute value" may simply be called "value".

The personal data anonymization is processing of converting the personal data to make specific individuals unidentifiable. As the anonymization processing, the above-described methods are known.

These definitions also apply to the following embodiments and modifications.

Figure 4:
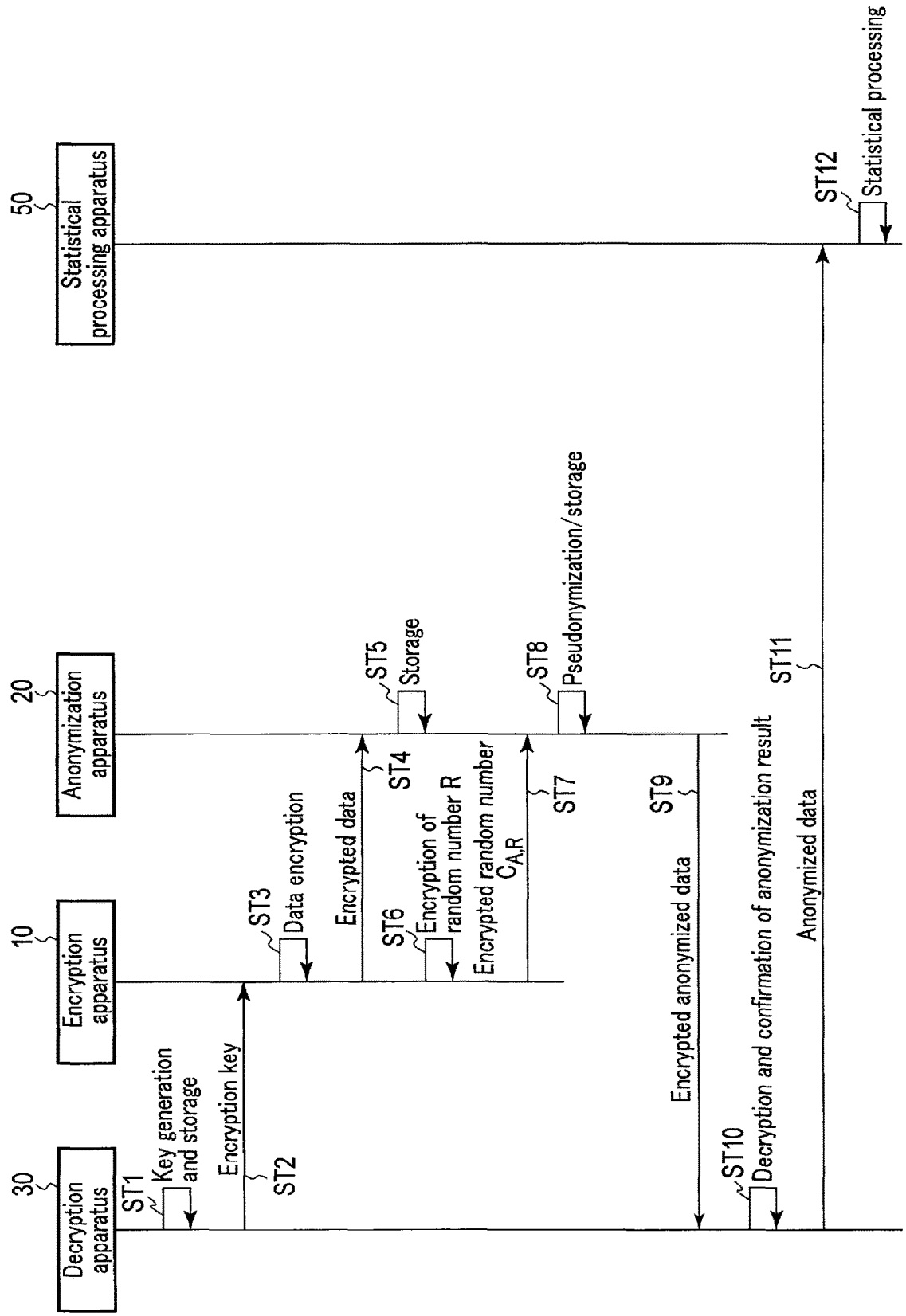
FIG. 4 is a sequence chart for explaining an operation according to the first embodiment.

The operation of the anonymization system according to this embodiment will be described next with reference to the sequence chart of FIG. 4 and the schematic views of FIGS. 3, 5, and 6. In the following explanation, a case in which anonymization is performed using an (additive) homomorphic encryption method will be described as an example.

(Preparation)

In step ST1, the key generation unit 36 of the decryption apparatus 30 generates a key pair (a public key $pk_A$ and a secret key $sk_A$) in the homomorphic encryption method based on a security parameter ($1^k$) stored in the encryption parameter storage unit 31.

KeyGen($1^k$)→($pk_A$, $sk_A$)

Note that the key generation unit 36 can acquire a random number necessary for the key pair generation from the random number generation unit 35. The key generation unit 36 of the decryption apparatus 30 saves the generated key pair ($pk_A$, $sk_A$) in the secret key storage unit 32. Here, the public key $pk_A$ is an encryption key, and the secret key $sk_A$ is a decryption key.

In step ST2, the control unit 38 of the decryption apparatus 30 sends the public key $pk_A$ that is an encryption key to the encryption apparatus 10 via the communication unit 34. The control unit 18 of the encryption apparatus 10 stores the public key $pk_A$ received by the communication unit 14 in the key storage unit 12.

In step ST3, the encryption unit 17 of the encryption apparatus 10 reads out the table T1 shown in FIG. 3 from the temporary data storage unit 13. For each record, the encryption unit 17 encrypts attribute value data$_i$ for the pseudonymization target attribute item (e.g. staff identification number) in the table T1 on the public key pk$_A$ in the key storage unit 12.

Enc(pk$_A$, data$_i$)→C$_{A,data\_i}$

Note that the encryption unit 17 can acquire a parameter and a random number necessary for encryption processing from the encryption parameter storage unit 11 and the random number generation unit 16, respectively.

Similarly, For each record, the encryption unit 17 encrypts the attribute value for each attribute item other than the pseudonymization target attribute item in the table T1 based on the public key pk$_A$. The attribute values for all attribute items in the table T1 are thus encrypted, and a table T1$e$ in which the attribute values for all attribute items are encrypted is generated as the encrypted data, as shown in FIG. 5.

In step ST4, the control unit 18 of the encryption apparatus 10 sends the encrypted data formed from the table T1$e$ to the anonymization apparatus 20 via the communication unit 14.

In step ST5, the anonymization apparatus 20 stores the table T1$e$ as the encrypted data received by the communication unit 24 in the temporary data storage unit 23.

(Anonymization)

In step ST6, the random number generation unit 16 of the encryption apparatus 10 generates an anonymization parameter to be used for pseudonymization as a random number R. The encryption unit 17 encrypts the generated random number R by the homomorphic encryption method based on the public key pk$_A$ stored in the key storage unit 12, thereby generating an encrypted random number C$_{A,R}$ that is an encrypted anonymization parameter.

Enc(pk$_A$, R)→C$_{A,R}$

In step ST7, the control unit 18 of the encryption apparatus 10 sends the pseudonymization target attribute item (e.g. staff identification number) in the table T1$e$ and the encrypted random number C$_{A,R}$ to the anonymization apparatus 20 via the communication unit 14. However, in a case in which the anonymization apparatus 20 acquires the public key pk$_A$ in advance and thus holds or generates the encrypted random number C$_{A,R}$ in advance, the generation and sending of the encrypted random number C$_{A,R}$ by the encryption apparatus 10 may be omitted. This also applies to the following embodiments and modifications.

In step ST8, the anonymization apparatus 20 receives the attribute item (e.g. staff identification number) and the encrypted random number C$_{A,R}$ by the communication unit 24. The anonymization processing unit 26 adds, for each record, the received encrypted random number C$_{A,R}$ to the attribute value C$_{A,data\_i}$ for the attribute item (e.g. staff identification number) in the table T1$e$ stored in the temporary data storage unit 23, which matches the received attribute item (e.g. staff identification number).

Add(C$_{A,data\_i}$, C$_{A,R}$)→C$_{A,data\_i+R}$

That is, the attribute value C$_{A,data\_i}$ encrypted in step ST3 is converted into an anonymized attribute value C$_{A,data\_i+R}$ without being decrypted since the encrypted random number C$_{A,R}$ is added to the attribute value C$_{A,data\_i}$ kept in the encrypted state.

The attribute value for the pseudonymization target attribute item (e.g. staff identification number) in the table T1$e$ is thus anonymized, and a table T1$a$ including the anonymized attribute value C$_{A,data\_i+R}$ is generated as encrypted anonymized data, as shown in FIG. 6.

After that, the anonymization processing unit 26 saves the table T1$a$ in the temporary data storage unit 23.

In step ST9, the control unit 29 of the anonymization apparatus 20 sends the encrypted anonymized data formed from the table T1$a$ stored in the temporary data storage unit 23 to the decryption apparatus 30 via the communication unit 24.

According to this embodiment, it is possible to anonymize the encrypted data without decryption and decrypt the obtained encrypted anonymized data so as to use the anonymized data. Specifically, the attribute value data_i in the table T1 expressed by a numerical value can be pseudonymized by the random number R for pseudonymization. The encryption apparatus 10 may create a corresponding table of data based on the encrypted random number C$_{A,R}$ for pseudonymization before and after pseudonymization. In this case, it is also possible to specify individuals from the attribute information in the pseudonymized table or reverse the pseudonymization processing to the original state.

After that, in step ST10, the control unit 38 of the decryption apparatus 30 receives the encrypted anonymized data by the communication unit 34 and stores it in the temporary data storage unit 33. Based on the secret key sk$_A$ that is the decryption key stored in the secret key storage unit 32, the decryption unit 37 decrypts the values for each attribute item in the table T1$a$ that includes the encrypted anonymized data in the temporary data storage unit 33, and obtains the table of the obtained decryption result.

The control unit 38 of the decryption apparatus 30 determines whether, in the table of the decryption results, the attribute values for the pseudonymization target attribute item (e.g. staff identification number) are anonymized. For example, when adding the encrypted random number C$_{A,R}$ whose number of digits (for example, 7) is larger than the number of digits (for example, 5) of the attribute value before anonymization, if the attribute value has the larger number of digits (for example, 7), it is determined that the attribute value is anonymized. In addition, for example, as for the anonymized attribute value for the attribute item (e.g. staff identification number), if the value before anonymization is different from the value after anonymization, it may be determined that the attribute value is anonymized. In this case, the encryption apparatus 10 may transmit the value before anonymization to the decryption apparatus 30 at an arbitrary timing. At any rate, if the determination result is negative, the processing is re-executed from step ST6 (or ST4) and repeated until a desirable anonymization result is obtained.

In step ST11, upon determining that the attribute values are anonymized, the control unit 38 of the decryption apparatus 30 safely sends the anonymized data formed from the table of the decryption result to the statistical processing apparatus 50 via the communication unit 34.

In step ST12, the statistical processing apparatus 50 executes statistical processing using the anonymized data received by the communication unit 52, and saves the obtained statistical processing result in the data storage unit 51. After that, the statistical processing apparatus 50 appropriately uses the statistical processing result.

As described above, according to this embodiment, encrypting the value of each item included in the personal data is performed, thereby generating the encrypted data from the personal data. Anonymizing the values of some items of encrypted data without decryption is performed, thereby generating the encrypted anonymized data from the encrypted data. Decrypting the encrypted anonymized data is performed, thereby generating the anonymized data from the encrypted anonymized data. With this arrangement, the encrypted data obtained by encrypting the personal data can be anonymized without decryption.

According to this embodiment, the anonymization parameter to be used in anonymization processing is encrypted to generate the encrypted anonymization parameter. Based on the encrypted anonymization parameter, the encrypted anonymized data is generated from the encrypted data. With this arrangement, the anonymization parameter is adjusted, and anonymization processing is re-executed, thereby generating anonymized data for a preferable anonymization result.

Note that in this embodiment, the decryption apparatus 30 executes key generation. However, not limited to this embodiment, the encryption apparatus 10 may execute key generation, and the key may be sent to an appropriate apparatus, as in this embodiment.

This embodiment may also be implemented by (additive) homomorphic encryption methods capable of performing magnitude comparison. When using these encryption methods, the encryption algorithm in each encryption method is replaced, thereby similarly implementing the embodiment and obtaining the same effect as described above.

As shown in FIG. 2, this embodiment may be modified to an arrangement including a key generation apparatus 60 wherein the key generation function (e.g. the random number generation unit 35 and the key generation unit 36) is separated from the decryption apparatus 30, and a data storage apparatus 70 wherein the storage function (the encrypted data storage unit 22) is separated from the anonymization apparatus 20. At this time, the same effect as in this embodiment can be obtained by making the anonymization apparatus 20 cooperate with the existing data storage apparatus 70.

The key generation apparatus 60 includes an encryption parameter storage unit 61, a temporary data storage unit 62, a communication unit 63, a random number generation unit 64, a key generation unit 65, and a control unit 66.

The encryption parameter storage unit 61 and the temporary data storage unit 62 can be implemented as storage devices or storage areas of a storage device, which are readable/writable by a processor (not shown) and store an encryption parameter and temporary data, respectively.

The communication unit 63, the random number generation unit 64, the key generation unit 65, and the control unit 66 are functional blocks implemented by, for example, a program including steps to be executed by a processor (not shown) in the key generation apparatus 60 (to be described later).

The data storage apparatus 70 is an apparatus (or system) implemented by, for example, a cloud system to be able to store an enormous amount of data, and includes a data storage unit 71 and a communication unit 72.

The data storage unit 71 can be implemented as a storage device or a storage area of a storage device, which are readable/writable by a processor (not shown) and stores data.

The communication unit 72 is a functional block implemented by, for example, a program including steps to be executed by a processor (not shown) in the data storage apparatus 70 (to be described later).

According to the arrangement shown in FIG. 2, for example, as shown in FIG. 7, steps ST1 to ST12 described above are distributively executed by the respective apparatuses, 10, 20, 30, 50, 60, and 70. The same step numbers as in FIG. 4 denote the same steps in FIG. 7 irrespective of the presence/absence of a change of the apparatus for executing the steps. If a step is divided into a plurality of sub-steps, branch numbers (−1, −2, −3) are added to the step number. The manner of assigning the step numbers also applies to the following embodiments and modifications.

FIG. 7 is a sequence chart for explaining an operation mainly in a case in which the encrypted data saved in the data storage apparatus 70 is anonymized by the anonymization apparatus 20, and the obtained anonymized data is updated on the data storage apparatus 70 and sent to the decryption apparatus 30.

In this operation, specifically, the key generation apparatus 60 generates and saves a key pair (step ST1), and sends an encryption key to the encryption apparatus 10 (step ST2). The encryption apparatus 10 encrypts the data (step ST3) and sends the obtained encrypted data to the data storage apparatus 70 (step ST4). The data storage apparatus 70 stores the encrypted data (step ST5). The encryption apparatus 10 encrypts the random number R (step ST6), and sends the obtained encrypted random number $C_{A,R}$ to the anonymization apparatus 20 (step ST7). The data storage apparatus 70 sends the stored encrypted data to the anonymization apparatus 20 (step ST8-1). The anonymization apparatus 20 anonymizes (e.g. pseudonymizes) the sent encrypted data based on the encrypted random number $C_{A,R}$ without decryption, and sends the obtained encrypted anonymized data to the data storage apparatus 70 (step ST9-1). The data storage apparatus 70 stores the sent encrypted anonymized data (step ST9-2), and sends the encrypted anonymized data to the decryption apparatus 30 (step ST9-3). The decryption apparatus 30 requests, for example, a decryption key from the key generation apparatus 60. The key generation apparatus 60 sends the decryption key to the decryption apparatus 30 (step ST10-1). The decryption apparatus 30 decrypts the encrypted anonymized data based on the sent decryption key, and determines (e.g. confirms) whether the obtained anonymized data is anonymized (step ST10-2). If the determination result is negative, the processing is re-executed from step STG. Upon determining that the data is anonymized, steps ST11 and ST12 described above are executed.

At this time, the effect of this embodiment can be obtained without significantly changing the existing data storage apparatus 70. This also applies to the embodiments and modifications to be described later.

Figure 8:
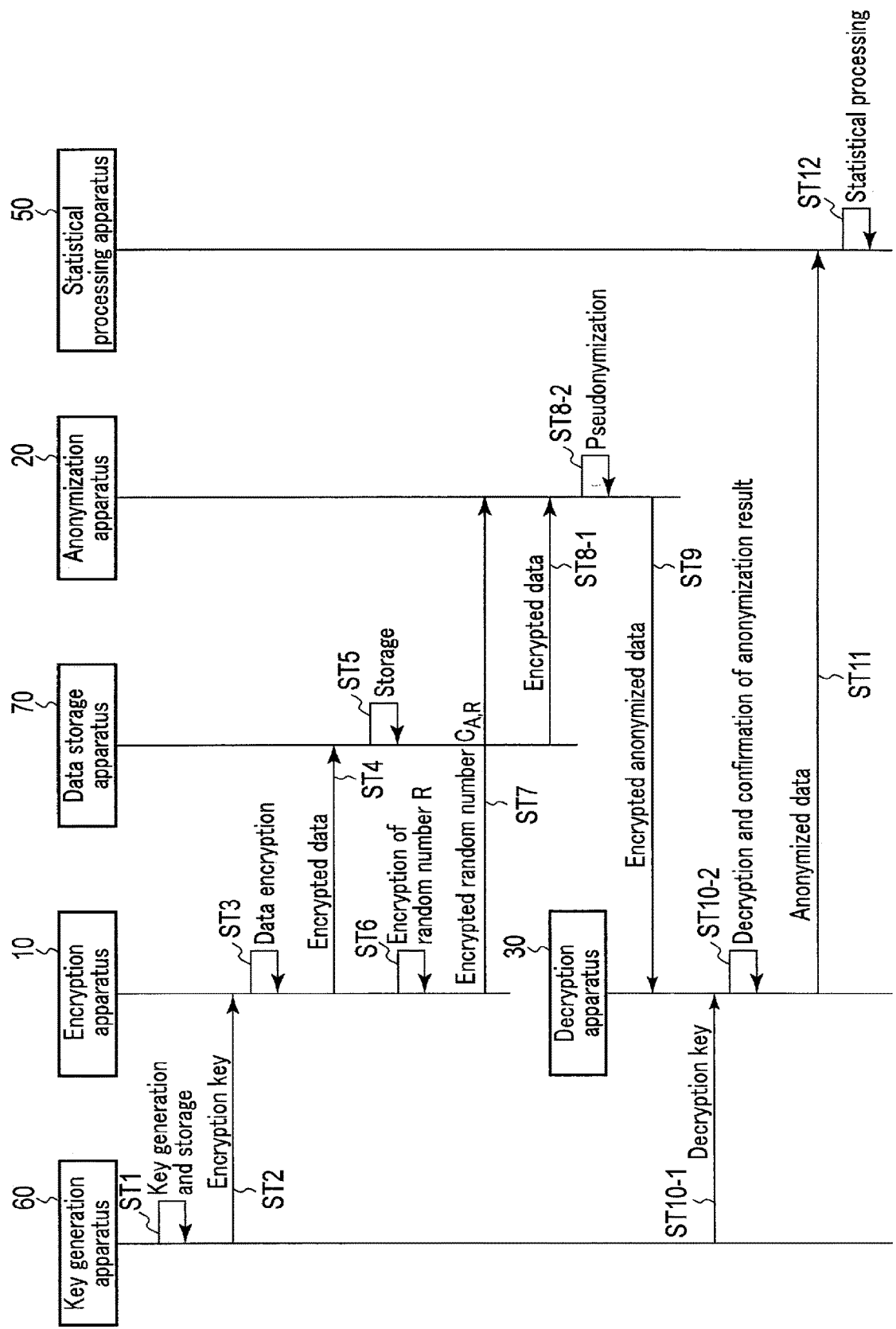
FIG. 8 is a sequence chart for explaining a modified operation according to the modification of the first embodiment.

Additionally, for example, FIG. 8 is a sequence chart for explaining an operation mainly in a case in which the encrypted data saved in the data storage apparatus 70 is anonymized by the anonymization apparatus 20, and the obtained anonymized data is sent to the decryption apparatus 30 without being updated on the data storage apparatus 70. Specifically, this operation is an operation of causing the anonymization apparatus 20 to execute step ST9 of sending the encrypted anonymized data to the decryption apparatus 30 in place of steps ST9-1 to ST9-3 shown in FIG. 7.

In this case, the encrypted data in the data storage apparatus 70 is kept in a state in which the original data has been encrypted. Anonymized data obtained by anonymization for the state can appropriately be obtained. At this time, since the encrypted data in the data storage apparatus 70 is not updated, the encrypted data before and after anonymization need not be managed by the encryption apparatus 10 or the decryption apparatus 30, and the data management cost can be reduced. This also applies to the embodiments and modifications to be described later.

Modification of First Embodiment: Pseudonymization

In the first embodiment, the anonymization apparatus 20 can pseudonymize the attribute values $C_{A,data\_i}$ for the pseudonymization target attribute item (e.g. staff identification number) in the table T1e using the encrypted random numbers $C_{A,R}$ that change for each record.

Assume that the decrypted anonymized data (e.g. the pseudonymized staff identification number) are revealed, and a user who knows the information (e.g. the original data of the staff identification number) of one record of the pseudonymization target is involved. Even in this situation, the involved user cannot estimate the information (e.g. the original data of the staff identification number) of the other records because the records of the anonymized data are pseudonymized by the different encrypted random numbers $C_{A,R}$.

Second Embodiment: M2M and Pseudonymization

FIG. 9 is a schematic view showing an anonymization system according to the second embodiment and its peripheral arrangement. The same reference numerals as in FIGS. 1 and 2 denote the same parts in FIG. 9, and a detailed description thereof will be omitted. Different parts will be described here. In the following embodiments and modifications as well, a repetitive description of the same parts will be omitted.

Unlike the first embodiment in which the encryption apparatus 10 encrypts the personal data and provides them to the anonymization apparatus 20, in the second embodiment, an anonymization apparatus 20 collects encrypted data obtained by encrypting personal data acquired by each device, like an M2M service. Each device here corresponds each of encryption apparatuses (1 to N) 10.

Specifically, in the second embodiment, the N encryption apparatuses 10 are provided, and a key generation apparatus 60 and a parameter generation apparatus 80 are further provided, as compared to the arrangement shown in FIG. 1. However, the parameter generation apparatus 80 may not be necessarily used, and may be omitted if, for example, any of the encryption apparatuses 10 generates a parameter (for example, a random number R) and an encrypted parameter (encrypted random number $C_{A,R}$). This also applies to the following embodiments and modifications.

Here, each of the N encryption apparatuses (1 to N) 10 includes a data acquisition unit 19 in place of the parameter generation unit 15 of the above-described encryption apparatus 10.

The parameter generation apparatus 80 includes an encryption parameter storage unit 81, a key storage unit 82, a communication unit 83, a parameter generation unit 84, a random number generation unit 85, an encryption unit 86, and a control unit 87.

The encryption parameter storage unit 81 and the key storage unit 82 can be implemented as storage devices or storage areas of a storage device, which are readable/writable by a processor (not shown) and store an encryption parameter and a key, respectively.

The communication unit 83, the parameter generation unit 84, the random number generation unit 85, the encryption unit 86, and the control unit 87 are functional blocks implemented by, for example, a program including steps to be executed by a processor (not shown) in the parameter generation apparatus 80 (to be described later).

The operation of the anonymization system according to this embodiment will be described next with reference to the sequence chart of FIG. 10.

(Preparation)

In step ST1, a key generation unit 65 of the key generation apparatus 60 generates a key pair (a public key $pk_A$ and a secret key $sk_A$) in the homomorphic encryption method based on a security parameter ($1^k$) in an encryption parameter storage unit 61.

$KeyGen(1^k) \rightarrow (pk_A, sk_A)$

Note that the key generation unit 65 can acquire a random number necessary for the key generation processing from a random number generation unit 64. In addition, the public key $pk_A$ is an encryption key, and the secret key $sk_A$ is a decryption key.

In step ST2, a control unit 66 of the key generation apparatus 60 sends the public key $pk_A$ that is the encryption key to the encryption apparatuses (1 to N) 10 and the parameter generation apparatus 80 via a communication unit 63. A control unit 18 of each of the encryption apparatuses (1 to N) 10 stores the public key $pk_A$ received by a communication unit 14 in a key storage unit 12. Similarly, the control unit 87 of the parameter generation apparatus 80 stores the public key $pk_A$ received by the communication unit 83 in the key storage unit 82. Note that in each of the encryption apparatuses (1 to N) 10, the public key $pk_A$ may be input and stored at the time of device assembly. Alternatively, after the device is arranged, the public key $pk_A$ may be received via a network and stored. Similarly, the control unit 66 of the key generation apparatus 60 sends the secret key $sk_A$ that is the decryption key to a decryption apparatus 30 via the communication unit 63. A control unit 38 of the decryption apparatus 30 stores the secret key $sk_A$ received by a communication unit 34 in a secret key storage unit 32.

In step ST3, the data acquisition unit 19 of each of the encryption apparatuses (1 to N) 10 acquires personal data formed from a table T1, and stores it in a temporary data storage unit 13. An encryption unit 17 of each of the encryption apparatuses (1 to N) 10 encrypts, for each record, an attribute value $data_i$ for a pseudonymization target attribute item (e.g. staff identification number) of the table T1 in the temporary data storage unit 13 based on the public key $pk_A$ in the key storage unit 12.

$Enc(pk_A, data_i) \rightarrow C_{A,data\_i}$

Similarly, the encryption unit 17 of each of the encryption apparatuses (1 to N) 10 encrypts, for each record, the attribute values for each attribute item other than the pseudonymization target attribute item of the table T1 based on the public key $pk_A$. The attribute values of all attribute items in the table T1 are thus encrypted, and a table T1e in which the attribute values for all attribute items are encrypted is generated as encrypted data.

In step ST4, the control unit 18 of each of the encryption apparatuses (1 to N) 10 sends the encrypted data formed from the table T1e and the pseudonymization target attribute item (e.g. staff identification number) in the table T1e to the anonymization apparatus 20 via the communication unit 14.

In step ST5, the anonymization apparatus 20 receives the table T1e that is the encrypted data and the pseudonymization target attribute item (e.g. staff identification number) in the table T1e by a communication unit 24. After that, a control unit 29 of the anonymization apparatus 20 stores the table T1e and the pseudonymization target attribute item (e.g. staff identification number) in a temporary data storage unit 23.

At this time, the table T1e in the temporary data storage unit 23 is updated in a state in which the contents of the newly received table T1e are added. Note that not limited to this embodiment, and the anonymization apparatus 20 may store the table T1e received from each of the encryption apparatuses (1 to N) 10 in the temporary data storage unit 23, and update the table T1e to the contents of the N collected tables T1e. At any rate, the table T1e in the temporary data storage unit 23 is updated to the contents of the collected tables T1e received from the encryption apparatuses (1 to N) 10. This also applies to the following embodiments and modifications.

(Anonymization)

In step ST6, the random number generation unit 85 of the parameter generation apparatus 80 generates as the random number R an anonymization parameter to be used for pseudonymization. The encryption unit 86 of the parameter generation apparatus 80 encrypts the generated random number R by the homomorphic encryption method based on the public key $pk_A$ stored in the key storage unit 82, thereby generating the encrypted random number $C_{A,R}$ that is an encrypted anonymization parameter.

Enc($pk_A$, R)→$C_{A,R}$

In step ST7, the control unit 87 of the parameter generation apparatus 80 sends the encrypted random number $C_{A,R}$ to the anonymization apparatus 20 via the communication unit 83. However, in a case in which the anonymization apparatus 20 holds or generates the encrypted random number $C_{A,R}$ in advance, the generation and sending of the encrypted random number $C_{A,R}$ by the parameter generation apparatus 80 may be omitted. This also applies to the following embodiments and modifications.

In step ST8, the anonymization apparatus 20 receives the encrypted random number $C_{A,R}$ by the communication unit 24. An anonymization processing unit 26 adds, for each record, the received encrypted random number $C_{A,R}$ to an attribute value $C_{A,data\_i}$ for the attribute item (e.g. staff identification number) of the table T1e in the temporary data storage unit 23, which matches the attribute item (e.g. staff identification number) received in step ST5.

Add ($C_{A,data\_i}$, $C_{A,R}$)→$C_{A,data\_i+R}$

That is, the attribute values $C_{A,data\_i}$ encrypted in step ST3 are converted into an anonymized attribute value $C_{A,data\_i+R}$ without being decrypted since the encrypted random number $C_{A,R}$ is added to the attribute values $C_{A,data\_i}$ kept in the encrypted state.

The attribute values for the pseudonymization target attribute item (e.g. staff identification number) in the table T1e are thus anonymized, and a table T1a including the anonymized attribute values $C_{A,data\_i+R}$ is generated as encrypted anonymized data, as described above.

After that, the anonymization processing unit 26 saves the table T1a in the temporary data storage unit 23.

In step ST9, the control unit 29 of the anonymization apparatus 20 sends the encrypted anonymized data formed from the table T1a in the temporary data storage unit 23 to the decryption apparatus 30 via the communication unit 24.

Steps ST10 to ST12 are then executed as described above.

As described above, according to this embodiment, even if the plurality of encryption apparatuses 10 are provided, the same function and effect as in the first embodiment can be obtained.

Note that this embodiment may also be implemented by (additive) homomorphic encryption methods capable of performing magnitude comparison. When using these encryption methods, the encryption algorithm in each method is replaced, thereby similarly implementing the embodiment.

Modification of Second Embodiment: Pseudonymization

In the second embodiment, the anonymization apparatus 20 can pseudonymize the attribute values $C_{A,data\_i}$ for the pseudonymization target attribute item (e.g. staff identification number) of the table T1e using the encrypted random numbers $C_{A,R}$ that change for each record, as in the modification of the first embodiment.

It is therefore possible to obtain the same effect as in the modification of the first embodiment.

Third Embodiment: Top Coding

An anonymization system according to the third embodiment will be described next with reference to FIG. 1.

Unlike the first embodiment in which encrypted "staff identification number" is pseudonymized, in the third embodiment, top coding is performed for encrypted "income".

Figure 11:
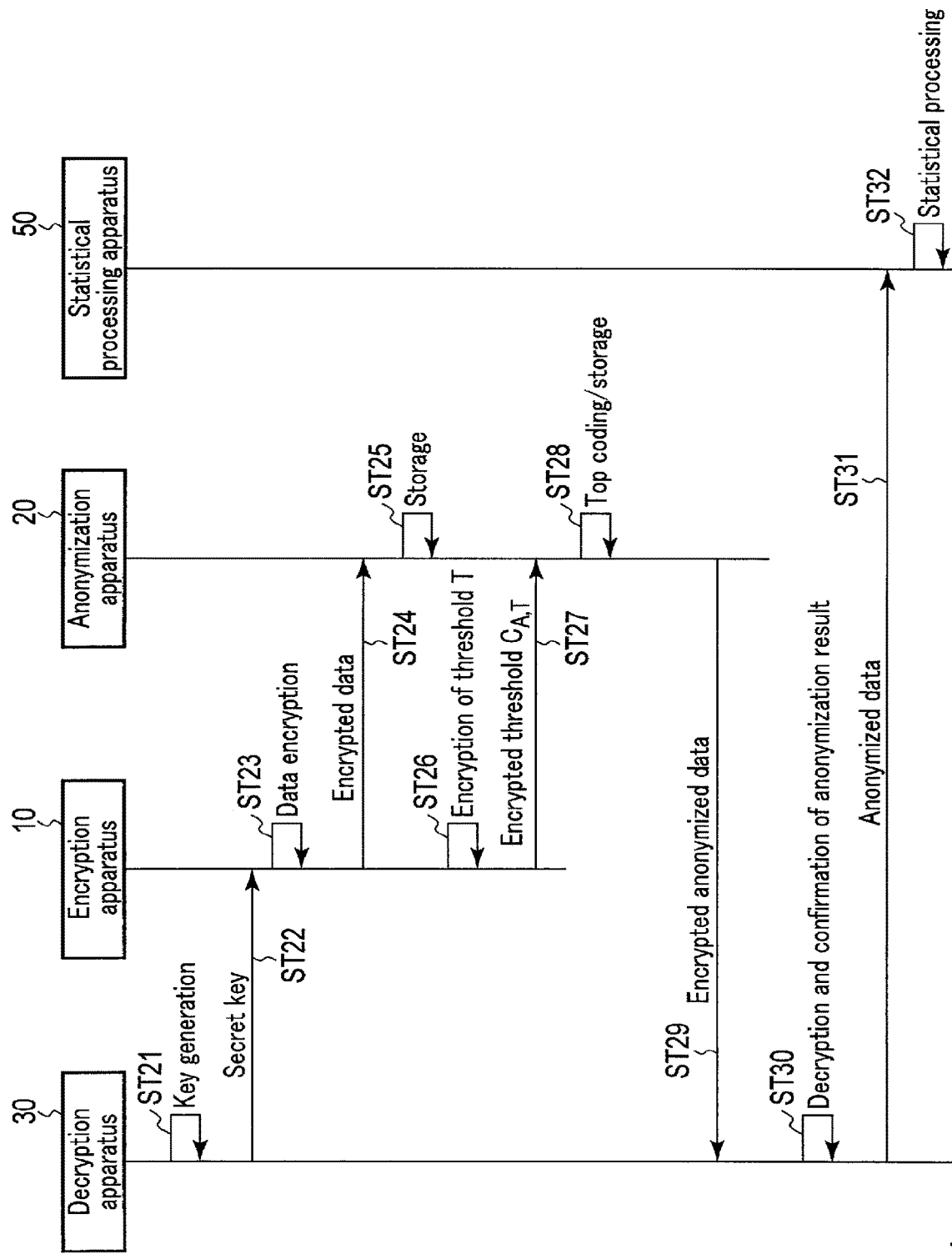
FIG. 11 is a sequence chart for explaining an operation according to the third embodiment.

The operation of the anonymization system according to this embodiment will be described next with reference to the sequence chart of FIG. 11 and the schematic views of FIGS. 12, 13, and 14. In the following explanation, a case in which anonymization is performed using an encryption method capable of performing magnitude comparison will be described below as an example.

(Preparation)

In step ST21, a key generation unit 36 of a decryption apparatus 30 generates, for the decryption apparatus 30 itself, a key (secret key $sk_A$) in the encryption method which is capable of performing magnitude comparison, based on a security parameter ($1^k$) in an encryption parameter storage unit 31.

KeyGen($1^k$)→($sk_A$)

Note that the key generation unit 36 can acquire a random number necessary for the key generation from a random number generation unit 35. The key generation unit 36 saves the generated secret key $sk_A$ in a secret key storage unit 32.

In step ST22, a control unit 38 of the decryption apparatus 30 sends the secret key $sk_A$ that is a common key to an encryption apparatus 10 via a communication unit 34. A control unit 18 of the encryption apparatus 10 stores the secret key $sk_A$ received by a communication unit 14 in a key storage unit 12.

In step ST23, an encryption unit 17 of the encryption apparatus 10 reads out a table T1 shown in FIG. 12 from the temporary data storage unit 13. The encryption unit 17 encrypts, for each record, an attribute value data, for the top coding target attribute item (e.g. income) in the table T1 based on the secret key $sk_A$ stored in the key storage unit 12.

Enc($sk_A$, $data_i$)→$C_{A,data\_i}$

Note that the encryption unit 17 can acquire a parameter and a random number necessary for encryption processing from the encryption parameter storage unit 11 and the random number generation unit 16, respectively.

Similarly, the encryption unit 17 encrypts, for each record, the attribute value for each attribute item other than the top coding target attribute item in the table T1 based on the secret key $sk_A$. The attribute values for all attribute items in the table T1 are thus encrypted, and a table T1e in which the attribute values for all attribute items are encrypted is generated as the encrypted data, as shown in FIG. 13.

In step ST24, the control unit 18 of the encryption apparatus 10 sends the encrypted data formed from the table T1e to the anonymization apparatus 20 via the communication unit 14.

In step ST25, the anonymization apparatus 20 stores the table T1e as the encrypted data received by a communication unit 24 in the temporary data storage unit 23.

(Anonymization)

In step ST26, the parameter generation unit 15 of the encryption apparatus 10 generates a threshold T that is an anonymization parameter used for top coding. The encryption unit 17 encrypts the generated threshold T based on the secret key $sk_A$ in the key storage unit 12 using the encryption method capable of performing magnitude comparison. An encrypted threshold $C_{A,T}$ that is an encrypted anonymization parameter is thus generated.

$Enc(sk_A, T) \rightarrow C_{A,T}$

In step ST27, the control unit 18 of the encryption apparatus 10 sends the top coding target attribute item (e.g. income) in the table T1e and the encrypted threshold $C_{A,T}$ to the anonymization apparatus 20 via the communication unit 14. However, in a case in which the anonymization apparatus 20 acquires the secret key $sk_A$ in advance and thus holds or generates the encrypted threshold $C_{A,T}$ in advance, the generation and sending of the encrypted threshold $C_{A,T}$ by the encryption apparatus 10 can be omitted. This also applies to the following embodiments and modifications.

In step ST28, the anonymization apparatus 20 receives the attribute item (e.g. income) and the encrypted threshold $C_{A,T}$ by the communication unit 24. An anonymization processing unit 26 compares, for each record, an attribute value $C_{A,data\_i}$ for the attribute item (e.g. income) in the table T1e stored in the temporary data storage unit 23, which matches the received attribute item (e.g. income), with the received encrypted threshold $C_{A,T}$.

$$\text{Comp}(C_{A,data\_i}, C_{A,T}) \rightarrow \begin{cases} 1 & (\text{if } data_i > T) \\ 0 & (\text{if } data_i = T) \\ -1 & (\text{if } data_i < T) \end{cases}$$

If the comparison result is 1, the anonymization processing unit 26 replaces the attribute value $C_{A,data\_i}$ with the encrypted threshold $C_{A,T}$.

That is, the attribute values $C_{A,data\_i}$ encrypted in step ST23 are kept in the encrypted state and appropriately replaced with the encrypted threshold $C_{A,T}$, and thus converted into an anonymized attribute value $(C_{A,T})$ without being decrypted.

The attribute values for the top coding target attribute item (e.g. income) in the table T1e are thus anonymized, and the table T1a including the anonymized attribute values $(C_{A,T})$ is generated as the encrypted anonymized data, as shown in FIG. 14.

After that, the anonymization processing unit 26 saves the table T1a in the temporary data storage unit 23.

In step ST29, the control unit 29 of the anonymization apparatus 20 sends the encrypted anonymized data formed from the table T1a stored in the temporary data storage unit 23 to the decryption apparatus 30 via the communication unit 24.

According to this embodiment, it is possible to anonymize the encrypted data without decryption and decrypt the obtained encrypted anonymized data so as to use the anonymized data. Specifically, the attribute value data_i in the table T1 expressed by a numerical value can be top-coded using the threshold T for top coding. Here, the anonymization apparatus 20 knows which attribute value $(C_{A,data\_i})$ is replaced, and all replaced cipher texts have the same value $(C_{A,T})$. However, the anonymization apparatus 20 does not know the threshold T and the original attribute values (data_i).

If the encryption apparatus 10 holds the encrypted data before top coding, a corresponding table of the encrypted data before and after top coding may be created. If the original data is separately held, the attribute values that have undergone the top coding can be reversed to the original values.

After that, in step ST30, a control unit 38 of the decryption apparatus 30 receives the encrypted anonymized data by the communication unit 34 and stores it in a temporary data storage unit 33. Based on the secret key $sk_A$ in the secret key storage unit 32, a decryption unit 37 decrypts the values for each attribute item in the table T1a that includes the encrypted anonymized data in the temporary data storage unit 33, and obtains the table of the obtained decryption result.

The control unit 38 of the decryption apparatus 30 determines whether, in the table of the decryption result, the attribute values for the top coding target attribute item (e.g. income) are anonymized. For example, in a case in which the attribute values before anonymization are top-coded, if one of the attribute values includes a character string "not less than" or "not more than", it is determined that the attribute value is anonymized. In addition, for example, as for the anonymized attribute values for the attribute item (e.g. income), if the values before anonymization are different from the values after anonymization, it may be determined that the attribute values are anonymized. In this case, the encryption apparatus 10 transmits the values before anonymization to the decryption apparatus 30 at an arbitrary timing. At any rate, if the determination result is negative, the processing is re-executed from step ST26 (or ST24) and repeated until a desirable anonymization result is obtained.

In step ST31, upon determining that the attribute values are anonymized, the control unit 38 of the decryption apparatus 30 safely sends the anonymized data formed from the table of the decryption result to the statistical processing apparatus 50 via the communication unit 34. However, it is preferable that the anonymized data is sent in a state in which the attribute values for the staff identification number in the table of the decryption result are appropriately anonymized. This also applies to the following embodiments and modifications.

In step ST32, the statistical processing apparatus 50 executes statistical processing using the anonymized data received by a communication unit 52, and saves the obtained statistical processing result in the data storage unit 51. After that, the statistical processing apparatus 50 appropriately uses the statistical processing result.

As described above, according to this embodiment, the same function and effect as in the first embodiment can be obtained even in a case in which top coding is executed as anonymization processing.

Note that this embodiment may also be implemented by (additive) homomorphic encryption methods capable of performing magnitude comparison. When using these encryption methods, the encryption algorithm in each method is replaced, thereby similarly implementing the embodiment.

Fourth Embodiment: M2M and Top Coding

Figure 15:
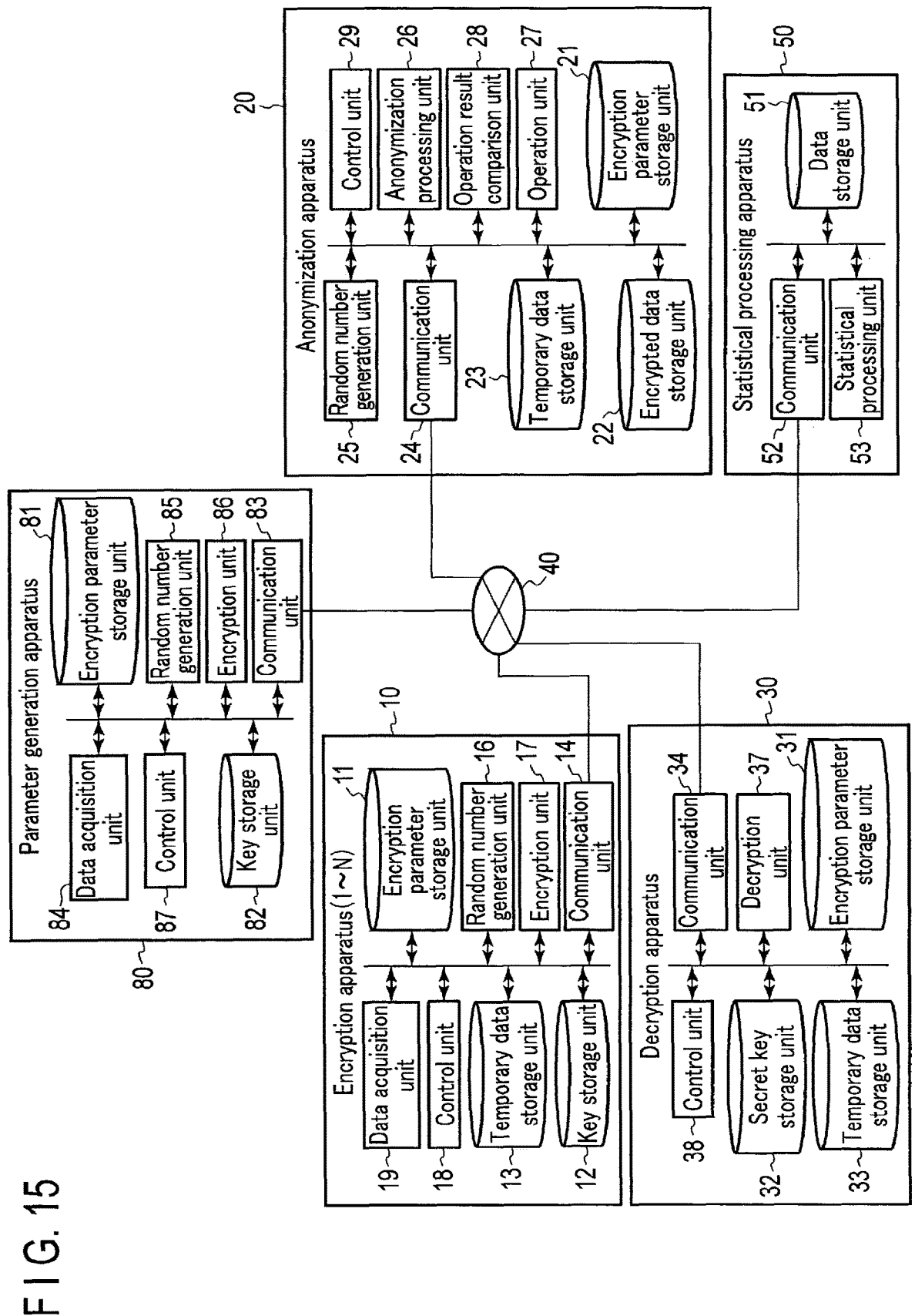
FIG. 15 is a schematic view showing an anonymization system according to the fourth embodiment and its peripheral arrangement.

FIG. 15 is a schematic view showing an anonymization system according to the fourth embodiment and its peripheral arrangement.

Unlike the third embodiment in which the encryption apparatus 10 encrypts personal data and provides it to the anonymization apparatus 20, in the fourth embodiment, the anonymization apparatus 20 collects the encrypted data obtained by encrypting the personal data acquired by each device, like an M2M service. Each device here corresponds to each of encryption apparatuses (1 to N) 10.

Specifically, in the fourth embodiment, the N encryption apparatuses 10 are provided, and a parameter generation apparatus 80 is further provided, as compared to the arrangement shown in FIG. 1. However, the parameter generation apparatus 80 may not be necessarily used, and may be omitted if, for example, any of the encryption apparatuses 10 generates a parameter (for example, the threshold T) and an encrypted parameter (the encrypted threshold $C_{A,T}$). This also applies to the following embodiments and modifications.

Here, each of the N encryption apparatuses (1 to N) 10 includes a data acquisition unit 19 in place of the parameter generation unit 15 of the above-described encryption apparatus 10.

The parameter generation apparatus 80 includes an encryption parameter storage unit 81, a key storage unit 82, a communication unit 83, a parameter generation unit 84, a random number generation unit 85, an encryption unit 86, and a control unit 87.

The encryption parameter storage unit 81 and the key storage unit 82 can be implemented as storage devices or storage areas of a storage device, which are readable/writable by a processor (not shown) and store an encryption parameter and a key, respectively.

The communication unit 83, the parameter generation unit 84, the random number generation unit 85, the encryption unit 86, and the control unit 87 are functional blocks implemented by, for example, a program including steps to be executed by a processor (not shown) in the parameter generation apparatus 80 (to be described later).

Figure 16:
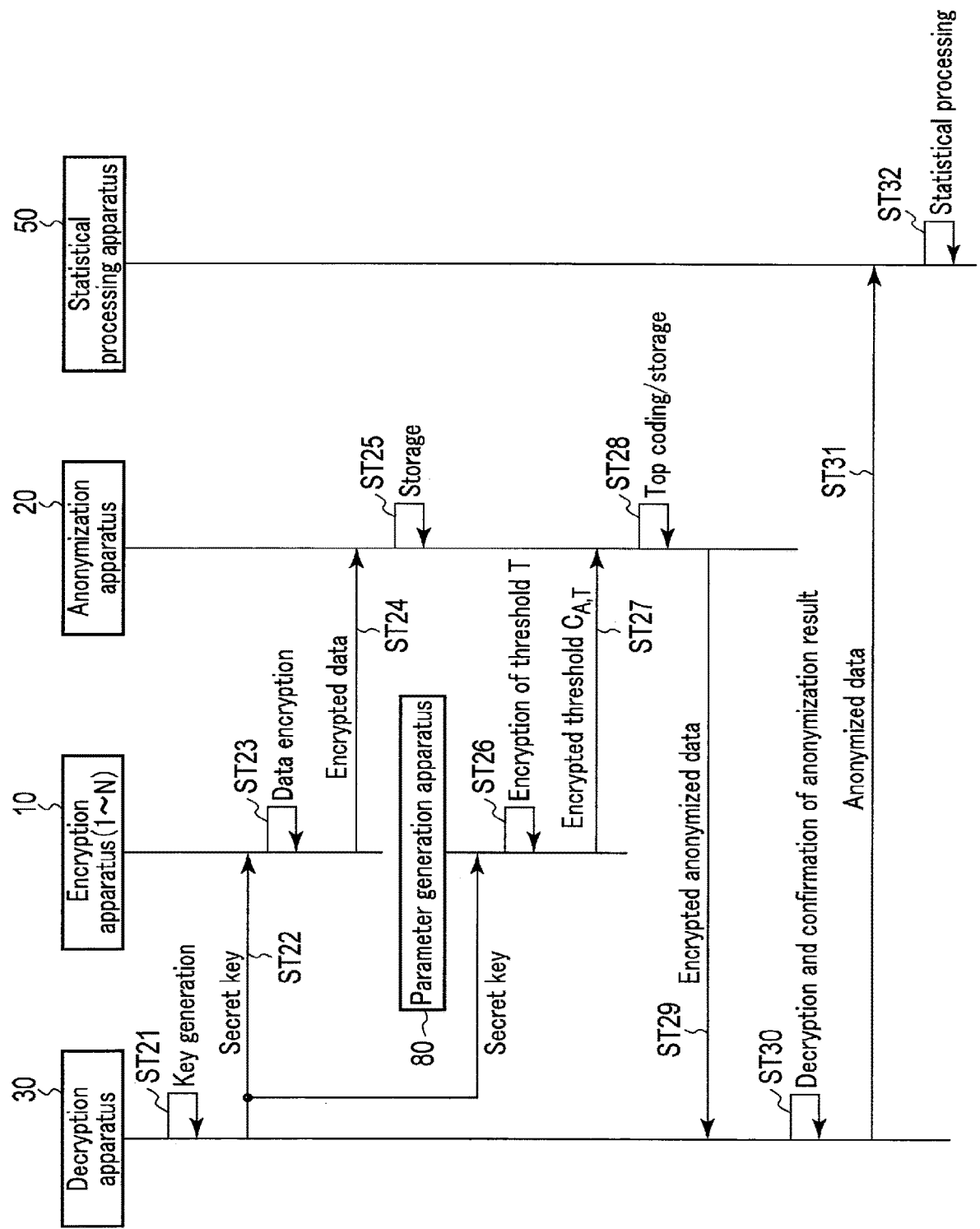
FIG. 16 is a sequence chart for explaining an operation according to the fourth embodiment.

The operation of the anonymization system according to this embodiment will be described next with reference to the sequence chart of FIG. 16.

(Preparation)

In step ST21, the key generation unit 36 of the decryption apparatus 30 generates a key (secret key $sk_A$) for the decryption apparatus 30 itself based on a security parameter ($1^k$) in an encryption parameter storage unit 31 using the encryption method capable of performing magnitude comparison.

KeyGen($1^k$)→($sk_A$)

Note that the key generation unit 36 can acquire a random number necessary for the key generation processing from the random number generation unit 35. The key generation unit 36 saves the generated secret key $sk_A$ in the secret key storage unit 32.

In step ST22, the control unit 38 of the decryption apparatus 30 sends the secret key $sk_A$ that is a common key to the encryption apparatuses (1 to N) 10 and the parameter generation apparatus 80 via the communication unit 34. The control unit 87 of the parameter generation apparatus 80 stores the secret key $sk_A$ received by the communication unit 83 in the key storage unit 82. Similarly, the control unit 18 of each of the encryption apparatuses (1 to N) 10 stores the secret key $sk_A$ received by the communication unit 14 in the key storage unit 12. Note that in each of the encryption apparatuses (1 to N) 10, the public key $pk_A$ may be input and stored at the time of device assembly. Alternatively, after the device is arranged, the public key $pk_A$ may be received via a network and stored.

In step ST23, the data acquisition unit 19 of each of the encryption apparatuses (1 to N) 10 acquires the personal data formed from the table T1, and stores it in the temporary data storage unit 13. The encryption unit 17 of each of the encryption apparatuses (1 to N) 10 encrypts, for each record, the attribute value $data_i$ of the top coding target attribute item (e.g. income) in the table T1 stored in the temporary data storage unit 13 based on the secret key $sk_A$ in the key storage unit 12.

Enc($sk_A$, $data_i$)→$C_{A,data\_i}$

Similarly, the encryption unit 17 of each of the encryption apparatuses (1 to N) 10 encrypts, for each record, the attribute value for each attribute item other than the top coding target attribute item in the table T1 based on the secret key $sk_A$. The attribute values of all attribute items in the table T1 are thus encrypted, and the table T1e in which the attribute values of all attribute items are encrypted is generated as encrypted data.

In step ST24, the control unit 18 of each of the encryption apparatuses (1 to N) 10 sends the encrypted data formed from the table T1e and the top coding target attribute item (e.g. income) in the table T1e to the anonymization apparatus 20 via the communication unit 14.

In step ST25, the anonymization apparatus 20 receives the table T1e that includes the encrypted data and the top coding target attribute item (e.g. income) in the table T1e by a communication unit 24. After that, the control unit 29 of the anonymization apparatus 20 stores the table T1e and the top coding target attribute item (e.g. income) in the temporary data storage unit 23. The table T1e in the temporary data storage unit 23 is updated to the contents of the collected tables T1e received from the encryption apparatuses (1 to N) 10.

(Anonymization)

In step ST26, the parameter generation unit 84 of the parameter generation apparatus 80 generates the threshold T that is the anonymization parameter used for top coding. The encryption unit 86 of the parameter generation apparatus 80 encrypts the generated threshold T based on the secret key $sk_A$ in the key storage unit 82 using the encryption method capable of performing magnitude comparison, thereby generating the encrypted threshold $C_{A,T}$ that is the encrypted anonymization parameter.

Enc($sk_A$, T)→$C_{A,T}$

In step ST27, the control unit 87 of the parameter generation apparatus 80 sends the encrypted threshold $C_{A,T}$ to the anonymization apparatus 20 via the communication unit 83. However, in a case in which the anonymization apparatus 20 holds or generates the encrypted threshold $C_{A,T}$ in advance, the generation and sending of the encrypted threshold $C_{A,T}$ by the parameter generation apparatus 80 can be omitted.

Steps ST28 to ST32 are then executed as in the above-described third embodiment.

As described above, according to this embodiment, even if the plurality of encryption apparatuses 10 are provided, the same function and effect as in the third embodiment can be obtained.

Note that this embodiment may also be, implemented by (additive) homomorphic encryption methods capable of performing magnitude comparison. When using these encryption methods, the encryption algorithm in each method is replaced, thereby similarly implementing the embodiment.

In this embodiment, the secret key $sk_A$ is stored in each device. Since not only encryption but also decryption processing can use the secret key $sk_A$, the secret key $sk_A$ needs to be appropriately maintained on each device. This also applies to the following embodiments and modifications.

Fifth Embodiment: Grouping

An anonymization system according to the fifth embodiment will be described next with reference to FIG. 1.

Unlike the first embodiment in which the encrypted "staff identification number" is pseudonymized, in the fifth embodiment, grouping encrypted "age" is performed.

Figure 17:
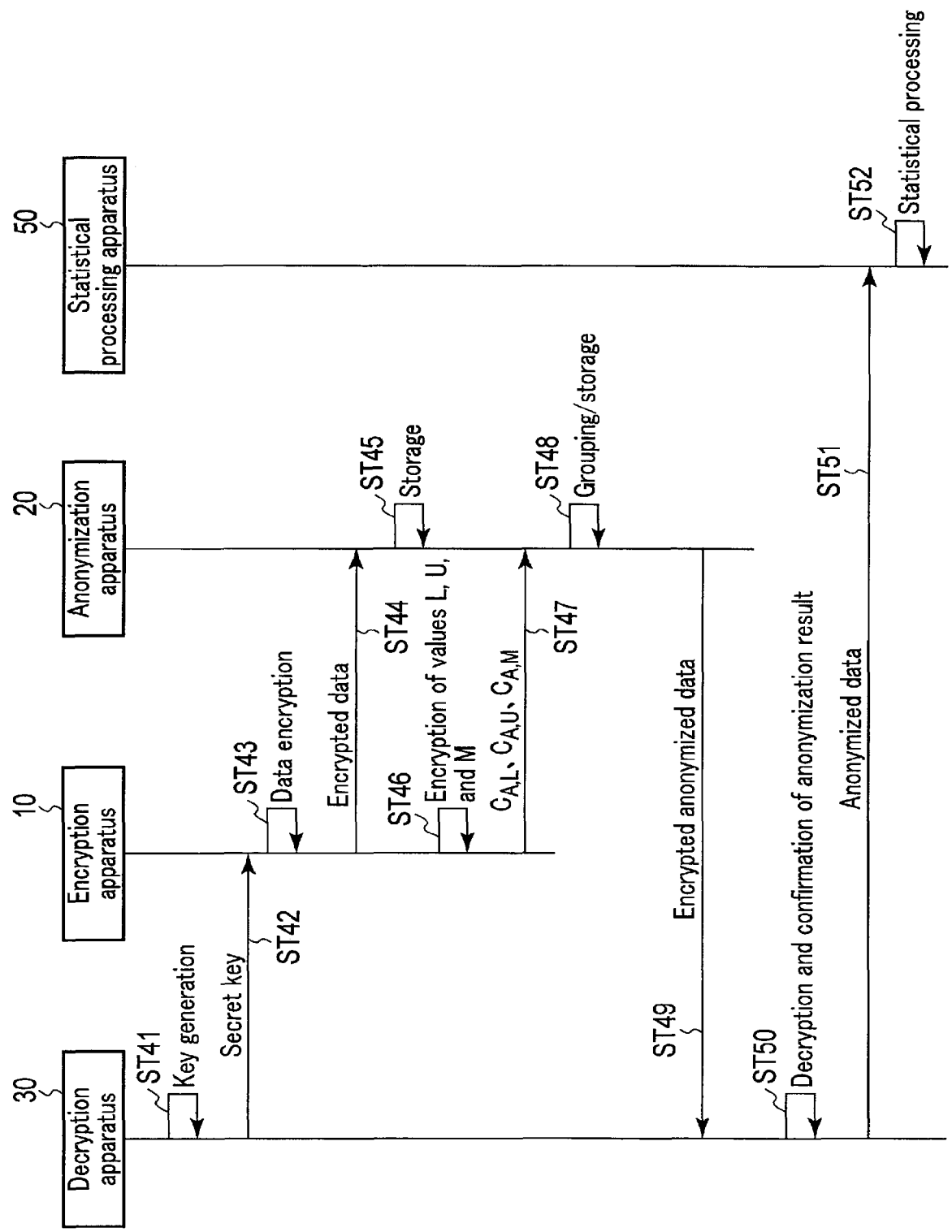
FIG. 17 is a sequence chart for explaining an operation according to the fifth embodiment.

The operation of the anonymization system according to this embodiment will be described next with reference to the sequence chart of FIG. 17 and the schematic views of FIGS. 18, 19, and 20. In the following explanation, a case in which anonymization is performed using an encryption method capable of performing magnitude comparison will be described below as an example.

(Preparation)

In step ST41, the key generation unit 36 of the decryption apparatus 30 generates a key (secret key $sk_A$) for the decryption apparatus 30 itself based on a security parameter ($1^k$) in an encryption parameter storage unit 31 using the encryption method capable of performing magnitude comparison.

KeyGen($1^k$)→($sk_A$)

Note that the key generation unit 36 can acquire a random number necessary for the key generation processing from the random number generation unit 35. The key generation unit 36 saves the generated secret key $sk_A$ in the secret key storage unit 32.

In step ST42, the control unit 38 of the decryption apparatus 30 sends the secret key $sk_A$ that is the common key to the encryption apparatus 10 via the communication unit 34. The control unit 18 of the encryption apparatus 10 stores the secret key $sk_A$ received by the communication unit 14 in the key storage unit 12.

In step ST43, the encryption unit 17 of the encryption apparatus 10 reads out the table T1 shown in FIG. 18 from the temporary data storage unit 13. The encryption unit 17 encrypts, for each record, an attribute value $data_i$ of the grouping target attribute item (e.g. age) in the table T1 based on the secret key $sk_A$ in the key storage unit 12.

Enc($sk_A$, $data_i$)→$C_{A,data\_i}$

Note that the encryption unit 17 can acquire a parameter and a random number necessary for encryption processing from the encryption parameter storage unit 11 and the random number generation unit 16, respectively.

Similarly, the encryption unit 17 encrypts, for each record, the attribute value of each attribute item other than the grouping target attribute item in the table T1 based on the secret key $sk_A$. The attribute values of all attribute items in the table T1 are thus encrypted, and the table T1$e$ in which the attribute values of all attribute items are encrypted is generated as encrypted data, as shown in FIG. 19.

In step ST44, the control unit 18 of the encryption apparatus 10 sends the encrypted data formed from the table T1$e$ to the anonymization apparatus 20 via the communication unit 14.

In step ST45, the anonymization apparatus 20 stores the table T1$e$ as the encrypted data received by the communication unit 24 in the temporary data storage unit 23.

(Anonymization)

In step ST46, the parameter generation unit 15 of the encryption apparatus 10 generates a lower limit value L of a group, an upper limit value U of a group, and a representative value M of a group, which are anonymization parameters used for grouping. The encryption unit 17 encrypts the generated lower limit value L, upper limit value U, and representative value M of the group using the encryption method capable of performing magnitude comparison based on the secret key $sk_A$ in the key storage unit 12. An encrypted lower limit value $C_{A,L}$, an encrypted upper limit value $C_{A,U}$, and an encrypted representative value $C_{A,M}$, which are the encrypted anonymization parameters, are thus generated.

Enc($sk_A$, L)→$C_{A,L}$
Enc($sk_A$, U)→$C_{A,U}$
Enc($sk_A$, M)→$C_{A,M}$

In step ST47, the control unit 18 of the encryption apparatus 10 sends the grouping target attribute item (e.g. age) in the table T1$e$, and the encrypted lower limit value $C_{A,L}$, the encrypted upper limit value $C_{A,U}$, and the encrypted representative value $C_{A,M}$ to the anonymization apparatus 20 via the communication unit 14. However, in a case in which the anonymization apparatus 20 acquires the secret key $sk_A$ in advance and thus holds or generates the encrypted lower limit value $C_{A,L}$, the encrypted upper limit value $C_{A,U}$, and the encrypted representative value $C_{A,M}$ in advance, the generation and sending of the values $C_{A,L}$, $C_{A,U}$, and $C_{A,M}$ may be omitted. This also applies to the following embodiments and modifications.

In step ST48, the anonymization apparatus 20 receives the attribute item (e.g. age) and the encrypted lower limit value $C_{A,L}$, the encrypted upper limit value $C_{A,U}$, and the encrypted representative value $C_{A,M}$ by the communication unit 24. The anonymization processing unit 26 compares, for each record, the attribute value $C_{A,data\_i}$ for the attribute item (e.g. age) in the table T1$e$ stored in the temporary data storage unit 23, which matches the received attribute item (e.g. age), with the received encrypted lower limit value $C_{A,L}$ and encrypted upper limit value $C_{A,U}$.

$$\text{Comp}(C_{A,data\_i}, C_{A,L}) \to \begin{cases} 1 & (\text{if } data_i > L) \\ 0 & (\text{if } data_i = L) \\ -1 & (\text{if } data_i < L) \end{cases}$$

$$\text{Comp}(C_{A,data\_i}, C_{A,U}) \to \begin{cases} 1 & (\text{if } data_i > U) \\ 0 & (\text{if } data_i = U) \\ -1 & (\text{if } data_i < U) \end{cases}$$

If the attribute values $C_{A,data\_i}$ for the attribute item (e.g. age) in the table to be grouped ranging from the encrypted lower limit value $C_{A,L}$ (inclusive) to the encrypted upper limit value $C_{A,U}$ (inclusive), the attribute values $C_{A,data\_i}$ are replaced with the encrypted representative value $C_{A,M}$. A case in which the encrypted attribute value $C_{A,data\_i}$ is the encrypted lower limit value $C_{A,L}$ or more corresponds to a case in which the result of first comparison processing Comp($C_{A,data\_i}$, $C_{A,L}$) is "1" or "0". A case in which the encrypted attribute value $C_{A,data\_i}$ is the encrypted upper limit value $C_{A,U}$ or less corresponds to a case in which the result of second comparison processing Comp($C_{A,data\_i}$, $C_{A,U}$) is "−1" or "0".

Note that the grouping method such as whether to include a case in which the result of comparison processing Comp is 0 when replacing the attribute value $C_{A,data\_i}$ with the encrypted representative value $C_{A,M}$ may appropriately be changed. As the grouping method, for example, a general method according to an application purpose or aim may be used. The general method may be implemented in combination with the method of this embodiment.

That is, since the attribute values $C_{A,data\_i}$ encrypted in step ST43 are kept in the encrypted state and then appropriately replaced with the encrypted representative value $C_{A,M}$, the attribute values $C_{A,data\_i}$ are converted into an anonymized attribute value ($C_{A,M}$) without being decrypted.

The attribute values of the grouping target attribute item (e.g. age) in the table T1e are thus anonymized, and the table T1a including the anonymized attribute value ($C_{A,M}$) is generated as encrypted anonymized data, as shown in FIG. 20.

After that, the anonymization processing unit 26 saves the table T1a in the temporary data storage unit 23.

In step ST49, the control unit 29 of the anonymization apparatus 20 sends the encrypted anonymized data formed from the table T1a in the temporary data storage unit 23, to the decryption apparatus 30 via the communication unit 24.

According to this embodiment, it is possible to anonymize the encrypted data without decryption and decrypt the obtained encrypted anonymized data so as to use the anonymized data. Specifically, attribute values data_i in the table T1 expressed by a numerical value can be grouped by designating the lower limit value L and the upper limit value U of the group. Here, the anonymization apparatus 20 knows which attribute values ($C_{A,data\_i}$) are replaced, and all replaced cipher texts have the same value (the encrypted representative value $C_{A,M}$ for each group). However, the anonymization apparatus 20 does not know the lower limit value L, upper limit value U, and representative value M for the group and the original attribute values (data_i).

If the encryption apparatus 10 holds the encrypted data before grouping, a corresponding table of the encrypted data before and after grouping may be created. If the original data are separately held, the attribute values that have undergone the grouping can be reversed to the original state.

After that, in step ST50, a control unit 38 of the decryption apparatus 30 receives the encrypted anonymized data by the communication unit 34 and stores it in the temporary data storage unit 33. Based on the secret key $sk_A$ in the secret key storage unit 32, the decryption unit 37 decrypts the values for each attribute item in the table T1a that includes the encrypted anonymized data in the temporary data storage unit 33, and obtains the table of the obtained decryption result.

The control unit 38 of the decryption apparatus 30 determines whether, in the table of the decryption result, the attribute values for the grouping target attribute item (e.g. age) have been anonymized. For example, in a case in which the representative value of each group is "20s", "30s", "40s", or the like, if the attribute values include a character string "s", it is determined that the attribute values are anonymized. In addition, for example, as for the anonymized attribute values for the attribute item (e.g. age), if the values before anonymization are different from the values after anonymization, it may be determined that the attribute values are anonymized. In this case, the encryption apparatus 10 transmits the values before anonymization to the decryption apparatus 30 at an arbitrary timing. At any rate, if the determination result is negative, the processing is re-executed from step ST46 (or ST44) and repeated until a desirable anonymization result is obtained.

Steps ST51 and ST52 are then executed, like steps ST31 and ST32 described above.

As described above, according to this embodiment, the same function and effect as in the first embodiment can be obtained even in a case in which grouping is executed as anonymization processing.

Note that this embodiment may also be implemented by (additive) homomorphic encryption methods capable of performing magnitude comparison. When using these encryption methods, the encryption algorithm in each method is replaced, thereby similarly implementing the embodiment.

Sixth Embodiment: M2M and Grouping

An anonymization system according to the sixth embodiment will be described next with reference to FIG. 15.

Unlike the fifth embodiment in which the encryption apparatus 10 encrypts personal data and provides it to the anonymization apparatus 20, in the sixth embodiment, the anonymization apparatus 20 collects the encrypted data obtained by encrypting the personal data acquired by each device, like an M2M service. Each device here corresponds to each of encryption apparatuses (1 to N) 10.

Figure 21:
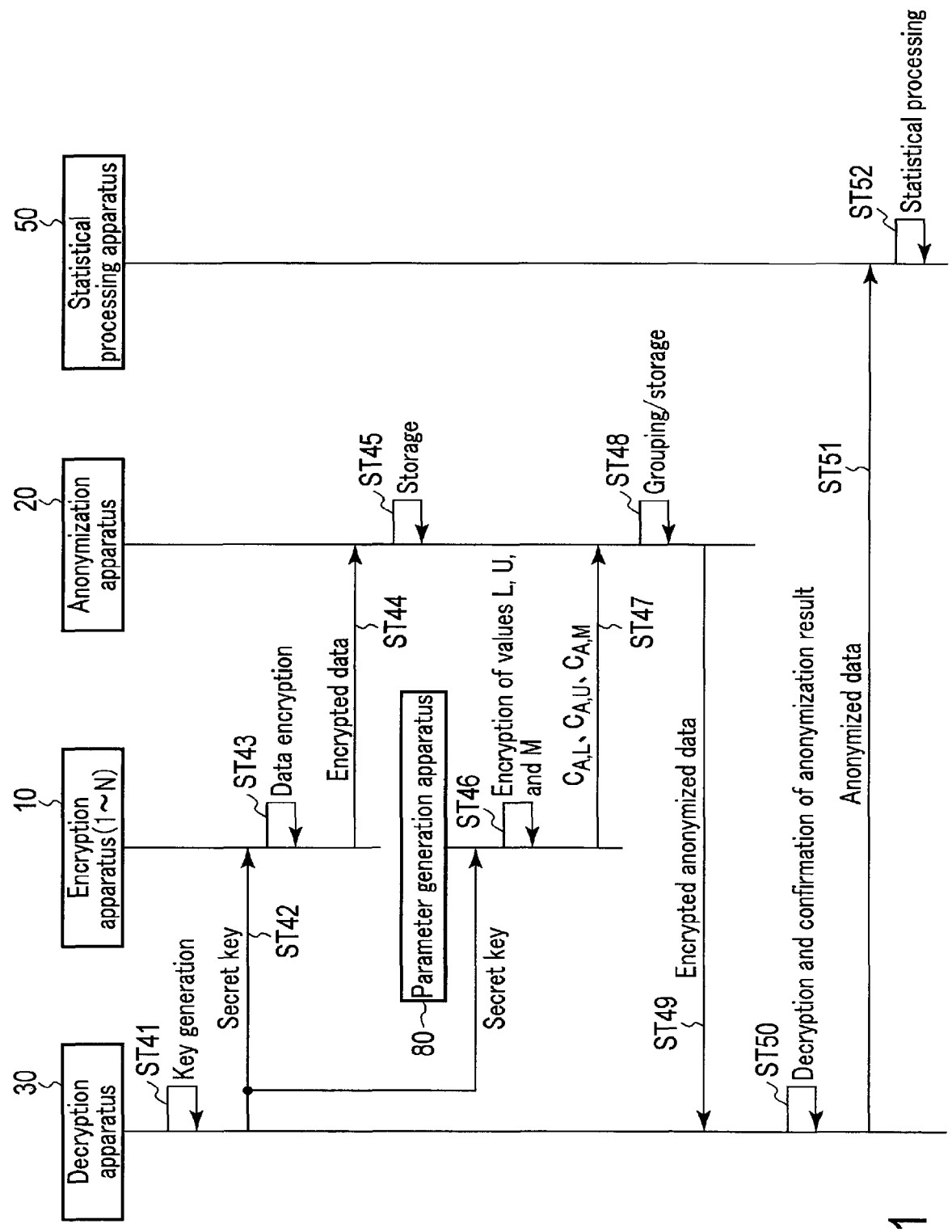
FIG. 21 is a sequence chart for explaining an operation according to the sixth embodiment.

The operation of the anonymization system according to this embodiment will be described next with reference to the sequence chart of FIG. 21. In the following explanation, a case in which anonymization is performed using an encryption method capable of performing magnitude comparison will be described as an example.

(Preparation)

Steps ST41 and ST42 are executed like steps ST21 and ST22 of the fourth embodiment. However, the encryption method used for key generation is the encryption method capable of performing magnitude comparison in the fifth embodiment.

In step ST43, the data acquisition unit 19 of each of the encryption apparatuses (1 to N) 10 acquires the personal data formed from the table T1, and stores it in the temporary data storage unit 13. The encryption unit 17 of each of the encryption apparatuses (1 to N) 10 encrypts, for each record, the attribute value $data_i$ for the grouping target attribute item (e.g. age) in the table T1 stored in the temporary data storage unit 13 based on the secret key $sk_A$ in the key storage unit 12.

$Enc(sk_A, data_i) \rightarrow C_{A,data\_i}$

Similarly, the encryption unit 17 of each of the encryption apparatuses (1 to N) 10 encrypts, for each record, the attribute values for each attribute item other than the grouping target attribute item in the table T1, based on the secret key $sk_A$. The attribute values for all attribute items in the table T1 are thus encrypted, and the table T1e in which the attribute values of all attribute items are encrypted is generated as encrypted data.

In step ST44, a control unit 18 of each of the encryption apparatuses (1 to N) 10 sends the encrypted data formed from the table T1e and the grouping target attribute item (e.g. age) in the table T1e to the anonymization apparatus 20 via the communication unit 14.

In step ST45, the anonymization apparatus 20 receives the table T1e that includes the encrypted data and the grouping target attribute item (e.g. age) in the table T1e by the communication unit 24. After that, the control unit 29 of the anonymization apparatus 20 stores the table T1e and the grouping target attribute item (e.g. age) in the temporary data storage unit 23. The table T1e in the temporary data storage unit 23 is updated to the contents of the collected tables T1e received from the encryption apparatuses (1 to N) 10.

(Anonymization)

In step ST46, the parameter generation unit 84 of the parameter generation apparatus 80 generates a lower limit value L of a group, an upper limit value U of the group, and a representative value M for the group, which are anonymization parameters used for grouping. The encryption unit 86 of the parameter generation apparatus 80 encrypts the generated lower limit value L, upper limit value U, and representative value M for the group using the encryption method capable of performing magnitude comparison, based on the secret key $sk_A$ in a key storage unit 82. The encrypted lower limit value $C_{A,L}$, the encrypted upper limit value $C_{A,U}$, and the encrypted representative value $C_{A,M}$, which are the encrypted anonymization parameters, are thus generated.

$Enc(sk_A, L) \rightarrow C_{A,L}$
$Enc(sk_A, U) \rightarrow C_{A,U}$
$Enc(sk_A, M) \rightarrow C_{A,M}$ In step ST47, the control unit 87 of the parameter generation apparatus 80 sends the grouping target attribute item (e.g. age) in the table T1$e$, and the encrypted lower limit value $C_{A,L}$, the encrypted upper limit value $C_{A,U}$, and the encrypted representative value $C_{A,M}$ to the anonymization apparatus 20 via the communication unit 83. However, in a case in which the anonymization apparatus 20 acquires the secret key $sk_A$ in advance and thus holds or generates the encrypted lower limit value $C_{A,L}$, the encrypted upper limit value $C_{A,U}$, and the encrypted representative value $C_{A,M}$ in advance, the generation and sending of the values $C_{A,L}$, $C_{A,U}$, and $C_{A,M}$ may be omitted.

Steps ST48 to ST52 are then executed as in the above-described fifth embodiment.

As described above, according to this embodiment, even if the plurality of encryption apparatuses 10 are provided, the same function and effect as in the fifth embodiment can be obtained.

Note that this embodiment can also be implemented by (additive) homomorphic encryption methods capable of performing magnitude comparison. When using these encryption methods, the encryption algorithm in each method is replaced, thereby similarly implementing the embodiment.

Seventh Embodiment: Noise Addition

An anonymization system according to the seventh embodiment will be described next with reference to FIGS. 1, 3, 5, and 6.

Unlike the first embodiment in which the random number R and the encrypted random number $C_{A,R}$ are used, in the seventh embodiment, an noise R and an encrypted noise $C_{A,R}$ are used. That is, in the seventh embodiment, the random number R in the first embodiment is regarded as the noise R, and attribute values in the table T1 are anonymized (pseudonymized by noise addition) by the same arrangement (FIG. 1) and processing as in the first embodiment. At this time, the table T1 is sequentially changed to the tables T1$e$ and T1$a$, as in the first embodiment (FIGS. 3, 5, and 6).

With the above-described arrangement, the same function and effect as in the first embodiment can be obtained, as shown in FIG. 22. Additionally, in this embodiment, in addition to anonymization (pseudonymization) according to the first embodiment, the encrypted noise $C_{A,R}$ is handled (added/subtracted) for the encrypted attribute values ($C_{A,data\_i+R}$) for the attribute items (e.g. age and income) other than the staff identification number, thereby attaining more advanced anonymization.

Modification of Seventh Embodiment: Addition of Noise

In the modification of the seventh embodiment, the anonymization apparatus 20 can pseudonymize attribute values $C_{A,data\_i}$ for the pseudonymization target attribute item (staff identification number) in the table T1$e$ by introducing the encrypted noise $C_{A,R}$ that changes for each record, as in the modification of the first embodiment.

This can obtain the same effect as in the modification of the first embodiment.

Additionally, in the modification of the seventh embodiment, the encrypted noises $C_{A,R}$ that change for each record are applied to the attribute values $C_{A,data\_i}$ for the noise addition target attribute items (e.g. age and income), in addition to the pseudonymization target attribute item (e.g. staff identification number), thereby attaining more advanced anonymization.

Eighth Embodiment: M2M and Noise Addition

An anonymization system according to the eighth embodiment will be described next with reference to FIG. 9.

Unlike the second embodiment in which the random number R and the encrypted random number $C_{A,R}$ are used for M2M, in the eighth embodiment, the noise R and the encrypted noise $C_{A,R}$ are used for M2M. That is, in the eighth embodiment, the random number R in the second embodiment is regarded as the noise R, and the attribute values in the table are anonymized (pseudonymized by noise addition) by the same processing as in the second embodiment.

With the above-described arrangement, the same function and effect as in the second embodiment can be obtained. Additionally, in this embodiment, in addition to anonymization (pseudonymization) according to the second embodiment, the encrypted noise $C_{A,R}$ is applied (added/subtracted) to the encrypted attribute values for the attribute items (e.g. age and income) other than the staff identification number, thereby attaining more advanced anonymization.

Modification of Eighth Embodiment: Addition of Noise

In the modification of the eighth embodiment, the anonymization apparatus 20 can pseudonymize the attribute values $C_{A,data\_i}$ for the pseudonymization target attribute item (e.g. staff identification number) in the table T1$e$ by introducing the encrypted noises $C_{A,R}$ that change for each record, as in the modification of the second embodiment.

This can obtain the same effect as in the modification of the second embodiment.

Additionally, in the modification of the eighth embodiment, the encrypted noises $C_{A,R}$ that change for each record are applied to the attribute values $C_{A,data\_i}$ for the noise addition target attribute items (e.g. age and income), in addition to the pseudonymization target attribute item (e.g. staff identification number), thereby attaining more advanced anonymization.

Ninth Embodiment: Top Coding by "AN2013-51001" Method

Figure 23:
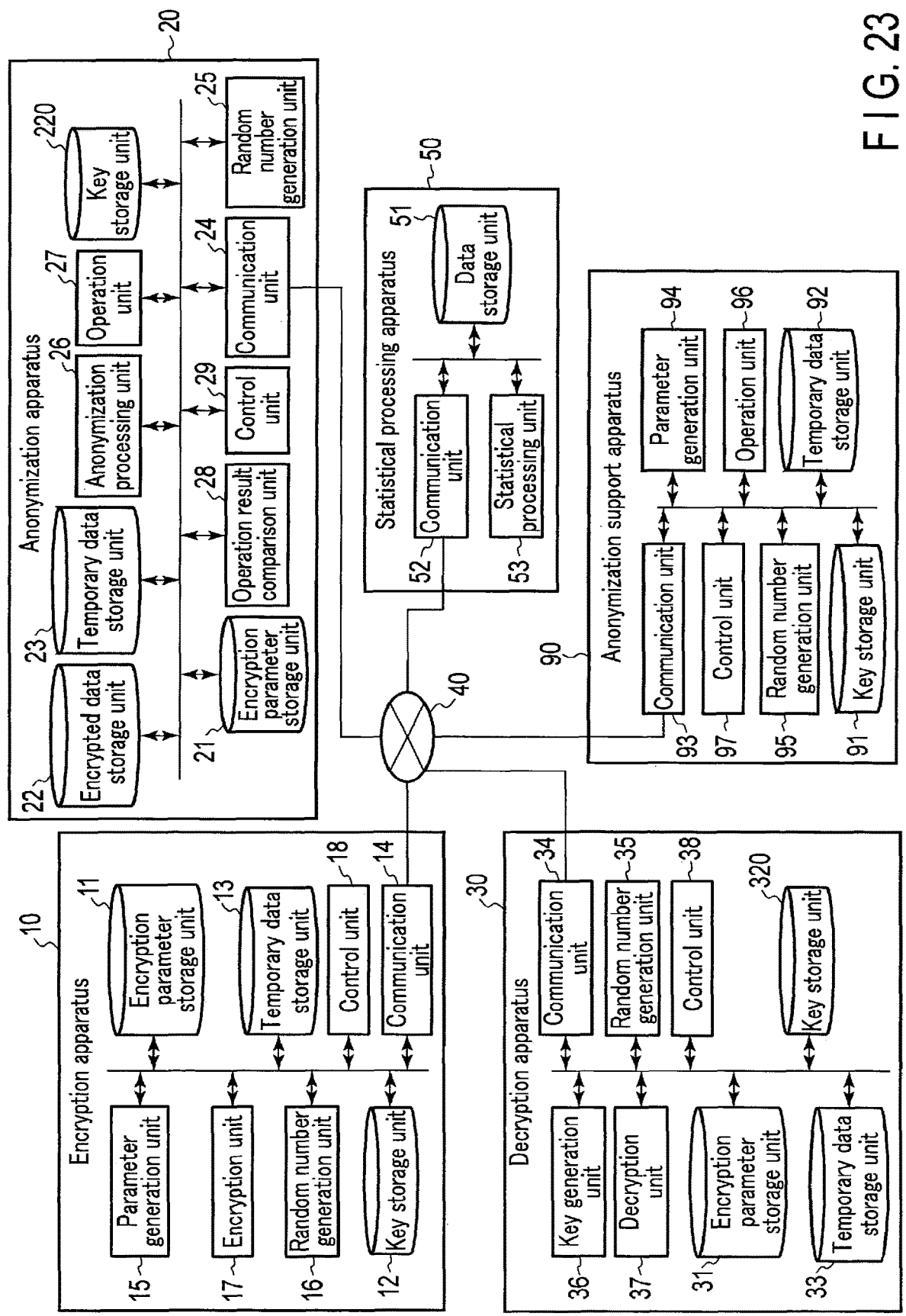
FIG. 23 is a schematic view showing an anonymization system according to the ninth embodiment and its peripheral arrangement.

FIG. 23 is a schematic view showing an anonymization system according to the ninth embodiment and its peripheral arrangement.

Unlike the third embodiment in which the "OPE" method is used, in the ninth embodiment, the "PN2014-178379" method is used.

Accordingly, in the ninth embodiment, an anonymization support apparatus 90 is further provided in addition to the arrangement shown in FIG. 1.

The anonymization support apparatus 90 includes a key storage unit 91, a temporary data storage unit 92, a communication unit 93, a parameter generation unit 94, a random number generation unit 95, an operation unit 96, and a control unit 97.

The key storage unit 91 and the temporary data storage unit 92 can be implemented as storage devices or storage areas of a storage device, which are readable/writable by a processor (not shown) and store a key and temporary data, respectively.

The communication unit 93, the parameter generation unit 94, the random number generation unit 95, the operation unit 96, and the control unit 97 are functional blocks implemented by, for example, a program including steps to be executed by a processor (not shown) in the anonymization support apparatus 90 (to be described later).

The anonymization apparatus 20 further includes a key storage unit 220 as compared to the arrangement shown in FIG. 1.

The decryption apparatus 30 includes a key storage unit 320 in place of the secret key storage unit 32 in the arrangement shown in FIG. 1.

Figure 24:
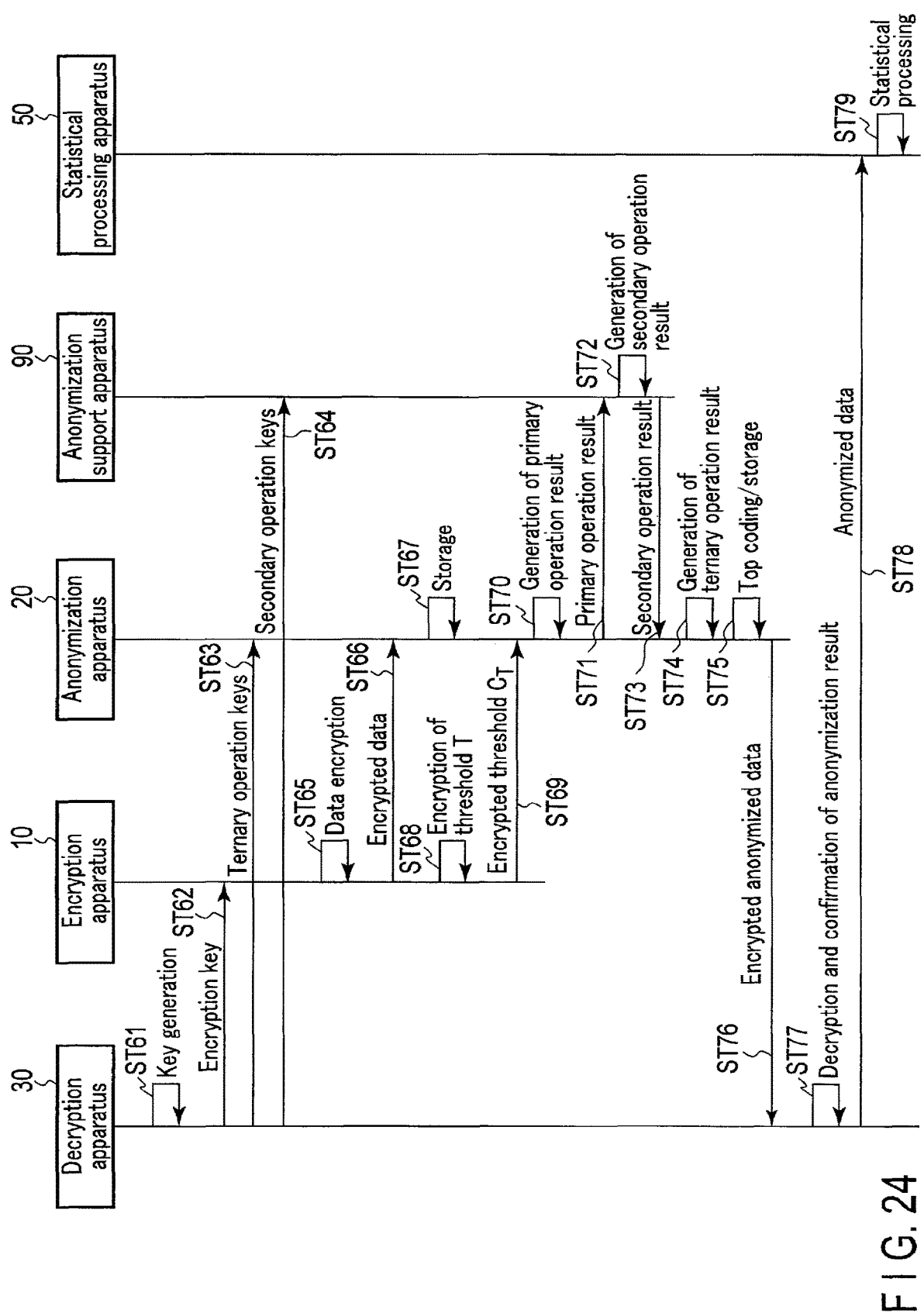
FIG. 24 is a sequence chart for explaining an operation according to the ninth embodiment.

The operation of the anonymization system according to this embodiment will be described next with reference to the sequence chart of FIG. 24 and the schematic views of FIGS. 25 and 26. In the following explanation, a case in which anonymization is performed using an (additive) homomorphic encryption method capable of performing magnitude comparison as described in [AN2013-51001] will be described as an example.

(Preparation)

In step ST61, the key generation unit 36 of the decryption apparatus 30 executes key generation based on the security parameter ($1^k$) stored in the encryption parameter storage unit 31 using the encryption method in [AN2013-51001]. The key generation unit 36 thus generates the encryption keys a, $g^{sv}$, g, and N, the secondary operation keys $a^{-1}$, s, and N, the ternary operation keys v and N, and the decryption keys sv, $a^{-1}$, and N (or s, v, $a^{-1}$, and N).

KeyGen($1^k$)→(a, $g^{sv}$, g, N, $a^{-1}$, s, v)

Note that the key generation unit 36 can acquire a random number necessary for the key generation processing from the random number generation unit 35. The key generation unit 36 saves the generated encryption keys a, $g^{sv}$, g, and N, the secondary operation keys $a^{-1}$, s, and N, the ternary operation keys v and N, and the decryption keys sv, $a^{-1}$, and N (or s, v, $a^{-1}$, and N) in the key storage unit 320.

In step ST62, the control unit 38 of the decryption apparatus 30 sends the encryption keys a, $g^{sv}$, g, and N to the encryption apparatus 10 via the communication unit 34. The control unit 18 of the encryption apparatus 10 stores the encryption keys a, $g^{sv}$, g, and N received by the communication unit 14 in the key storage unit 12.

In step ST63, the control unit 38 of the decryption apparatus 30 sends the ternary operation keys v and N to the anonymization apparatus 20 via the communication unit 34. The control unit 29 of the anonymization apparatus 20 stores the ternary operation keys v and N received by the communication unit 24 in the key storage unit 220.

In step ST64, the control unit 38 of the decryption apparatus 30 sends the secondary operation keys $a^{-1}$, s, and N to the anonymization support apparatus 90 via the communication unit 34. The control unit 97 of the anonymization support apparatus 90 stores the secondary operation keys $a^{-1}$, s, and N received by the communication unit 93 in the key storage unit 91.

In step ST65, the encryption unit 17 of the encryption apparatus 10 reads out the table T1 shown in FIG. 12 from the temporary data storage unit 13. The encryption unit 17 encrypts, for each record, the attribute value $data_i$ for the top coding target attribute item (e.g. income) of the table T1 based on the encryption keys a, $g^{sv}$, g, and N stored in the key storage unit 12.

Enc($data_i$)→$C_{data\_i}$

Note that the encryption unit 17 can acquire a parameter and a random number necessary for encryption processing from the encryption parameter storage unit 11 and the random number generation unit 16, respectively.

Similarly, the encryption unit 17 encrypts, for each record, the attribute values for each attribute item other than the top coding target attribute item in the table T1 based on the encryption keys a, $g^{sv}$, g, and N. The attribute values for all attribute items in the table T1 are thus encrypted, and the table T1e in which the attribute values of all attribute items are encrypted is generated as encrypted data, as shown in FIG. 25.

In step ST66, the control unit 18 of the encryption apparatus 10 sends the encrypted data formed from the table T1e to the anonymization apparatus 20 via the communication unit 14.

In step ST67, the anonymization apparatus 20 stores the table T1e as the encrypted data received by the communication unit 24 in the temporary data storage unit 23.

(Anonymization)

In step ST68, the parameter generation unit 15 of the encryption apparatus 10 generates a threshold T that is the anonymization parameter used for top coding. The encryption unit 17 encrypts the generated threshold T based on the encryption keys a, $g^{sv}$, g, and N in the key storage unit 12 using the encryption method described in [AN2013-51001]. The encrypted threshold $C_T$ that is the encrypted anonymization parameter is thus generated.

Enc(T)→$C_T$

In step ST69, the control unit 18 of the encryption apparatus 10 sends the top coding target attribute item (e.g. income) in the table T1e and the encrypted threshold $C_T$ to the anonymization apparatus 20 via the communication unit 14. However, in a case in which the anonymization apparatus 20 acquires the encryption keys a, $g^{sv}$, g, and N in advance and thus holds or generates the encrypted threshold $C_T$ in advance, the generation and sending of the encrypted threshold $C_T$ by the encryption apparatus 10 may be omitted. This also applies to the following embodiments and modifications.

In step ST70, the anonymization apparatus 20 receives the attribute item (e.g. income) and the encrypted threshold $C_T$ by the communication unit 24. The operation unit 27 of the anonymization apparatus 20 generates a primary operation result X=($X_1$, $X_2$) based on the attribute values $C_{data\_i}$ for the attribute item (e.g. income) in the table T1e stored in the temporary data storage unit 23, which matches the received attribute item (e.g. income), and based on the received encrypted threshold $C_T$.

In step ST71, the control unit 29 of the anonymization apparatus 20 sends the primary operation result X to the anonymization support apparatus 90 via the communication unit 24.

In step ST72, the anonymization support apparatus 90 receives the primary operation result X by the communication unit 93. The operation unit 96 of the anonymization support apparatus 90 generates a secondary operation result Y=($Y_1$, $Y_2$) based on the received primary operation result X and the secondary operation keys $a^{-1}$, s, and N in the key storage unit 91.

In step ST73, the control unit 97 of the anonymization support apparatus 90 sends the secondary operation result Y to the anonymization apparatus 20 via the communication unit 93.

In step ST74, the anonymization apparatus 20 receives the secondary operation result Y by the communication unit 24. The operation unit 27 of the anonymization apparatus 20 generates a ternary operation result W based on the received secondary operation result Y and the ternary operation keys v and N in the key storage unit 91.

In step ST75, the operation result comparison unit 28 of the anonymization apparatus 20 compares the ternary operation result W with N/2. If W<N/2, the comparison result is determined as positive. Otherwise, the comparison result is determined as negative (or 0). The determination result is output from the operation result comparison unit 28 to the anonymization processing unit 26.

If the determination result is positive, the anonymization processing unit 26 of the anonymization apparatus 20 replaces the attribute values $C_{data\_i}$ with the encrypted threshold $C_T$. Note that "if the determination result is positive" means "if equation $F=C_{data\_i}-C_T$ is positive". "Otherwise" means "if equation $F=C_{data\_i}-C_T$ is negative (or 0)".

That is, since the attribute values $C_{data\_i}$ encrypted in step ST65 are kept in the encrypted state and then appropriately replaced with the encrypted threshold $C_T$, the encrypted attribute values $C_{data\_i}$ are converted into the anonymized attribute value $(C_T)$ without being decrypted.

The attribute values for the top coding target attribute item (e.g. income) in the table T1e are thus anonymized, and the table T1a including the anonymized attribute value $(C_T)$ is generated as encrypted anonymized data, as shown in FIG. 26.

After that, the anonymization processing unit 26 saves the table T1a in the temporary data storage unit 23.

In step ST76, the control unit 29 of the anonymization apparatus 20 sends the encrypted anonymized data formed from the table T1a in the temporary data storage unit 23 to the decryption apparatus 30 via the communication unit 24.

According to this embodiment, it is possible to anonymize the encrypted data without decryption and decrypt the obtained encrypted anonymized data so as to use the anonymized data. Specifically, the attribute values data_i in the table T1 expressed by numerical values can be top-coded using the threshold T for top coding. Here, the anonymization apparatus 20 knows which attribute values $(C_{data\_i})$ are replaced, and all replaced cipher texts have the same value $(C_T)$. However, the anonymization apparatus 20 does not know the threshold T and the original attribute values (data_i). In addition, if the encryption apparatus 10 holds encrypted data before top coding, a corresponding table of the encrypted data before and after top coding may be created. If the original data is separately held, the attribute values that have undergone the top coding can be reversed to the original state.

After that, in step ST76, the control unit 38 of the decryption apparatus 30 receives the encrypted anonymized data by the communication unit 34 and stores it in a temporary data storage unit 33. Based on the decryption keys sv, $a^{-1}$, and N (or s, v, $a^{-1}$, and N) in the key storage unit 320, a decryption unit 37 decrypts the values for each attribute item in the table T1a that includes the encrypted anonymized data in the temporary data storage unit 33, and obtains the table of the obtained decryption result.

The control unit 38 of the decryption apparatus 30 determines whether, of the table of the decryption result, the attribute values for the top coding target attribute item (e.g. income) have been anonymized. Specifically, for example, the determination is done in the same way as in the third embodiment. If the determination result is negative, the processing is re-executed from step ST68 (or ST66) and repeated until a desirable anonymization result is obtained.

Steps ST78 and ST79 are then executed, like steps ST31 and ST32 of the third embodiment.

As described above, according to this embodiment, the same function and effect as in the first embodiment can be obtained even in a case in which top coding is executed as anonymization processing using the encryption method of the "AN2013-51001" method.

Figure 27:
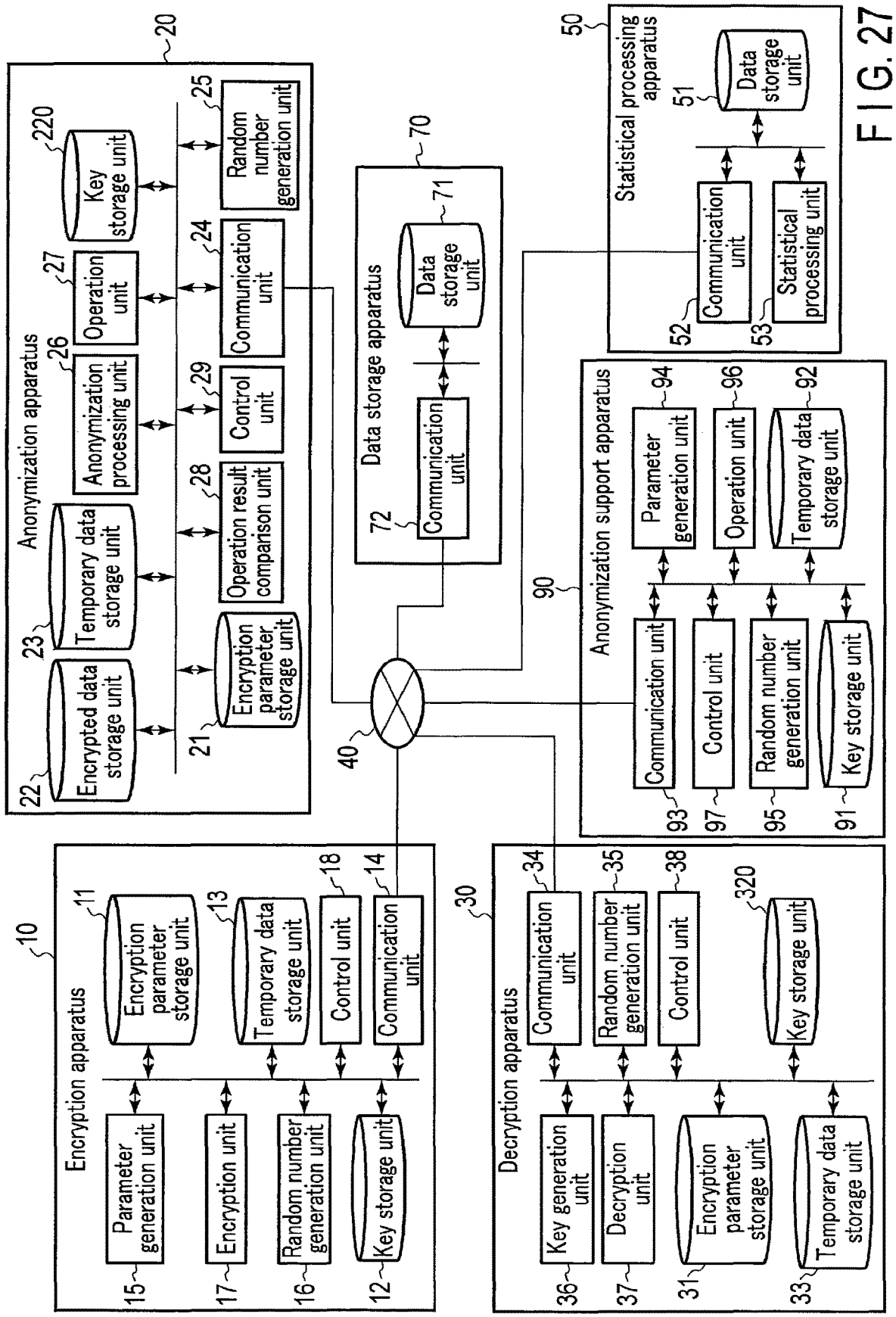
FIG. 27 is a schematic view showing the arrangement of a modification of the ninth embodiment.
Figure 28:
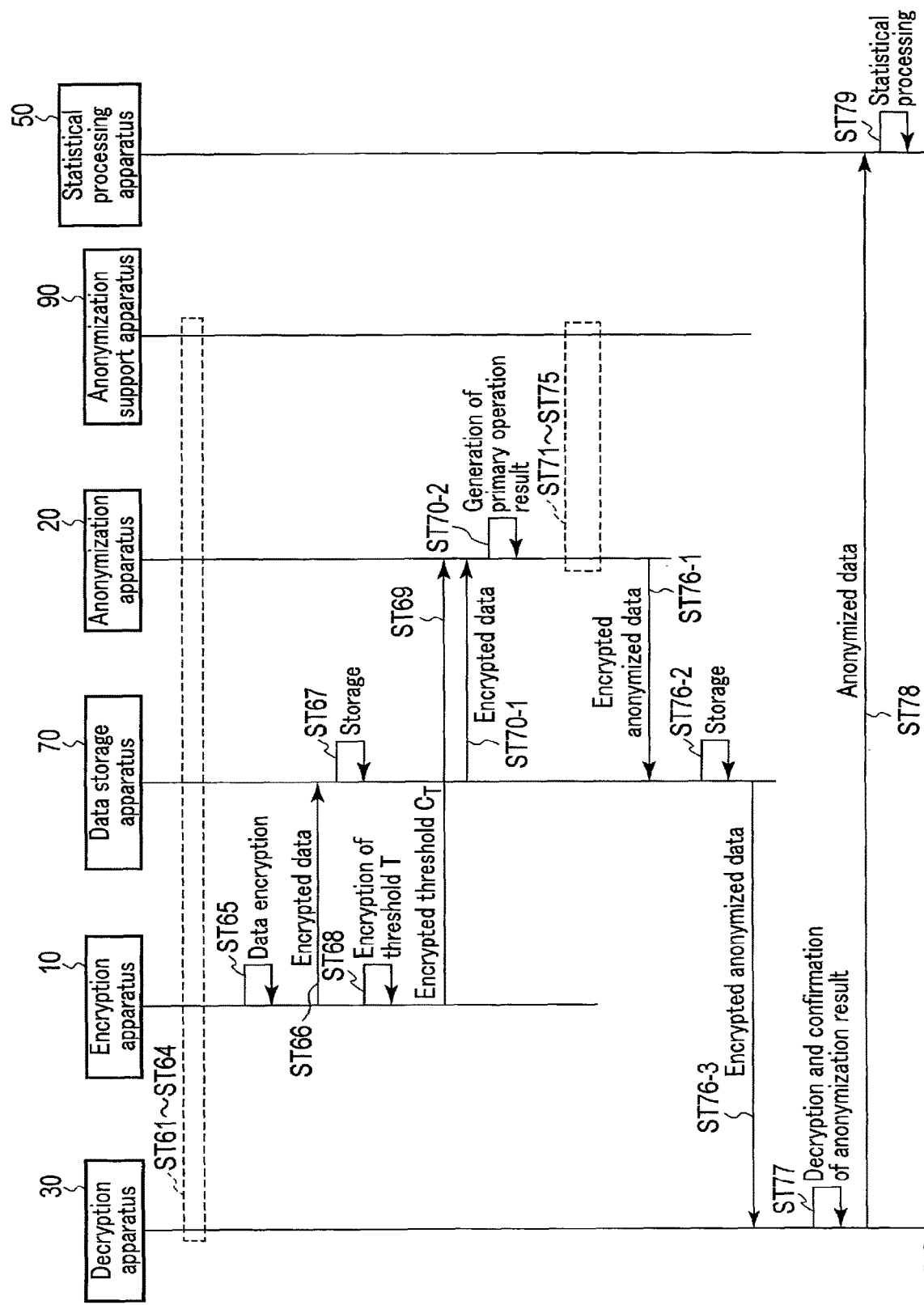
FIG. 28 is a sequence chart for explaining an operation according to the modification of the ninth embodiment.

In this embodiment, as in the modifications shown in FIGS. 2 and 7, a data storage apparatus 70 configured to store the encrypted data and the encrypted anonymized data may further be provided, as shown in FIG. 27, instead of storing the encrypted data and the encrypted anonymized data in the anonymization apparatus 20. At this time, the same effect as in this embodiment can be obtained by making the anonymization apparatus 20 cooperate with the existing data storage apparatus 70. For example, as shown in FIG. 28, the encrypted data may be sent to the data storage apparatus 70 in step ST66, and the data storage apparatus 70 may store the encrypted data in step ST67. In addition, the data storage apparatus 70 may send the encrypted data to the anonymization apparatus 20 in step ST70-1, and the anonymization apparatus 20 may generate the primary operation result in step ST70-2. Similarly, the anonymization apparatus 20 may send the encrypted anonymized data to the data storage apparatus 70 in step ST76-1, and the data storage apparatus 70 may store the encrypted anonymized data in step ST76-2. In step ST76-3, the data storage apparatus 70 may send the encrypted anonymized data to the decryption apparatus 30. At this time, the effect of this embodiment can be obtained without significantly changing the existing data storage apparatus 70. This also applies to the embodiments and modifications to be described later.

Figure 29:
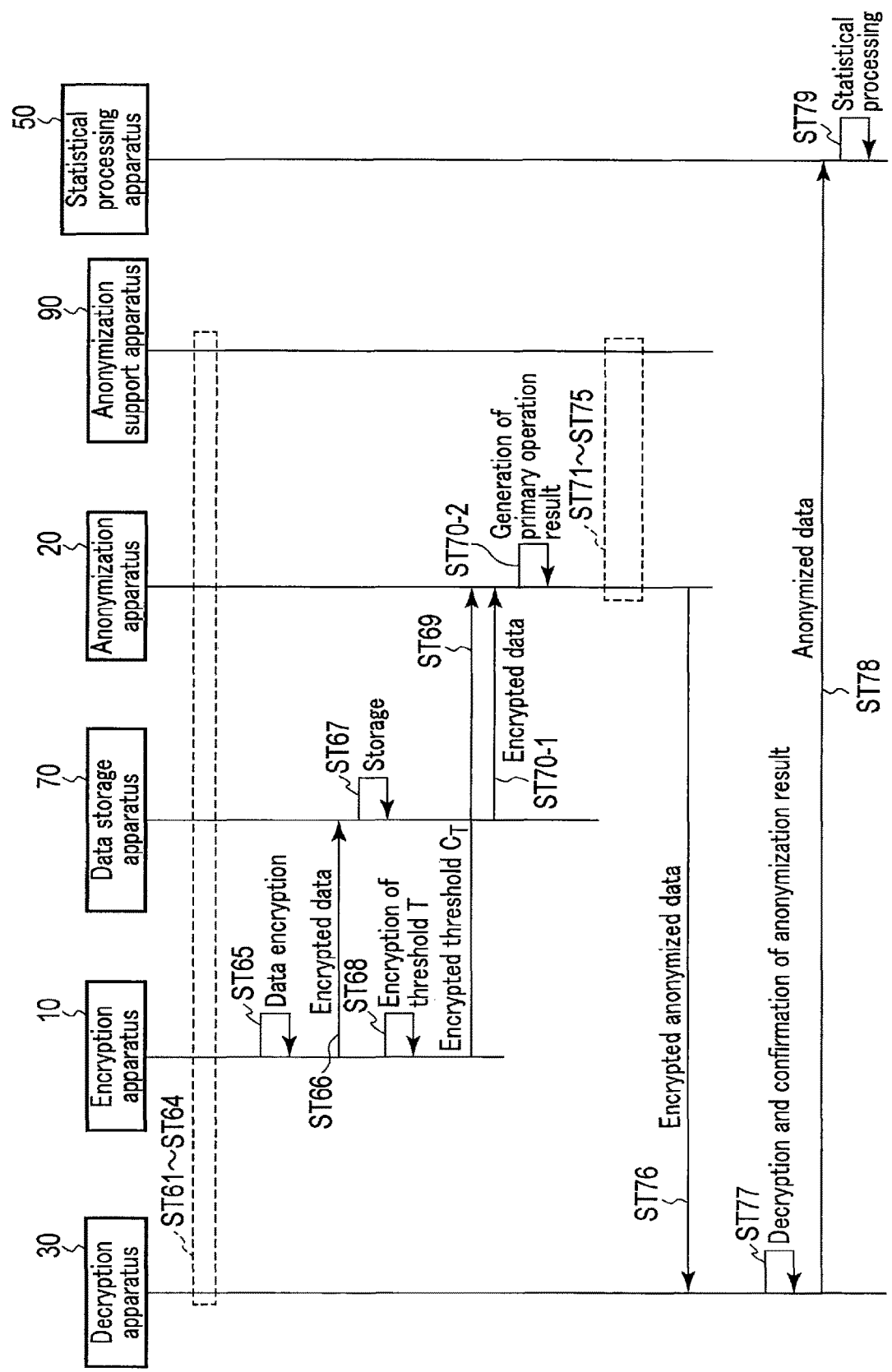
FIG. 29 is a sequence chart for explaining a modified operation according to the modification of the ninth embodiment.

Additionally, for example, as in the modification shown in FIG. 8, as shown in FIG. 29, original step ST76 may be executed in place of steps ST76-1 to ST76-3 in FIG. 28. In this case, the same effect as in the operation shown in FIG. 8 can be obtained.

10th Embodiment: M2M, "AN2013-51001" Method, and Top Coding

Figure 30:
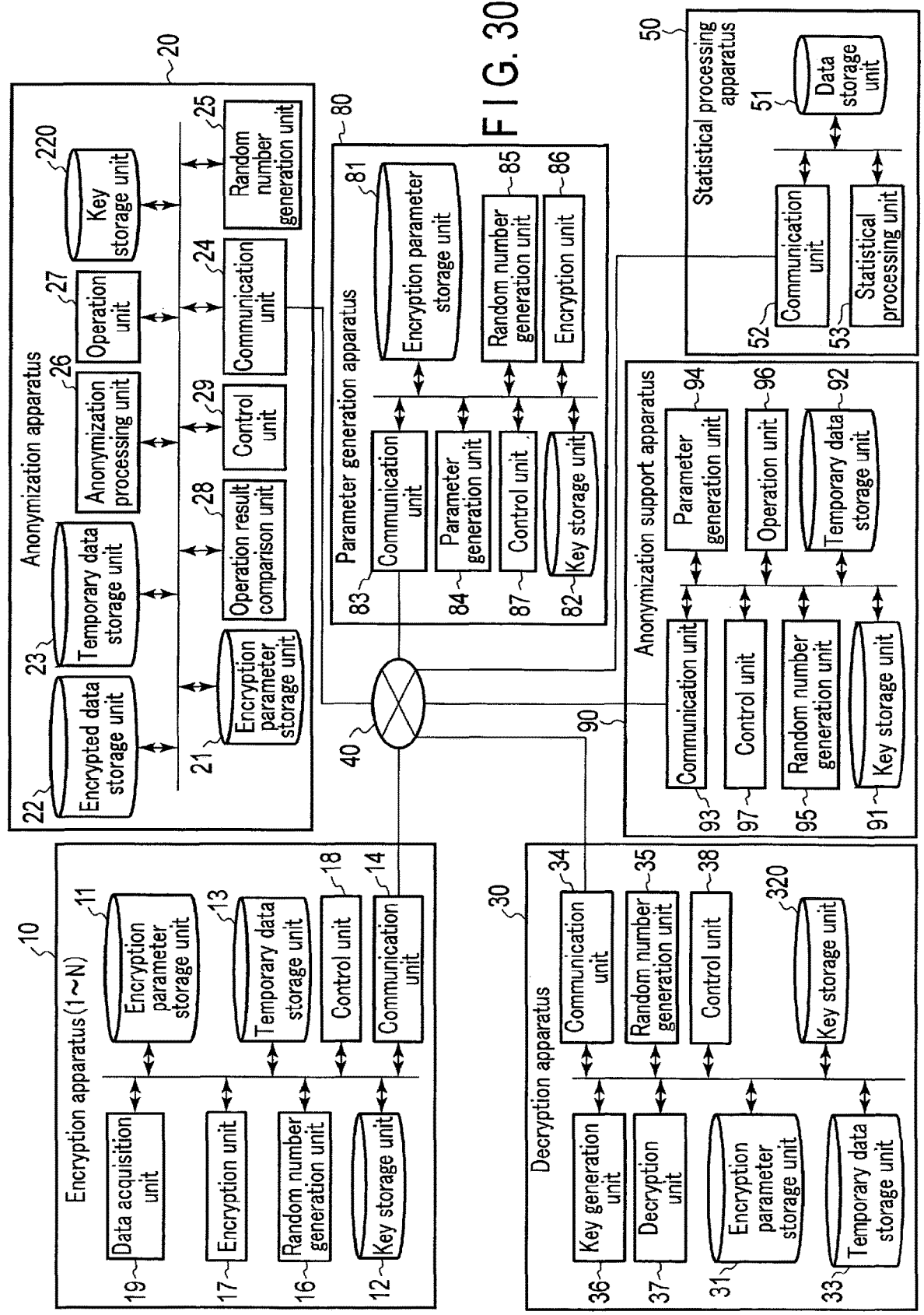
FIG. 30 is a schematic view showing an anonymization system according to the 10th embodiment and its peripheral arrangement.

FIG. 30 is a schematic view showing an anonymization system according to the 10th embodiment and its peripheral arrangement.

Unlike the ninth embodiment in which the encryption apparatus 10 encrypts the personal data and provides it to the anonymization apparatus 20, in the 10th embodiment, the anonymization apparatus 20 collects the encrypted data obtained by encrypting the personal data acquired by each device, like an M2M service. Each device here corresponds to each of encryption apparatuses (1 to N) 10.

Specifically, in the 10th embodiment, the N encryption apparatuses 10 are provided, and a parameter generation apparatus 80 is further provided, as compared to the arrangement shown in FIG. 23. The arrangements of the N encryption apparatuses (1 to N) 10 and the parameter generation apparatus 80 are the same as in the fourth embodiment.

The operation of the anonymization system according to this embodiment will be described next with reference to the sequence chart of FIG. 31.

(Preparation)

Step ST61 is executed as in the above-described ninth embodiment.

In step ST62, the control unit 38 of the decryption apparatus 30 sends the encryption keys a, $g^{sv}$, g, and N to the encryption apparatuses (1 to N) 10 and the parameter generation apparatus 80 via the communication unit 34. The control unit 87 of the parameter generation apparatus 80 stores the encryption keys a, $g^{sv}$, g, and N received by the communication unit 83 in the key storage unit 82. Similarly, the control unit 18 of each encryption apparatus 10 stores the encryption keys a, $g^{sv}$, g, and N received by the communication unit 14 in the key storage unit 12. Note that in each of the encryption apparatuses (1 to N) 10, the encryption keys a, $g^{sv}$, g, and N may be input and stored at the time of device assembly. Alternatively, after the device is arranged, the encryption keys a, $g^{sv}$, g, and N may be received via a network and stored.

Steps ST63 and ST64 are executed as in the above-described ninth embodiment.

In step ST65, the data acquisition unit 19 of each of the encryption apparatuses (1 to N) 10 acquires the personal data formed from the table T1, and stores it in the temporary data storage unit 13. The encryption unit 17 of each encryption apparatus 10 encrypts, for each record, the attribute value $data_i$ for the top coding target attribute item (e.g. income) in the table T1 stored in the temporary data storage unit 13 based on the encryption keys a, $g^{sv}$, g, and N in the key storage unit 12.

$Enc(data_i) \rightarrow C_{data\_i}$

Note that the encryption unit 17 can acquire a parameter and a random number necessary for encryption processing from the encryption parameter storage unit 11 and the random number generation unit 16, respectively.

Similarly, the encryption unit 17 encrypts, for each record, the attribute values for each attribute item other than the top coding target attribute item in the table T1 based on the encryption keys a, $g^{sv}$, g, and N. The attribute values of all attribute items in the table T1 are thus encrypted, and the table T1e in which the attribute values for all attribute items are encrypted is generated as encrypted data.

In step ST66, the control unit 18 of each of the encryption apparatuses (1 to N) 10 sends the encrypted data formed from the table T1e and the top coding target attribute item (e.g. income) in the table T1e to the anonymization apparatus 20 via the communication unit 14.

In step ST67, the anonymization apparatus 20 receives the table T1e that is the encrypted data and the top coding target attribute item (e.g. income) in the table T1e by the communication unit 24. After that, the control unit 29 of the anonymization apparatus 20 stores the table T1e and the top coding target attribute item (e.g. income) in the temporary data storage unit 23. The table T1e in the temporary data storage unit 23 is updated to the contents of the collected tables T1e received from the encryption apparatuses (1 to N) 10.

(Anonymization)

In step ST68, the parameter generation unit 84 of the parameter generation apparatus 80 generates a threshold T that is the anonymization parameter used for top coding. The encryption unit 86 of the parameter generation apparatus 80 encrypts the generated threshold T based on the encryption keys a, $g^{sv}$, g, and N in a key storage unit 82 using the encryption method of the "AN2013-51001" method. The encrypted threshold $C_T$ that is the encrypted anonymization parameter is thus generated.

$Enc(T) \rightarrow C_T$

In step ST69, the control unit 87 of the parameter generation apparatus 80 sends the encrypted threshold $C_T$ to the anonymization apparatus 20 via the communication unit 83.

Steps ST70 to ST79 are then executed as in the above-described ninth embodiment.

As described above, according to this embodiment, even if the plurality of encryption apparatuses 10 are provided, the same function and effect as in the ninth embodiment can be obtained.

In this embodiment, the secret key itself is not stored in the devices, unlike the fourth or sixth embodiment. For this reason, even if the key is stolen from any device, the encrypted data cannot be decrypted or anonymized.

11th Embodiment: Grouping by "AN2013-51001" Method

An anonymization system according to the 11th embodiment will be described next with reference to FIG. 23.

Unlike the ninth embodiment in which the encrypted "income" is top-coded, in the 11th embodiment, grouping is performed for the encrypted "age".

Figure 32:
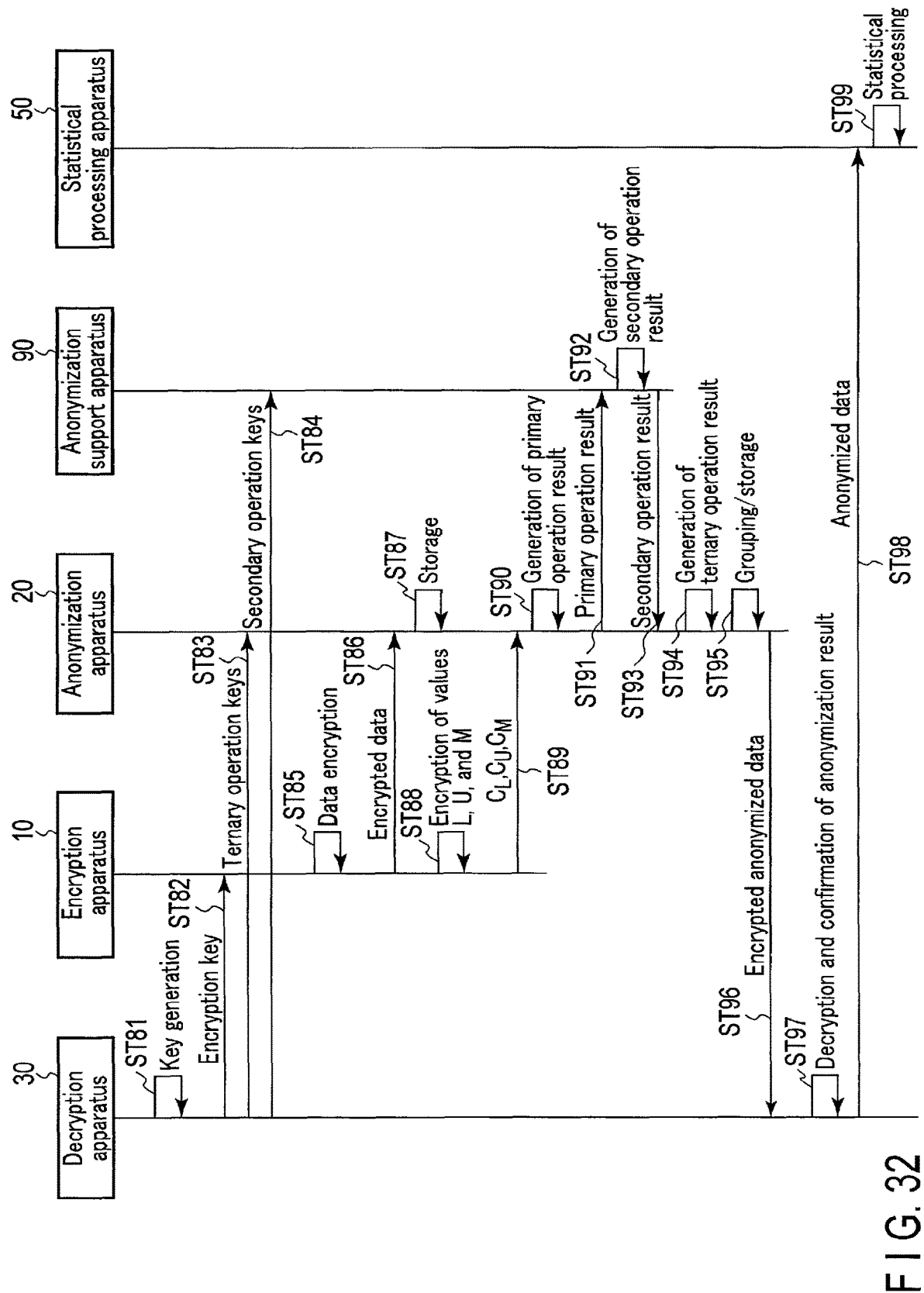
FIG. 32 is a sequence chart for explaining an operation according to the 11th embodiment.

The operation of the anonymization system according to this embodiment will be described next with reference to the sequence chart of FIG. 32 and the schematic views of FIGS. 33 and 34. In the following explanation, a case in which anonymization is performed using the encryption method as described in [AN2013-51001] will be described below as an example.

(Preparation)

Steps ST81 to ST84 are executed, like steps ST61 to ST64 of the ninth embodiment.

In step ST85, the encryption unit 17 of the encryption apparatus 10 reads out the table T1 before encryption from the temporary data storage unit 13. The encryption unit 17 encrypts, for each record, the attribute value $data_i$ for the grouping target attribute item (e.g. age) in the table T1 based on encryption keys a, $g^{sv}$, g, and N stored in the key storage unit 12.

$Enc(data_i) \rightarrow C_{data\_i}$

Note that the encryption unit 17 can acquire a parameter and a random number necessary for encryption processing from the encryption parameter storage unit 11 and the random number generation unit 16, respectively.

Similarly, the encryption unit 17 encrypts, for each record, the attribute values for each attribute item other than the grouping target attribute item in the table T1 based on the encryption keys a, $g^{sv}$, g, and N. The attribute values of all attribute items in the table T1 are thus encrypted, and the table T1e in which the attribute values of all attribute items are encrypted is generated as encrypted data, as shown in FIG. 33.

Steps ST85 and ST86 are then executed, like steps ST65 and ST66 of the ninth embodiment.

(Anonymization)

In step ST88, the parameter generation unit 15 of the encryption apparatus 10 generates a lower limit value L, an upper limit value U, and a representative value M for each group, which are the anonymization parameters used for grouping. The encryption unit 17 encrypts the generated lower limit value L, upper limit value U, and representative value M based on the encryption keys a, $g^{sv}$, g, and N in the key storage unit 12 using the encryption method as described in [AN2013-51001]. The encrypted lower limit value $C_L$, the encrypted upper limit value $C_U$, and the encrypted representative value $C_M$, which are the encrypted anonymization parameters, are thus generated.

Enc(L)→$C_L$
Enc(U)→$C_U$
Enc(M)→$C_M$

In step ST89, the control unit 18 of the encryption apparatus 10 sends the grouping target attribute item (e.g. age) in the table T1e, and the encrypted lower limit value $C_L$, the encrypted upper limit value $C_U$, and the encrypted representative value $C_M$ to the anonymization apparatus 20 via the communication unit 14. However, in a case in which the anonymization apparatus 20 acquires the encryption keys a, $g^{sv}$, g, and N in advance and thus holds or generates the encrypted lower limit value $C_L$, the encrypted upper limit value $C_U$, and the encrypted representative value $C_M$ in advance, the generation and sending of the values $C_L$, $C_U$, and $C_M$ may be omitted. This also applies to the following embodiments and modifications.

In step ST90, the anonymization apparatus 20 receives the attribute item (e.g. age) and the encrypted lower limit value $C_L$, the encrypted upper limit value $C_U$, and the encrypted representative value $C_M$ by a communication unit 24. The operation unit 27 of the anonymization apparatus 20 generates primary operation results $X_L$ and $X_U$ based on the attribute values $C_{data\_i}$ for the attribute item (e.g. age) of the table T1e in the temporary data storage unit 23, which matches the received attribute item (e.g. age), and based on the received encrypted lower limit value $C_L$ and encrypted upper limit value $C_U$. The primary operation result $X_L$=($X1_L$, $X2_L$) is analysis information concerning the lower limit value L. The primary operation result $X_U$=($X1_U$, $X2_U$) is analysis information concerning the upper limit value U.

In step ST91, the control unit 29 of the anonymization apparatus 20 sends the primary operation results $X_L$ and $X_U$ to the anonymization support apparatus 90 via the communication unit 24.

In step ST92, the anonymization support apparatus 90 receives the primary operation results $X_L$ and $X_U$ by the communication unit 93. The operation unit 96 of the anonymization support apparatus 90 generates secondary operation results $Y_L$ and $Y_U$ based on the received primary operation results $X_L$ and $X_U$ and the secondary operation keys $a^{-1}$, s, and N in the key storage unit 91. The secondary operation result $Y_L$=($Y1_L$, $Y2_L$) is analysis information concerning the lower limit value L. The secondary operation result $Y_U$=($Y1_U$, $Y2_U$) is analysis information concerning the upper limit value U.

In step ST93, the control unit 97 of the anonymization support apparatus 90 sends the secondary operation results $Y_L$ and $Y_U$ to the anonymization apparatus 20 via the communication unit 93.

In step ST94, the anonymization apparatus 20 receives the secondary operation results $Y_L$ and $Y_U$ by the communication unit 24. The operation unit 27 of the anonymization apparatus 20 generates ternary operation results $W_L$ an $W_U$ based on the received secondary operation results $Y_L$ and $Y_U$ and the ternary operation keys v and N in the key storage unit 91. The ternary operation result $W_L$ is analysis information concerning the lower limit value L. The ternary operation result $W_U$ is analysis information concerning the upper limit value U.

In step ST95, the operation result comparison unit 28 of the anonymization apparatus 20 compares the ternary operation result $W_L$ concerning the lower limit value L with N/2. If $W_L$<N/2, the comparison result is determined as positive. Otherwise, the comparison result is determined as negative (or 0). The determination result concerning the lower limit value L is output from the operation result comparison unit 28 to the anonymization processing unit 26.

Similarly, the operation result comparison unit 28 of the anonymization apparatus 20 compares the ternary operation result $W_U$ concerning the upper limit value U with N/2. If $W_U$<N/2, the comparison result is determined as positive. Otherwise, the comparison result is determined as negative (or 0). The determination result concerning the upper limit value U is output from the operation result comparison unit 28 to the anonymization processing unit 26.

After that, if the determination result concerning the lower limit value L is positive, and the determination result concerning the upper limit value U is negative (or 0), the anonymization processing unit 26 of the anonymization apparatus 20 replaces the attribute value $C_{data\_i}$ with the encrypted representative value $C_M$. Note that "if the determination result concerning the lower limit value L is positive" means "if equation F=$C_{data\_i}$-$C_L$ is positive". "If the determination result concerning the upper limit value U is negative (or 0)" means "if equation F=$C_{data\_i}$-$C_U$ is negative (or 0)". That is, if the attribute values $C_{data\_i}$ fall within the range from the encrypted lower limit value $C_L$ to the encrypted upper limit value $C_U$, the anonymization processing unit 26 replaces those attribute values $C_{data\_i}$ with the encrypted representative value $C_M$.

Accordingly, since the attribute values $C_{data\_i}$ encrypted in step ST85 are kept in the encrypted state and appropriately replaced with the encrypted representative value $C_M$, the encoded attribute values $C_{data\_i}$ are converted into the anonymized attribute value ($C_M$) without being decrypted.

The attribute values for the grouping target attribute item (e.g. age) in the table T1e are thus anonymized, and the table T1a including the anonymized attribute value ($C_M$) is generated as encrypted anonymized data, as shown in FIG. 34.

After that, the anonymization processing unit 26 saves the table T1a in the temporary data storage unit 23.

In step ST96, the control unit 29 of the anonymization apparatus 20 sends the encrypted anonymized data formed from the table T1a in the temporary data storage unit 23 to the decryption apparatus 30 via the communication unit 24.

According to this embodiment, it is possible to anonymize the encrypted data without decryption and decrypt the obtained encrypted anonymized data so as to use the anonymized data. Specifically, the attribute values data_i in the table T1 expressed by numerical values can be grouped by designating the lower limit value L and the upper limit value U for the group. Here, the anonymization apparatus 20 knows which attribute values ($C_{data\_i}$) are replaced, and all replaced cipher texts have the same value (the encrypted representative value $C_M$ for each group). However, the anonymization apparatus 20 does not know the lower limit value L, the upper limit value U, and the representative value M for the group and the original attribute values (data_i).

If the encryption apparatus 10 holds the encrypted data before grouping, a corresponding table of the encrypted data before and after grouping may be created. If the original data is separately held, the attribute values that have undergone the grouping can be reversed to the original state.

After that, in step ST97, the control unit 38 of the decryption apparatus 30 receives the encrypted anonymized data by the communication unit 34 and stores it in the temporary data storage unit 33. Based on the decryption keys sv, $a^{-1}$, and N (or s, v, $a^{-1}$, and N) in a key storage unit 320, the decryption unit 37 decrypts the value of each attribute item in the table T1a that includes the encrypted anonymized data in the temporary data storage unit 33, and obtains the table of the obtained decryption result.

The control unit 38 of the decryption apparatus 30 determines whether, of the table of the decryption result, the attribute values for the grouping target attribute item (e.g. age) have been anonymized. Specifically, for example, the determination is done in the same way as in the fifth embodiment. If the determination result is negative, the processing is re-executed from step ST88 (or ST86) and repeated until a desirable anonymization result is obtained.

Steps ST98 and ST99 are then executed, like steps ST51 and ST52 described above.

As described above, according to this embodiment, the same function and effect as in the first embodiment can be obtained even in a case in which grouping is executed as anonymization processing using the encryption method of the "AN2013-51001" method.

12th Embodiment: M2M, "AN2013-51001" Method, and Grouping

An anonymization system according to the 12th embodiment will be described next with reference to FIG. 30.

Unlike the 11th embodiment in which the encryption apparatus 10 encrypts the personal data and provides it to the anonymization apparatus 20, in the 12th embodiment, the anonymization apparatus 20 collects the encrypted data obtained by encrypting the personal data acquired by each device, like an M2M service. Each device here corresponds to each of encryption apparatuses (1 to N) 10.

Specifically, in the 12th embodiment, the N encryption apparatuses 10 are provided, and a parameter generation apparatus 80 is further provided, as compared to the arrangement shown in FIG. 23. The arrangements of the N encryption apparatuses (1 to N) 10 and the parameter generation apparatus 80 are the same as in the fourth embodiment.

The operation of the anonymization system according to this embodiment will be described next with reference to the sequence chart of FIG. 35.

(Preparation)

Step ST81 is executed as in the above-described 11th embodiment.

In step ST82, the control unit 38 of the decryption apparatus 30 sends encryption keys a, $g^{sv}$, g, and N to the encryption apparatuses (1 to N) 10 and the parameter generation apparatus 80 via the communication unit 34. The control unit 87 of the parameter generation apparatus 80 stores the encryption keys a, $g^{sv}$, g, and N received by the communication unit 83 in the key storage unit 82. Similarly, the control unit 18 of each encryption apparatus 10 stores the encryption keys a, $g^{sv}$, g, and N received by the communication unit 14 in the key storage unit 12. Note that in each of the encryption apparatuses (1 to N) 10, the encryption keys a, $g^{sv}$, g, and N may be input and stored at the time of device assembly. Alternatively, after the device is arranged, the encryption keys a, $g^{sv}$, g, and N may be received via a network and stored.

Steps ST83 and ST84 are executed as in the above-described 11th embodiment.

In step ST85, the data acquisition unit 19 of each of the encryption apparatuses (1 to N) 10 acquires the personal data formed from the table T1, and stores it in the temporary data storage unit 13. The encryption unit 17 of each encryption apparatus 10 encrypts, for each record, the attribute value $data_i$ for the grouping target attribute item (e.g. age) in the table T1 stored in the temporary data storage unit 13, based on the encryption keys a, $g^{sv}$, g, and N in the key storage unit 12.

Enc($data_i$)→$C_{data\_i}$

Note that the encryption unit 17 can acquire a parameter and a random number necessary for encryption processing from the encryption parameter storage unit 11 and the random number generation unit 16, respectively.

Similarly, the encryption unit 17 encrypts, for each record, the attribute values for each attribute item other than top coding target attribute item of the table T1 based on the encryption keys a, $g^{sv}$, g, and N. The attribute values of all attribute items in the table T1 are thus encrypted, and the table T1e in which the attribute values of all attribute items are encrypted is generated as encrypted data.

In step ST86, the control unit 18 of each of the encryption apparatuses (1 to N) 10 sends the encrypted data formed from the table T1e and the grouping target attribute item (e.g. age) in the table T1e to an anonymization apparatus 20 via the communication unit 14.

In step ST87, the anonymization apparatus 20 receives the table T1e that includes the encrypted data and the grouping target attribute item (e.g. age) in the table T1e by the communication unit 24. After that, the control unit 29 of the anonymization apparatus 20 stores the table T1e and the grouping target attribute item (e.g. age) in the temporary data storage unit 23. The table T1e in the temporary data storage unit 23 is updated to the contents of the collected tables T1e received from the encryption apparatuses (1 to N) 10.

(Anonymization)

In step ST88, the parameter generation unit 84 of the parameter generation apparatus 80 generates a lower limit value L of a group, an upper limit value U of the group, and a representative value M for the group, which are the anonymization parameters used for grouping. The encryption unit 86 of the parameter generation apparatus 80 encrypts the generated lower limit value L, upper limit value U, and representative value M for the group based on the encryption keys a, $g^{sv}$, g, and N in a key storage unit 82 using the encryption method as described in [AN2013-51001]. The encrypted lower limit value $C_L$, the encrypted upper limit value $C_U$, and the encrypted representative value $C_M$, which are the encrypted anonymization parameters, are thus generated.

Enc(L)→$C_L$
Enc(U)→$C_U$
Enc(M)→$C_M$

In step ST89, the control unit 87 of the parameter generation apparatus 80 sends the grouping target attribute item (e.g. age) in the table T1e, and the encrypted lower limit value $C_L$, the encrypted upper limit value $C_U$, and the encrypted representative value $C_M$ to the anonymization apparatus 20 via a communication unit 83.

Steps ST90 to ST99 are then executed as in the above-described 11th embodiment.

As described above, according to this embodiment, even if the plurality of encryption apparatuses 10 are provided, the same function and effect as in the 11th embodiment can be obtained.

In this embodiment, the secret key itself is not stored in the devices, unlike the fourth or sixth embodiment. For this reason, even if a key is stolen from any device, the encrypted data cannot be decrypted or anonymized.

13th Embodiment: Deletion, Resampling, Sort, or Swapping

An anonymization system according to the 13th embodiment will be described next with reference to FIG. 1.

Unlike the first embodiment in which the encrypted "staff identification number" is pseudonymized, in the 13th embodiment, the encrypted "staff identification number" is deleted. Note that in this embodiment, any of the encrypted anonymization parameters (for example, an encrypted random number, an encrypted threshold, an encrypted lower limited value, an encrypted upper limit value, an encrypted representative value, or an encrypted noise) obtained by encrypting any of the anonymization parameters used for anonymization processing is not used, unlike the above-described first to 12th embodiments.

This embodiment can be modified to a form that uses "resampling", "sort", or "swapping" in place of "deletion".

Figure 36:
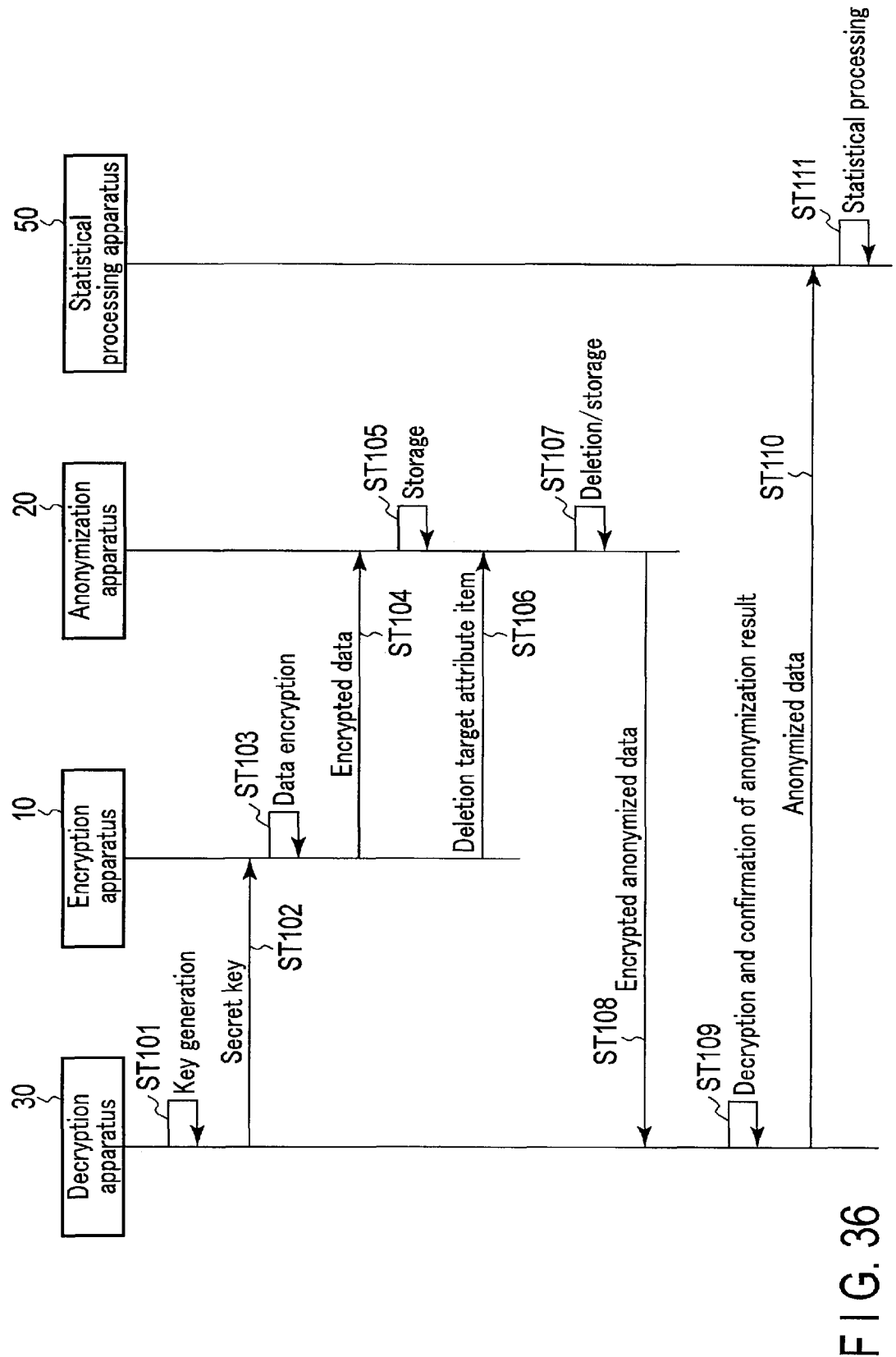
FIG. 36 is a sequence chart for explaining an operation according to the 13th embodiment.

The operation of the anonymization system according to this embodiment will be described next with reference to the sequence chart of FIG. 36 and the schematic views of FIGS. 37 and 38. In the following explanation, a case in which anonymization is performed using the "AES" encryption method will be described as an example.

(Preparation)

In step ST101, the key generation unit 36 of the decryption apparatus 30 generates a key (secret key $sk_A$) based on the security parameter ($1^k$) in the encryption parameter storage unit 31 using the "AES" encryption method.

KeyGen($1^k$)→($sk_A$)

Note that the key generation unit 36 may acquire a random number necessary for the key generation processing from the random number generation unit 35. The key generation unit 36 saves the generated secret key $sk_A$ in the secret key storage unit 32.

In step ST102, the control unit 38 of the decryption apparatus 30 sends the secret key $sk_A$ that is a common key to the encryption apparatus 10 via the communication unit 34. The control unit 18 of the encryption apparatus 10 stores the secret key $sk_A$ received by a communication unit 14 in the key storage unit 12.

In step ST103, the encryption unit 17 of the encryption apparatus 10 reads out the table T1 shown in FIG. 3 from the temporary data storage unit 13. The encryption unit 17 encrypts, for each record, the attribute value $data_i$ for a deletion target attribute item (staff identification number) in the table T1 based on the secret key $sk_A$ stored in the key storage unit 12.

Enc($pk_A$, $data_i$)→$C_{A,data\_i}$

Note that the encryption unit 17 can acquire a parameter and a random number necessary for encryption processing from the encryption parameter storage unit 11 and the random number generation unit 16, respectively.

Similarly, the encryption unit 17 encrypts, for each record, the attribute values for each attribute item other than the deletion target attribute item of the table T1 based on the secret key $sk_A$. The attribute values of all attribute items in the table T1 are thus encrypted, and the table T1e in which the attribute values of all attribute items are encrypted is generated as encrypted data, as shown in FIG. 37.

In step ST104, the control unit 18 of the encryption apparatus 10 sends the encrypted data formed from the table T1e to the anonymization apparatus 20 via the communication unit 14.

In step ST105, the anonymization apparatus 20 stores the table T1e as the encrypted data received by the communication unit 24 in the temporary data storage unit 23.

(Anonymization)

In step ST106, the control unit 18 of the encryption apparatus 10 sends the deletion target attribute item (e.g. staff identification number) in the table T1e to the anonymization apparatus 20 via the communication unit 14. However, in a case in which the anonymization apparatus 20 holds the deletion target attribute item in advance, the sending of the deletion target attribute item by the encryption apparatus 10 may be omitted. This also applies to the following embodiments and modifications.

In step ST107, the anonymization apparatus 20 receives the deletion target attribute item (e.g. staff identification number) by the communication unit 24. The anonymization processing unit 26 deletes the column of the attribute values for the item (e.g. staff identification number) in the table T1e stored in the temporary data storage unit 23, wherein the item matches the received attribute item (e.g. staff identification number). That is, the anonymization processing unit 26 deletes the deletion target attribute item (e.g. staff identification number) and its attribute values ($C_{A,data\_i}$) from the table T1e shown in FIG. 37. The anonymized table T1a is thus generated as encrypted anonymized data, as shown in FIG. 38.

After that, the anonymization processing unit 26 saves the table T1a in the temporary data storage unit 23.

In step ST108, the control unit 29 of the anonymization apparatus 20 sends the encrypted anonymized data formed from the table T1a in the temporary data storage unit 23 to the decryption apparatus 30 via the communication unit 24.

According to this embodiment, it is possible to anonymize the encrypted data without decryption and decrypt the obtained encrypted anonymized data so as to use the anonymized data. Specifically, attribute values in the table T1 expressed by numerical values or character strings can be deleted. Here, the anonymization apparatus 20 knows the deleted attribute item (e.g. staff identification number) and its attribute values ($C_{A,data\_i}$). However, the anonymization apparatus 20 does not know the original attribute values (data_i) for the deleted attribute item (e.g. staff identification number).

If the encryption apparatus 10 holds the encrypted data before deletion, a corresponding table of the encrypted data before and after deletion may be created. If the original data is separately held, it is also possible to identify individuals from the attribute item(s) and its attribute values of the original data or recover the processed deletion to the original state.

After that, in step ST109, the control unit 38 of the decryption apparatus 30 receives the encrypted anonymized data by the communication unit 34 and stores it in the temporary data storage unit 33. Based on the secret key $sk_A$ in the secret key storage unit 32, the decryption unit 37 decrypts the values for each attribute item in the table T1a that includes the encrypted anonymized data in the temporary data storage unit 33, and obtains the table of the obtained decryption result.

The control unit 38 of the decryption apparatus 30 determines whether, of the table of the decryption result, the attribute values for the deletion target attribute item (e.g. staff identification number) have been anonymized. For example, if the table of the decryption result does not include the column of the deletion target attribute item, as intended, it is determined that the attribute values have been anonymized. In this case, the encryption apparatus 10 transmits the deletion target attribute item to the decryption apparatus 30 at an arbitrary timing. If the determination result is negative, the processing is re-executed from step ST104 and repeated until a desirable anonymization result is obtained.

Steps ST110 and ST111 are then executed, like steps ST11 and ST12 described above.

As described above, according to this embodiment, the same function and effect as in the first embodiment can be obtained even in a case in which deletion is executed as anonymization processing, except the function and effect concerning the encrypted anonymization parameter.

In this embodiment, anonymization processing of deleting the encrypted attribute values is executed. Instead, anonymization processing of resampling, sorting, or swapping the encrypted attribute values may be executed. In this case, the same effect as described above can be obtained by similarly implementing this embodiment.

Additionally, in place of key generation by the decryption apparatus 30, key generation by the encryption apparatus 10 may be executed. In this case, an embodiment is implemented by sending the secret key from the encryption apparatus 10 to the decryption apparatus 30.

Note that this embodiment may be implemented not only by an encryption method using the same key in encryption and decryption, like the "AES" method, but also by an (additive) homomorphic encryption method, an encryption method capable of performing magnitude comparison, and an encryption method holding the (additive) homomorphic encryption method and the encryption method capable of performing magnitude comparison. When using these encryption methods, the encryption algorithm in each method is replaced, thereby similarly implementing the embodiment.

In this embodiment, as in the modification shown in FIG. 2, the key generation apparatus 60 and the data storage apparatus 70 may further be provided. At this time, the same effect as in this embodiment can be obtained by making the anonymization apparatus 20 cooperate with the existing data storage apparatus 70. For example, as shown in FIG. 39, the encrypted data may be sent to the data storage apparatus 70 in step ST104, and the data storage apparatus 70 may store the encrypted data in step ST105. In addition, the data storage apparatus 70 may send the encrypted data to the anonymization apparatus 20 in step ST107-1, and the anonymization apparatus 20 may delete the column of the deletion target attribute item in step ST107-2. Similarly, the anonymization apparatus 20 may send the encrypted anonymized data to the data storage apparatus 70 in step ST108-1, and the data storage apparatus 70 may store the encrypted anonymized data in step ST108-2. In step ST108-3, the data storage apparatus 70 may send the encrypted anonymized data to the decryption apparatus 30. At this time, the effect of this embodiment can be obtained without significantly changing the existing data storage apparatus 70. This also applies to the embodiments and modifications to be described later.

Figure 40:
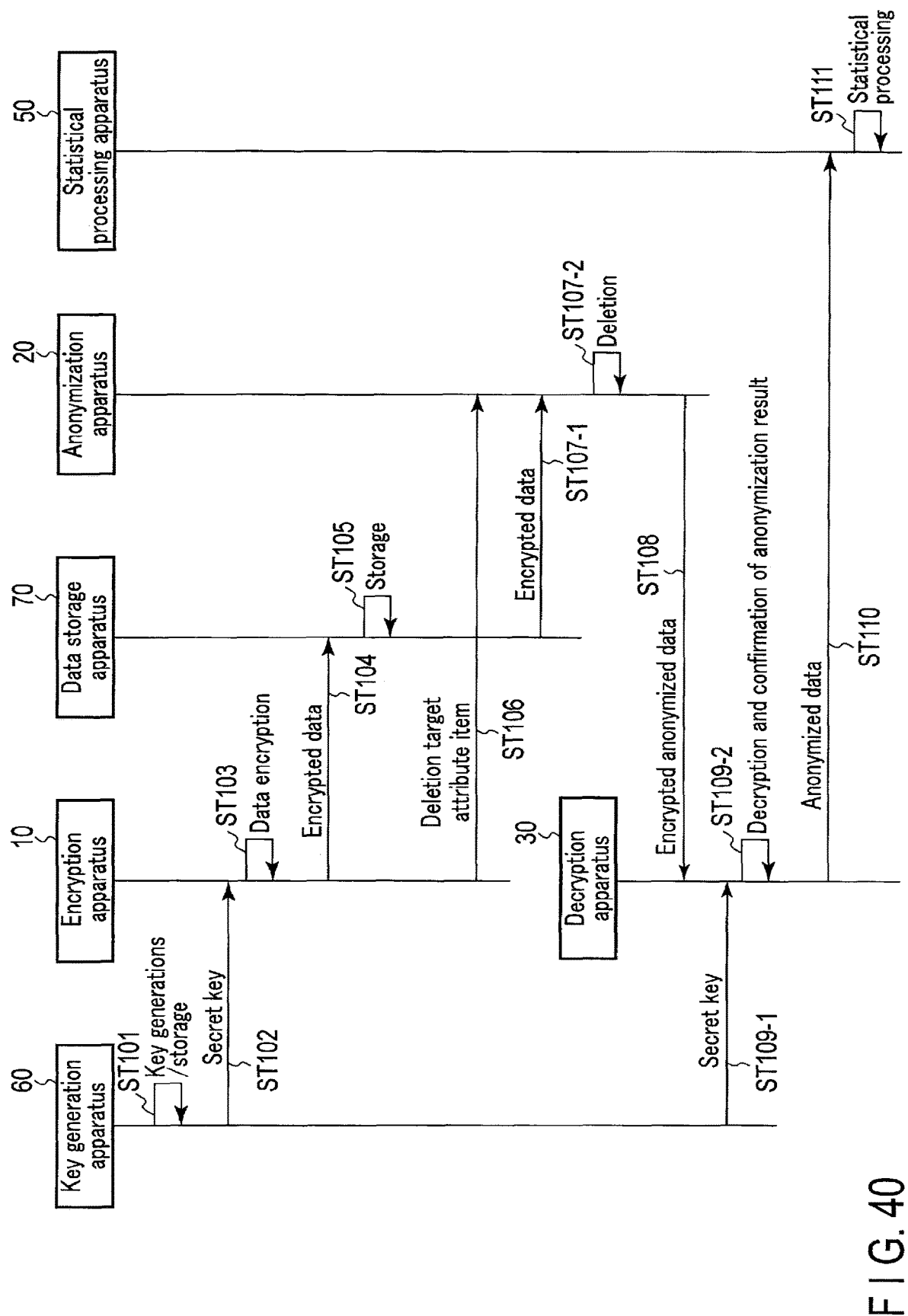
FIG. 40 is a sequence chart for explaining a modified operation according to the modification of the 13th embodiment.

Additionally, for example, as in the modification shown in FIG. 8, as shown in FIG. 40, existing step ST108 may be executed in place of steps ST108-1 to ST108-3 in FIG. 39. In this case, the same effect as in the operation shown in FIG. 8 can be obtained.

14th Embodiment: M2M and Deletion, Resampling, Sort, or Swapping

Figure 41:
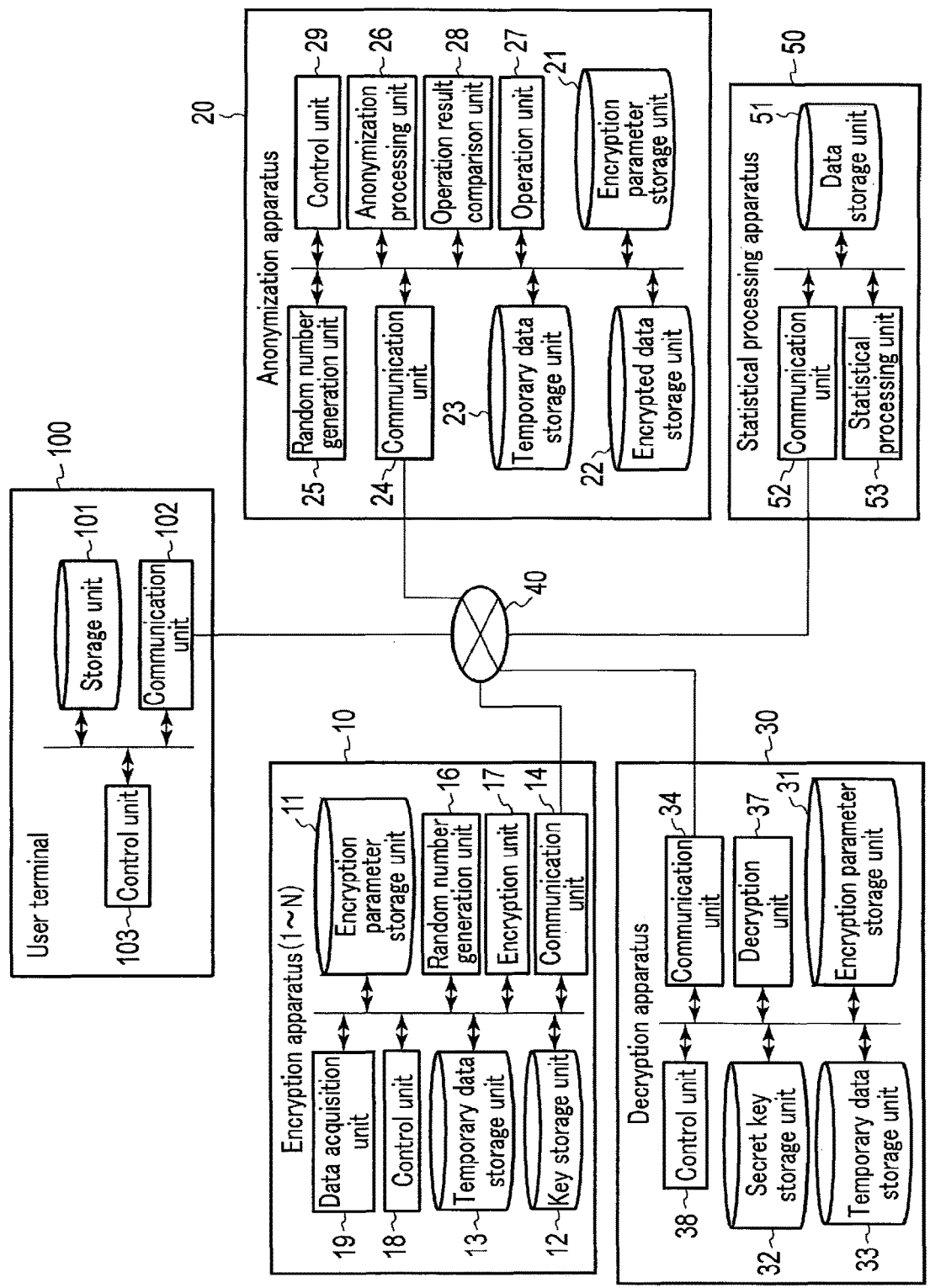
FIG. 41 is a schematic view showing an anonymization system according to the 14th embodiment and its peripheral arrangement.

FIG. 41 is a schematic view showing an anonymization system according to the 14th embodiment and its peripheral arrangement.

Unlike the 13th embodiment in which the encryption apparatus 10 encrypts the personal data and provides it to the anonymization apparatus 20, in the 14th embodiment, the anonymization apparatus 20 collects the encrypted data obtained by encrypting the personal data acquired by each device, like an M2M service. Each device here corresponds each of encryption apparatuses (1 to N) 10.

Specifically, in the 14th embodiment, the N encryption apparatuses 10 are provided, and a user terminal 100 is further provided, as compared to the arrangement shown in FIG. 1. However, the user terminal 100 is not necessarily used, and may be omitted if, for example, any of the encryption apparatuses 10 sends the deletion target attribute item (e.g. staff identification number) to the anonymization apparatus 20. This also applies to the following modifications.

Here, the arrangement of each of the N encryption apparatuses (1 to N) 10 is the same as that in the above-described fourth embodiment and the like except the method of anonymization processing.

The user terminal 100 is a computer having a normal communication function, and includes, for example, a storage unit 101, a communication unit 102, and a control unit 103.

Figure 42:
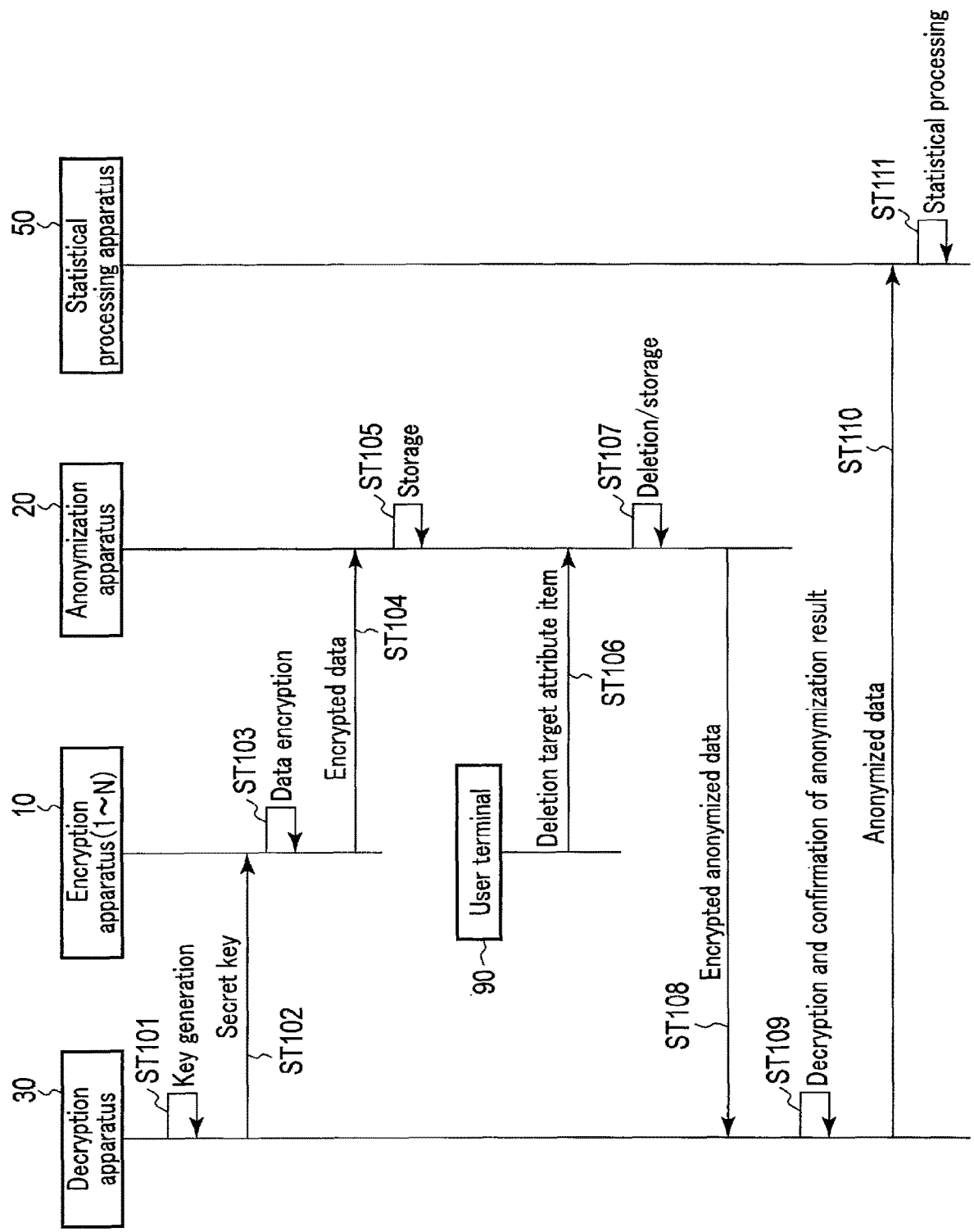
FIG. 42 is a sequence chart for explaining an operation according to the 14th embodiment.

The operation of the anonymization system according to this embodiment will be described next with reference to the sequence chart of FIG. 42. In the following explanation, a case in which anonymization is performed using the "AES" encryption method will be described as an example.

(Preparation)

Step ST101 is executed as in the above-described 13th embodiment.

In step ST102, the control unit 38 of the decryption apparatus 30 sends a secret key $sk_A$ that is a common key to each of the encryption apparatuses (1 to N) 10 via the communication unit 34. The control unit 18 of each of the encryption apparatuses (1 to N) 10 stores the secret key $sk_A$ received by the communication unit 14 in the key storage unit 12. Note that in each of the encryption apparatuses (1 to N) 10, the public key $pk_A$ may be input and stored at the time of device assembly. Alternatively, after the device is arranged, the public key $pk_A$ may be received via a network and stored.

In step ST103, the data acquisition unit 19 of each of the encryption apparatuses (1 to N) 10 acquires the personal data formed from the table T1, and stores it in the temporary data storage unit 13, as shown in FIG. 3. The encryption unit 17 of each of the encryption apparatuses (1 to N) 10 encrypts, for each record, the attribute value $data_i$ for the deletion target attribute item (e.g. staff identification number) in the table T1 stored in the temporary data storage unit 13 based on the secret key $sk_A$ in the key storage unit 12. $Enc(sk_A, data_i) \rightarrow C_{A,data\_i}$ Note that the encryption unit 17 can acquire a parameter and a random number necessary for encryption processing from the encryption parameter storage unit 11 and the random number generation unit 16, respectively.

Similarly, the encryption unit 17 of each of the encryption apparatuses (1 to N) 10 encrypts, for each record, the attribute values for each attribute item other than the deletion target attribute item in the table T1 based on the secret key $sk_A$. As described above, the table T1e in which the attribute values for all attribute items are encrypted is generated as encrypted data, as shown in FIG. 37.

In step ST104, the control unit 18 of each of the encryption apparatuses (1 to N) 10 sends the encrypted data formed from the table T1e to the anonymization apparatus 20 via the communication unit 14.

In step ST105, the anonymization apparatus 20 stores the table T1e as the encrypted data received by the communication unit 24 in the temporary data storage unit 23. The table T1e in the temporary data storage unit 23 is updated to the contents of the collected tables T1e received from the encryption apparatuses (1 to N) 10.

(Anonymization)

In step ST106, the control unit 103 of the user terminal 100 sends the deletion target attribute item (e.g. staff identification number) to the anonymization apparatus 20 via the communication unit 102. However, in a case in which the anonymization apparatus 20 holds the deletion target attribute item in advance, the sending of the deletion target attribute item by the encryption apparatus 10 may be omitted. This also applies to the following modifications.

Steps ST107 to ST111 are then executed as in the above-described 13th embodiment.

As described above, according to this embodiment, even if the plurality of encryption apparatuses 10 are provided, the same function and effect as in the 13th embodiment can be obtained.

In this embodiment, the secret key $sk_A$ is stored in each device. Thus, since not only encryption but also decryption processing can be performed by the secret key $sk_A$, the secret key $sk_A$ needs to be properly maintained on each device.

In this embodiment, in place of anonymization processing of deleting the encrypted attribute values, anonymization processing of resampling, sorting, or swapping the encrypted attribute values may be executed. In this case, the same effect as described above can be obtained by similarly implementing this embodiment.

Note that this embodiment can be implemented not only by the encryption method using the same key in encryption and decryption, like the "AES" method, but also by an (additive) homomorphic encryption method, an encryption method capable of performing magnitude comparison, and an encryption method holding the (additive) homomorphic encryption method and the encryption method capable of performing magnitude comparison. When using these encryption methods, the encryption algorithm in each method is replaced, thereby similarly implementing the embodiment.

According to at least one embodiment described above, processing of encrypting the values for each item included in the personal data is performed, thereby generating the encrypted data from the personal data. Processing of anonymizing the values for one or more items of the encrypted data without decryption is performed, thereby generating the encrypted anonymized data from the encrypted data. Processing of decrypting the encrypted anonymized data is performed, thereby generating the anonymized data from the encrypted anonymized data. With this arrangement, the encrypted data obtained by encrypting the personal data can be anonymized without decryption.

Note that the method described in each embodiment described above can also be implemented by or distributed as a program to be executed by a computer in a storage medium such as a magnetic disk (a Floppy® disk, a hard disk, or the like), an optical disk (a CD-ROM, a DVD, or the like), a magneto-optical disk (MO), or a semiconductor memory.

The storage medium can be used in any storage form as long as it is a computer-readable storage medium capable of storing a program.

Based on instructions by the program installed from the storage medium to the computer, an OS (Operating System) operating on the computer or MW (middleware) such as database management software or network software may execute part of the processing for implementing the embodiments.

In addition, the storage medium in each embodiment is not limited to a medium independent of a computer, and includes a storage medium in which a program transmitted via a LAN or the Internet is downloaded and stored or temporarily stored.

The storage medium is not limited to one storage medium. The storage medium according to the present invention also includes a plurality of storage media in a case where the processes according to each embodiment described above are executed by programs retrieved from the plurality of media, and any arrangement of the plurality of storage media can be employed.

The computer according to each embodiment executes each process according to the embodiment based on a program stored in a storage medium. The computer can be a single device such as a personal computer or a system in which a plurality of devices are connected via a network.

The computer according to each embodiment is not limited to a personal computer and includes a processing unit incorporated in an information processing device and a microcomputer. The term "Computer" used herein is a general term for one or more devices and apparatuses capable of implementing the functions of the embodiments of the present invention by executing a program.

While certain embodiments of the inventions have been described, these embodiments have been presented by way of examples only, and are not intended to limit the scope of the inventions. Indeed, the novel methods and systems described herein may be embodied in a variety of other forms; furthermore, various omissions, substitutions and changes in the aspects of the methods and systems described herein may be made without departing from the scope of the inventions. The appended claims and their equivalents are intended to cover such aspects or modifications as would fall within the scope and substance of the present inventions.

What is claimed is:

1. An anonymization system comprising at least one encryption apparatus, at least one anonymization apparatus, and at least one decryption apparatus,
   wherein the at least one encryption apparatus comprises:
     a first storage memory to store personal data including one or more values for each item;
     a first key storage memory to store a common key in an encryption method performing magnitude comparison; and
     encryption circuitry configured to generate encrypted data from the personal data by encrypting, based on the common key, the one or more values for each item included in the personal data,
   wherein the anonymization apparatus comprises:
     a second storage memory to store the encrypted data generated by the encryption apparatus; and
     anonymization circuitry configured to generate encrypted anonymized data from the encrypted data without decryption by anonymizing the one or more values for at least a portion of the items in the encrypted data stored in the second storage memory, and
   wherein the decryption apparatus comprises:
     a third storage memory to store the encrypted anonymized data generated by the anonymization apparatus;
     a second key storage memory to store the common key; and
     decryption circuitry configured to generate anonymized data from the encrypted anonymized data by decrypting, based on the common key, the encrypted anonymized data in the third storage memory, wherein the encryption circuitry is further configured to generate an encrypted threshold by encrypting, based on the common key, a threshold which is an anonymization parameter used for the anonymizing, and different from the encrypted data, and wherein the anonymization circuitry is further configured to generate the encrypted anonymized data from the encrypted data by performing a magnitude comparison on a value of an item in the encrypted data and the generated encrypted threshold, and anonymizing the value of the item in accordance with a result of the comparison.

2. The anonymization system according to claim 1, wherein the encryption circuitry is further configured to generate one or more encrypted anonymization parameters by encrypting one or more anonymization parameters, other than the threshold, used for the anonymizing, and wherein the anonymization circuitry is further configured to generate the encrypted anonymized data from the encrypted data based on the one or more encrypted anonymization parameters generated by the encryption apparatus.

3. The anonymization system according to claim 1, wherein the anonymized data includes information including, for the personal data, one or more values obtained by anonymizing the one or more values for at least a portion of the items, and one or more values for at least a portion of the other items other than the at least a portion of items for anonymization, and wherein the encrypted anonymized data comprises information including:

one or more encrypted anonymized values obtained by anonymizing the one or more encrypted values for the at least a portion of the items included in the encrypted data, and one or more encrypted values for the at least a portion of the other items other than the at least a portion of items for anonymization included in the encrypted data.

4. The anonymization system according to claim 2, wherein the anonymized data includes information including, for the personal data, one or more values obtained by anonymizing the one or more values for at least a portion of the items, and one or more values for at least a portion of the other items other than the at least a portion of items for anonymization, and wherein the encrypted anonymized data comprises information including:

one or more encrypted anonymized values obtained by anonymizing the one or more encrypted values for the at least a portion of the items included in the encrypted data, and one or more encrypted values for the at least a portion of the other items other than the at least a portion of items for anonymization included in the encrypted data.

* * * * *